US 9,154,690 B2

(12) United States Patent
Wang et al.

(10) Patent No.: US 9,154,690 B2
(45) Date of Patent: *Oct. 6, 2015

(54) IMAGE SEARCH DEVICE, IMAGE SEARCH METHOD, AND IMAGE SEARCH PROGRAM

(71) Applicant: Sony Corporation, Tokyo (JP)

(72) Inventors: Qihong Wang, Tokyo (JP); Akiko Terayama, Tokyo (JP); Ryo Takaoka, Tokyo (JP); Satoshi Akagawa, Tokyo (JP); Koji Arai, Tokyo (JP); Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/132,659

(22) Filed: Dec. 18, 2013

(65) Prior Publication Data

US 2014/0104456 A1    Apr. 17, 2014

Related U.S. Application Data

(63) Continuation of application No. 12/840,762, filed on Jul. 21, 2010, now Pat. No. 8,643,729.

(30) Foreign Application Priority Data

Jul. 29, 2009    (JP) .................. 2009-176700

(51) Int. Cl.
*H04N 5/228*    (2006.01)
*H04N 5/222*    (2006.01)
*G06K 9/00*    (2006.01)
*H04N 5/232*    (2006.01)
*G06F 17/30*    (2006.01)

(52) U.S. Cl.
CPC ...... *H04N 5/23216* (2013.01); *G06F 17/30247* (2013.01); *H04N 5/23293* (2013.01)

(58) Field of Classification Search
CPC .................................................. H04N 5/23229
USPC ........ 348/14.02, 222.1, 333.01; 382/103, 118
See application file for complete search history.

(56) References Cited

U.S. PATENT DOCUMENTS

| 6,504,571 | B1 | 1/2003 | Narayanaswami et al. |
| 7,440,594 | B2 * | 10/2008 | Takenaka ........................ 382/118 |
| 8,041,076 | B1 * | 10/2011 | Bourdev ........................ 382/103 |
| 2004/0008258 | A1 | 1/2004 | Aas et al. |

(Continued)

FOREIGN PATENT DOCUMENTS

| EP | 1 860 853 A1 | 11/2007 |
| JP | 07-296001 A | 11/1995 |

(Continued)

*Primary Examiner* — Trung Diep
(74) *Attorney, Agent, or Firm* — Wolf, Greenfield & Sacks, P.C.

(57) ABSTRACT

An image search device includes: a shooting unit configured to photographically shoot a subject; a display unit; a control unit configured to display a search key for image search on the display unit according to a shooting situation at the time of a shooting mode whereby the subject can photographically be shot by the shooting unit; a specifying unit which is used for specifying the search key displayed on the display unit; and a searching unit configured to search, in the event of the search key being specified via the specifying unit, an image based on the search key thus specified; with the control unit displaying, in the event of the image being searched by the searching unit, this search result on the display unit.

20 Claims, 27 Drawing Sheets

(56) References Cited

U.S. PATENT DOCUMENTS

| | | |
|---|---|---|
| 2005/0110634 A1* | 5/2005 | Salcedo et al. ............ 340/539.1 |
| 2006/0044470 A1 | 3/2006 | Koike |
| 2006/0050934 A1 | 3/2006 | Asai |
| 2006/0055825 A1* | 3/2006 | Shiota et al. ................ 348/563 |
| 2006/0251292 A1 | 11/2006 | Gokturk et al. |
| 2007/0160365 A1* | 7/2007 | Aoyagi ........................ 396/429 |
| 2007/0201767 A1* | 8/2007 | Fujita ........................... 382/305 |
| 2008/0146274 A1 | 6/2008 | Cho |
| 2011/0018827 A1 | 1/2011 | Wang et al. |
| 2011/0025873 A1 | 2/2011 | Wang et al. |

FOREIGN PATENT DOCUMENTS

| | | |
|---|---|---|
| JP | 2001-160058 A | 6/2001 |
| JP | 2004-266636 A | 9/2004 |
| JP | 2008-071112 A | 3/2008 |
| JP | 2008-165424 A | 7/2008 |
| JP | 2008-182662 A | 8/2008 |
| JP | 2008-294704 A | 12/2008 |
| WO | WO 2008/109622 A1 | 9/2008 |

* cited by examiner

FIG. 3

| PERSONAL ID INFO | REGISTERED FACE FEATURE INFO | FACE ICON | INTIMACY-RELATED INFO | FILE ID INFO | SHOT DATE INFO | SHOT POS INFO | EVENT ID INFO |
|---|---|---|---|---|---|---|---|
| PERSONAL ID INFO 1 | REGISTERED FACE FEATURE INFO 1 |  | INTIMACY-RELATED INFO 1 | FILE ID INFO 1 | SHOT DATE INFO 1 | SHOT POS INFO 1 | EVENT ID INFO 1 |
| | | | INTIMACY-RELATED INFO 3 | FILE ID INFO 3 | SHOT DATE INFO 3 | SHOT POS INFO 3 | EVENT ID INFO 1 |
| | | | ... | FILE ID INFO 4 | SHOT DATE INFO 4 | SHOT POS INFO 4 | EVENT ID INFO 1 |
| | | | | ... | ... | ... | ... |
| | | | INTIMACY-RELATED INFO P | FILE ID INFO N | SHOT DATE INFO N | SHOT POS INFO N | EVENT ID INFO M |
| PERSONAL ID INFO 2 | REGISTERED FACE FEATURE INFO 2 |  | INTIMACY-RELATED INFO 2 | FILE ID INFO 3 | SHOT DATE INFO 3 | SHOT POS INFO 3 | EVENT ID INFO 1 |
| | | | ... | FILE ID INFO 4 | SHOT DATE INFO 4 | SHOT POS INFO 4 | EVENT ID INFO 1 |
| | | | | ... | ... | ... | ... |
| | | | INTIMACY-RELATED INFO R | FILE ID INFO Q | SHOT DATE INFO Q | SHOT POS INFO Q | EVENT ID INFO S |
| ... | ... | ... | | ... | ... | ... | ... |
| | | | | FILE ID INFO T | SHOT DATE INFO T | SHOT POS INFO T | EVENT ID INFO W |
| | | | | FILE ID INFO V | SHOT DATE INFO V | SHOT POS INFO V | EVENT ID INFO X |

DB

IMAGE SEARCH DEVICE, IMAGE SEARCH METHOD, AND IMAGE SEARCH PROGRAM

CROSS REFERENCES TO RELATED APPLICATIONS

This application is a continuation of and claims the benefit under 35 U.S.C. §120 of U.S. patent application Ser. No. 12/840,762, titled "IMAGE SEARCH DEVICE, IMAGE SEARCH METHOD, AND IMAGE SEARCH PROGRAM," filed on Jul. 21, 2010, which claims the benefit under 35 U.S.C. §119 of Japanese Patent Application JP 2009-176700, filed on Jul. 29, 2009. The entire contents of these applications are hereby incorporated by reference in their entireties.

BACKGROUND OF THE INVENTION

1. Field of the Invention

The present invention relates to an image search device, an image search method, and an image search program, and is suitable for being applied to, for example, a digital still camera.

2. Description of the Related Art

A digital still camera according to the related art records multiple photo images obtained by subjecting a subject to photo shooting, and also records, so as to correlate metadata of multiple categories with each of the multiple photo images, the metadata for each of the categories.

Also, in the event of a singular or plurality of metadata being selected for each category by a user, the digital still camera searches, based on this selected metadata, a photo image in a manner correlated with the same metadata as this metadata.

Subsequently, the digital still camera displays the searched multiple photo images on a monitor. Thus, the digital still camera allows a user to search a desired photo image (e.g., see Japanese Unexamined Patent Application Publication No. 2008-165424 (the 1st, 9th, and 10th pages, FIGS. 4, 5, and 14)).

SUMMARY OF THE INVENTION

Incidentally, with the digital still camera thus configured, in addition to a shooting mode in which a subject is subjected to photo shooting, a reproduction mode in which a photo image is reproduced is provided, and this reproduction mode allows a user to search for photo images taken and accumulated so far so as to view a desired one.

However, the user who uses this digital still camera may conceive of correlating a subject and a shot place with taken and accumulated photo images to search and view the photo images.

However, with the digital still camera, in the event that search of a photo image is requested at the time of the shooting mode, a complicated operation has to be performed, such as a mode switching operation to the reproduction mode, or a selection operation for allowing a user to select a plurality of metadata for search while sequentially switching a category.

Therefore, the digital still camera includes a problem wherein, regardless of a photo image being requested to be searched with a subject or shot place as a trigger, such a photo image search request is not readily handled.

It has been found to be desirable to provide an image search device, an image search method, and an image search program whereby an image search request can readily be handled at the time of the shooting mode.

According to an embodiment of the present invention, an arrangement is made wherein s search key for image search is displayed on a display unit according to a shooting situation at the time of the shooting mode in which a subject can be shot by a shooting unit, and in the event that a search key is specified via a specifying unit used for specifying the search key displayed on the display unit, an image is searched based on this specified search key, and this search result is displayed on the display unit.

Accordingly, with the present invention, regardless of image search being requested with a subject or shot place as a trigger at the time of the shooting mode, an image can be searched by specifying a search key without performing any complicated operations.

According to an embodiment of the present invention, an arrangement is made wherein, in the event that a search key for image search is displayed on a display unit according to a shooting situation at the time of the shooting mode in which a subject can be shot by a shooting unit, and the search key is specified via a specifying unit used for specifying the search key displayed on the display unit, an image is searched based on this specified search key, and this search result is displayed on the display unit. Thus, regardless of image search being requested with a subject or shot place as a trigger at the time of the shooting mode, an image can be searched by specifying a search key without performing any complicated operation, and accordingly, an image search device, an image search method, and an image search program can be realized whereby an image search request can readily be handled at the time of the shooting mode.

BRIEF DESCRIPTION OF THE DRAWINGS

FIG. 3 is a schematic diagram illustrating the configuration of a database for search;

DESCRIPTION OF THE PREFERRED EMBODIMENTS

Figure 1A:
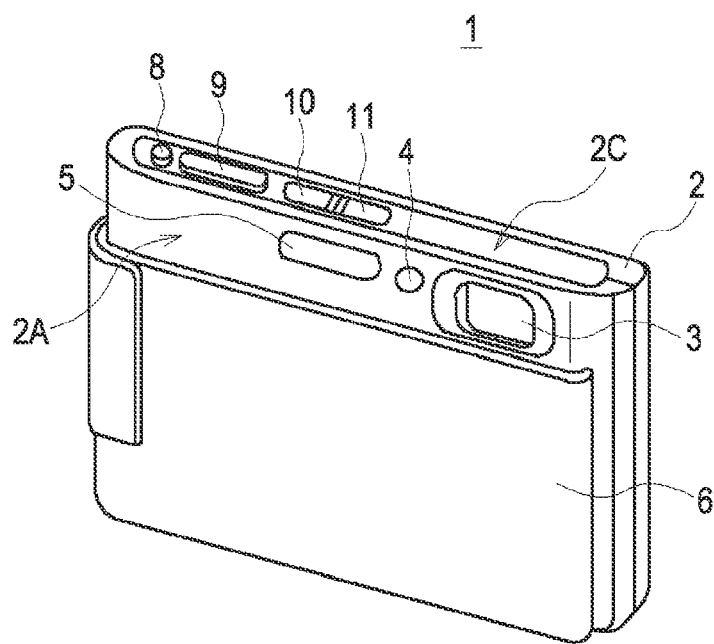
FIGS. 1A and 1B are schematic diagrams illustrating an embodiment of the external configuration of a digital still camera according to the present invention.
Figure 1B:
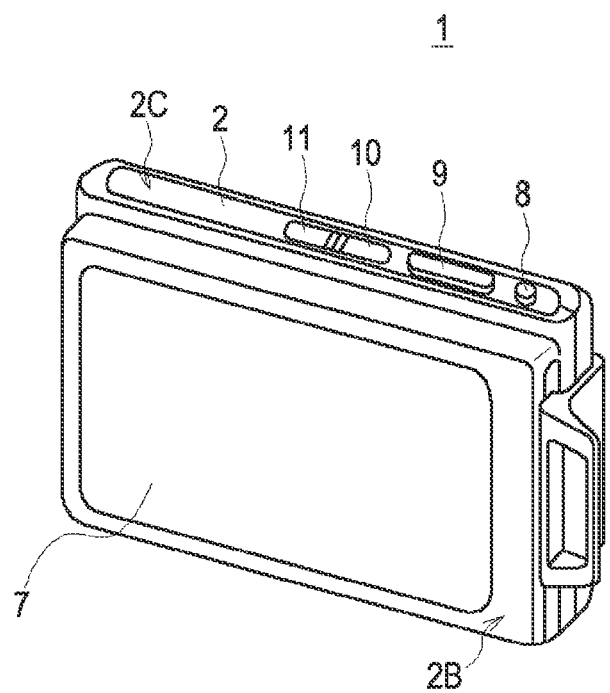

The best mode for implementing the present invention (hereafter, also referred to as "embodiment") will be described with reference to the following drawings. Now, description will be made in the following sequence.
1. Embodiment
2. Modifications
1. Embodiment
1-1. External Configuration of Digital Still Camera In FIGS. 1A and 1B, reference numeral 1 denotes a digital still camera to which an embodiment of the present invention has been applied as a whole. Such a digital still camera 1 includes an approximately flat rectangular casing 2 made up of the degree of a size that can be grasped by a single hand.

With the front surface 2A of the casing 2, a shooting lens 3, autofocus (AF: Auto Focus) illuminator 4, and a flash 5 are provided on the upper portion thereof. Incidentally, the autofocus illuminator 4 also serves as a self timer lamp.

Also, a lens cover 6 is attached to the front surface 2A so as to be slid upward or downward. Thus, an arrangement is made wherein, in the event of the lens cover 6 having been slid downward, the casing 2 exposes the shooting lens 3, autofocus illuminator 4, and flash 5.

Also, an arrangement is made wherein, in the event of the lens cover 6 having been slid upward, the casing 2 covers the shooting lens 3, autofocus illuminator 4, and flash 5, thereby externally protecting these. Incidentally, an arrangement is made wherein, in the case that the lens cover 6 has been slid downward in a power off state, in response to this, the digital still camera 1 automatically turns on the power.

Also, a touch screen 7 is provided to the rear surface B of the casing 2. This touch screen 7 is configured, for example, so that a touch panel is adhered to the surface of a liquid crystal panel. Thus, the touch screen 7 serves as a display device which enables touch operations by a finger or a stylus pen or the like as to the liquid crystal panel 7.

Further, with the upper surface 2C of the casing 2, a zoom lever 8, a shutter button 9, a reproducing button 10, and a power button 11 are disposed. Incidentally, the reproducing button 10 is a hardware key for switching the operation mode of the digital still camera 1 to the reproduction mode in which a photo image is reproduced to display this on the touch screen.

According to such a configuration, in the event that the lens cover 6 has been slid downward, or the power button 11 has been press-operated, the digital still camera 1 turns on the power, and is booted up in the shooting mode.

At the time of the shooting mode, the digital still camera 1 continuously shoots a subject via the shooting lens 3 to confirm the shooting state, such as the shooting range, composition, focus, and the like to generate a shooting status presenting image serving as a moving image, and displays this on the touch screen 7.

Also, in response to an inclining operation as to the zoom lever 8, or a touch operation as to the touch screen 7, the digital still camera 1 performs zooming (TELE/WIDE). Thus, the digital still camera 1 can allow the user to confirm the shooting state of a subject by the shooting status presenting image displayed on the touch screen 7.

In this state, if the shutter button 9 has been press-operated, the digital still camera 1 takes an image of the subject via the shooting lens 3 to generate a photo image, and records this.

Further, if the reproducing button 10 has been press-operated, the digital still camera 1 proceeds from the shooting mode to the reproduction mode. At this time, the digital still camera 1 displays, for example, one of the already recorded photo images on the liquid crystal panel. Subsequently, in response to a touch operation as to the touch screen 7, the digital still camera 1 switches a photo image to be displayed thereon.

In this way, the digital still camera 1 is configured so as to allow the user to generate and record a photo image by photographically shooting a subject, and also so as to allow the user to reproduce and view this recorded photo image.

1-2. Circuit Configuration of Digital Still Camera 1

Figure 2:
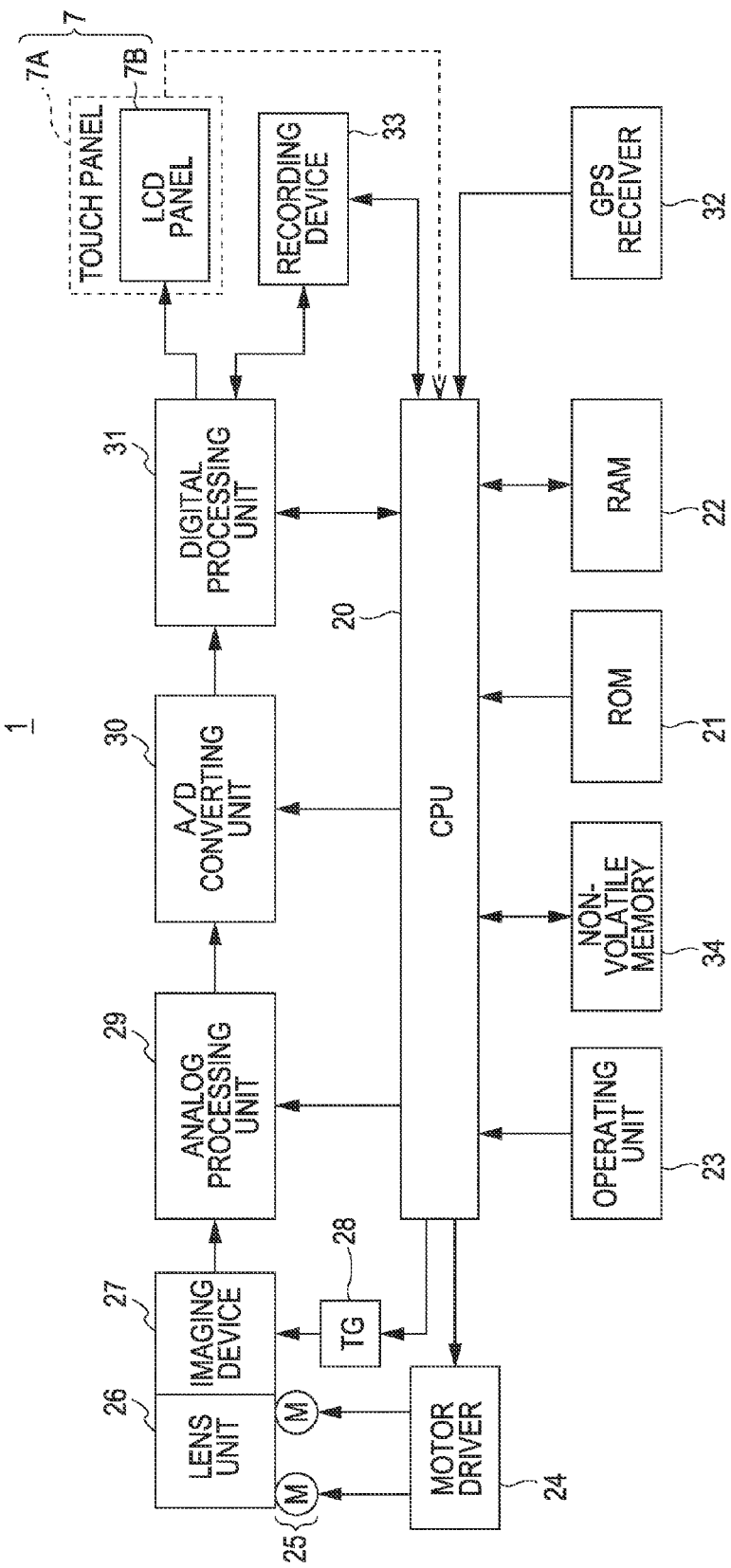
FIG. 2 is a block diagram illustrating an embodiment of the circuit configuration of the digital still camera according to the present invention.

Next, the circuit configuration of the digital still camera 1 will be described with reference to FIG. 2. With the digital still camera 1, a central processing unit (CPU) 20 reads out various types of programs stored in ROM (Read Only Memory) 21 beforehand to load these to RAM (Random Access Memory) 22.

Subsequently, the central processing unit 20 controls the whole of the digital still camera 1 in accordance with various types of programs loaded to the RAM 22. Also, the central processing unit 20 follows various types of programs loaded to the RAM 22 to execute various types of processing according to an input signal to be input according to a touch operation from a touch panel 7A of the touch screen 7.

Further, the central processing unit 20 follows various types of programs loaded to the RAM 22 to execute various types of processing according to an input signal to be input according to a press-operation from an operating unit 23.

Actually, if an arbitrary position on the surface has been touched by a finger or the like, the touch panel 7A detects the coordinates of the touched position thereof (i.e., touch position) with a certain extremely short time interval during the finger or the like being touched thereon. Subsequently, the touch panel 7A transmits an input signal indicating the coordinates of the detected touch position to the central processing unit 20 during the finger or the like being touched thereon.

If the input signal has been provided from the touch panel 7A, the central processing unit 20 detects whether or not there is a shift in the touch position, and the duration of touching (hereafter, also referred to as "touch duration") based on this input signal. Subsequently, the central processing unit 20 determines the type of a touch operation based on the detection results regarding whether or not there is a shift in the touch position, and the touch duration.

As a result thereof, in the event that the touch position is almost not shifted, and the touch duration is relatively short, equal to or shorter than predetermined time, the central processing unit 20 determines that the touch operation at this time is a touch operation such that a finger or the like is contacted on one arbitrary point of the surface of the touch panel 7A and is immediately separated therefrom.

Incidentally, with the following description, a touch operation such that a finger or the like is contacted on one arbitrary point of the surface of the touch panel 7A and is immediately separated therefrom will also be referred to as a "tapping operation". Note that this tapping operation is an operation to be performed, for example, for specifying a button or icon or the like within an image displayed on a liquid crystal panel 7B to input a command assigned to this button or icon or the like.

Also, in the event that the touch position has been shifted by spending longer touch duration than predetermined time, the central processing unit 20 determines that the touch operation at this time is a touch operation such that, while contacting a finger or the like on the surface of the touch panel 7A, the finger or the like is moved.

Incidentally, with the following description, a touch operation such that, while contacting a finger or the like on the surface of the touch panel 7A, the finger or the like is moved will also particularly be referred to as "sliding operation". Note that this sliding operation is an operation to be performed, for example, for moving (i.e., dragging) an icon or the like within an image displayed on the liquid crystal panel 7B.

Further, the central processing unit 20 detects which position within the image displayed on the liquid crystal panel 7B is specified by converting the coordinates of the touch position indicated by an input signal at this time into coordinates within the image displayed on the liquid crystal panel 7B.

Thus, in the event that the tapping operation is being performed as a touch operation at this time, the central processing unit 20 detects the specified position of one point within the image. Also, in the event that the sliding operation is being performed as a touch operation at this time, the central processing unit 20 detects a moving track of the specified position within the image.

Subsequently, after determining the type of a touch operation, and also detecting the specified position of one point, or a moving track of the specified position within the image, the central processing unit 20 determines an input command by the tapping operation or sliding operation at this time according to the determination result and the detection result. Subsequently, thus, after determining the command input by the tapping operation or sliding operation, the central processing unit 20 executes processing corresponding to the determined command.

On the other hand, the operating unit 23 includes the above zoom lever 8, shutter button 9, reproducing button 10, and power button 11, and transmits the input signal corresponding to a pressing operation or the like of each of these to the central processing unit 20.

If the input signal has been provided from the operating unit 23, the central processing unit 20 determines which has been operated of the zoom lever 8, shutter button 9, reproducing button 10, and power button 11.

Also, the central processing unit 20 determines a command to be input by a pressing operation or the like at this time according to the determination result thereof. Subsequently, after determining the command input by a press-operation or the like, the central processing unit 20 executes the processing corresponding to the determined command thereof.

In this way, for example, after the power button 11 of the operating unit 23 is pressed to turn on the power, or switching of the operation mode to the shooting mode is specified by a tapping operation as to the touch panel 7A, the central processing unit 20 operates under the shooting mode.

With the lens unit 26 including a diaphragm, focus lens, and the like as well as the above shooting lens 3, the central processing unit 20 adjusts the opening amount of this diaphragm, the position of this focus lens, or the like by subjecting an actuator 25 to driving control via a motor driver 24 at the time of the shooting mode. Thus, the central processing unit 20 automatically adjusts exposure or focus as to a shooting range.

In this state, the central processing unit 20 receives imaged light coming from the shooting range including a subject at the light-receiving surface of an imaging device 27 via the lens unit 26. Incidentally, the imaging device 27 is made up of a CCD (Charge Coupled Device) image sensor.

At this time, the central processing unit 20 controls a timing generator 28 to transmit a timing signal from this timing generator 28 to the imaging device 27 at a certain cycle.

Accordingly, the imaging device 27 sequentially subjects the imaged light received at the light-receiving surface to photoelectric conversion at the input timing of a timing signal to generate an analog photoelectric conversion signal according to imaged light L1 thereof, and also to transmit this generated photoelectric conversion signal to an analog processing unit 29.

Each time the photoelectric conversion signal is provided from the imaging device 27 the analog processing unit 29 subjects the photoelectric conversion signal thereof to predetermined analog processing such as amplification processing to generate an imaged signal, under the control of the central processing unit 20.

Also, each time an imaged signal is generated, the analog processing unit 26 converts this generated imaged signal into digital imaged data via an analog/digital converting unit 30, and transmits this to the digital processing unit 31.

Under the control of the central processing unit 20, each time imaged data is provided from the analog/digital converting unit 30, the digital processing unit 31 subjects the imaged data thereof to predetermined digital processing such as noise reduction processing.

Thus, based on the imaged data sequentially provided from the analog/digital converting unit 30, the digital processing unit 31 generates unit image data of a temporally unit image making up the above shooting status presenting image.

Subsequently, each time the unit image data thereof is generated, the central processing unit 20 sequentially sends this generated unit image data to the liquid crystal panel 7B. Thus, the digital processing unit 31 displays the unit image based on a plurality of temporally continuous unit image data on the liquid crystal panel 7B as the shooting status presenting image (i.e., moving image) by sequentially switching the unit image.

In this way, the central processing unit 20 can display the shooting status presenting image on the liquid crystal panel 7B by continuously shooting a shooting range including a subject, and also allow the user to confirm the shooting state of the subject by the shooting status presenting image.

Incidentally, the central processing unit 20 generates icon presenting image data for presenting icons, and transmits this generated icon presenting image data to the digital processing unit 31. Accordingly, if the icon presenting image data has been provided from the central processing unit 20, the digital processing unit 31 synthesizes this icon presenting image data and the unit image data to generate synthesized image data, and transmits this to the liquid crystal panel 7B. Thus, the digital processing unit 31 can display the shooting status presenting image on the liquid crystal panel 7B, and also display icons in a manner overlaid on the shooting status presenting image thereof.

If a condition adjusting signal for adjusting a shooting condition of a subject has been input from the operating unit 23 by the shutter button 9 being half-pressed by the user, in response to this, the central processing unit 20 subjects the actuator 25 to driving control via the motor driver 24.

Thus, the central processing unit 20 automatically adjusts exposure or focus as to a subject (e.g., person) within a shooting range by adjusting the aperture amount of the diaphragm, the position of the focus lens, or the like at the lens unit 26.

In this state, subsequently, if a release signal has been input from the operating unit 23 by the shutter button 9 being full-pressed by the user, the central processing unit 20 notifies the digital processing unit 31 of input of the release signal, and also controls the digital processing unit 31 according to the input of the release signal.

At this time, under the control of the central processing unit 20, the digital processing unit 31 subjects the imaged data provided from the analog/digital converting unit 30 when the input of the release signal is notified, to predetermined digital processing for photo shooting such as noise reduction processing, shading correction processing, or the like.

Thus, based on the imaged data provided from the analog/digital converting unit 30 when the input of the release signal is notified, the digital processing unit 31 generates photo image data obtained by photographically shooting a subject (i.e., a shooting range including a subject).

Also, the digital processing unit 31 subjects the photo image data thereof to compression encoding processing by a predetermined compression encoding method such as the JPEG (Joint Photographic Experts Group) method or the like to generate compressed image data.

Also, at this time, the digital processing unit 31 subjects the photo image data thereof to reduction processing for thinning out pixels to also generate the reduced photo image data (hereafter, also referred to as "thumbnail data") of the reduced photo image (hereafter, also referred to as "thumbnail"). Subsequently, the digital processing unit 31 transmits the compressed image data to the central processing unit 20 along with the thumbnail data thereof.

If the compressed image data and the thumbnail data has been provided from the digital processing unit 31, the central processing unit 20 generates header data in which various types of information relating to a photo image are stored in accordance with the Exif (Exchangeable image file format). Subsequently, the central processing unit 20 generates an image file by adding the header data to the top portion of the compressed image data.

Incidentally, if the compressed image data has been provided from the digital processing unit 31, the central processing unit 20 generates identification information whereby an image file to be generated based on the compressed image data thereof can individually be identified (e.g., file name). Incidentally, with the following description, the identification information whereby an image file can individually be identified will also be referred to as "file identification information".

Also, the central processing unit 20 is configured so as to detect the position of the digital camera 1 (position represented with longitude and latitude) by communicating with an artificial satellite for GPS (Global Positioning System) via a GPS receiver 32. Incidentally, with the following description, the position of the digital still camera 1 to be detected by taking advantage of GPS will also be referred to as "camera position".

Subsequently, at the time of the shooting mode, if the release signal has been input, the central processing unit 20 takes advantage of GPS at the time of the input thereof to detect the current camera position particularly as a shooting position when photographically shooting a subject.

Further, the central processing unit 20 counts the current date by an internal timer. Subsequently, if the release signal has been input, the central processing unit 20 detects the date at the time of the input thereof, and takes this detected date as the shot date when a subject is photographically taken.

Thus, when generating an image file, the central processing unit 20 stores file identification information, shot position information indicating the shot position, shot date information indicating the shot date, and the like in the header data of the header portion of the compressed image data as various types of information relating to a photo image.

Thus, after generating an image file, the central processing unit 20 transmits this generated image file to the recording device 33 along with the thumbnail data, and records the image file and the thumbnail data in this recording device 33 in a correlated manner. Thus, the central processing unit 20 allows the user to photographically shoot a subject, whereby the photo image data obtained as a result thereof can be recorded as an image file.

Incidentally, the recording device 33 is nonvolatile memory of around several Giga bytes through several tens of Giga bytes, and is housed in the digital still camera 1 beforehand, or is detachably provided to the digital still camera 1 such as a memory card.

Also, nonvolatile memory 34 such as EEPROM (Electrically Erasable Programmable Read Only Memory) or MRAM (Magnetoresistive Random Access Memory) or the like is connected to the central processing unit 20 apart from the recording device 33.

Subsequently, the central processing unit 20 stores various types of information indicating the setting content set by the user regarding various types of setting items, information that has to be held after power off, and so forth in this nonvolatile memory 34.

On the other hand, when the operation mode is instructed to be switched to the reproduction mode, for example, by the reproducing button 10 of the operating unit 23 being press-operated, or by a tapping operation as to the touch panel 7A, the central processing unit 20 operates under the reproduction mode.

At the time of the reproduction mode, the central processing unit 20 reads out, for example from the recording device 33, the image file of which the shot date is the latest of image files stored therein. Subsequently, the central processing unit 20 takes out compressed image data from the image file thereof to transmit this to the digital processing unit 31.

At this time, under the control of the central processing unit 20, the digital processing unit 31 subjects the compressed image data provided from this central processing unit 20 to decompression decoding processing to generate the original photo image data. Subsequently, the digital processing unit 31 transmits the photo image data thereof to the liquid crystal panel 7B, thereby displaying the photo image based on the photo image data on this liquid crystal panel 7B.

In this way, the central processing unit 20 displays the photo image generated by photographically shooting a subject on the liquid crystal panel 7B, thereby allowing the user to view this.

Incidentally, at this time, the central processing unit 20 generates presenting image data for presenting buttons and icons and so forth, and transmits this generated presenting image data to the digital processing unit 31. Accordingly, if the presenting image data has been provided from the central processing unit 20, the digital processing unit 31 synthesizes the presenting image data thereof and the photo image data to generate synthesized image data, and transmits this to the liquid crystal panel 7B. Thus, the digital processing unit 31 not only can display a photo image on the liquid crystal panel 7B, but also can display a button or icon or the like in a manner overlaid on this photo image.

Also, at the time of the reproduction mode, if switching of the display of a photo image has been instructed, for example, by a tapping operation as to the touch panel 7A, the central processing unit 20 reads out the image file of a photo image of which the shot date is earlier than the currently displayed photo image from the recording device 33. Subsequently, the central processing unit 20 takes out compressed image data from the image file thereof to transmit this to the digital processing unit 31.

At this time, under the control of the central processing unit 20, the digital processing unit 31 subjects the compressed image data to decompression decoding processing in the same way as described above to generate the original photo image data, and transmits this generated photo image data to the liquid crystal panel 7B.

Thus, the digital processing unit 31 switches the photo image to be displayed on the liquid crystal panel 7B. Thus, the central processing unit 20 allows the user to view the photo image by switching the photo image to be displayed on the liquid crystal panel 7B.

1-3. Image-Related Information Registration Processing to Database for Search

Next, description will be made regarding image-related information registration processing for registering image-related information relating to a photo image in the database for search used for detection of a photo image.

At the time of the shooting mode, upon generating photo image data, the digital processing unit 31 generates compressed image data and thumbnail data based on this photo image data in the same way as described above. Subsequently, the digital processing unit 31 transmits the compressed image data and thumbnail data generated based on the photo image data thereof to the central processing unit 20.

However, the digital processing unit 31 holds face feature information indicating the features of a face for detection reference (the shape and color of a face, the shapes of eyes, nose, mouth, and eyebrows, etc.) obtained by analyzing the images of a great number of faces beforehand, and learning based on the analysis results thereof. Incidentally, with the following description, the features of the face for detection reference will also be referred to as "reference face features", and face feature information indicating the reference face features will also be referred to as "reference face feature information".

Accordingly, after generating photo image data, subsequently to generation of compressed image data and thumbnail data based on the photo image data thereof, the digital processing unit 31 uses the reference face feature information to execute face detection processing as to the photo image based on this photo image data.

As a result thereof, after detecting a single person's face or multiple person's faces within the photo image based on the photo image data thereof, the digital processing unit 31 detects the size(s) and position(s) of the single face portion or multiple face portions (hereafter, also referred to as "face portions") detected within the photo image thereof. Subsequently, the digital processing unit 31 also transmits the photo image data thereof, and face detection information indicating the size(s) and position(s) of the single face portion or multiple face portions to the central processing unit 20.

In the event that the compressed image data and the thumbnail data have been provided from the digital processing unit 31, as described above, the central processing unit 20 generates an image file based on the compressed image data thereof. Subsequently, the central processing unit 20 records the image file thereof and the thumbnail data in the recording device 33 in a correlated manner.

Also, subsequently, in the event that the photo image data and the face detection information have been provided from the digital processing unit 31, based on the face detection information thereof, the central processing unit 20 determines a single face portion or multiple face portions within the photo image based on the photo image data to analyze this determined face portion(s).

Thus, the central processing unit 20 detects the features of the single face or multiple faces reflected in the photo image (the shape and color of a face, the shapes of eyes, nose, mouth, and eyebrows, etc.) for registration to the database for search.

Incidentally, with the following description, the features detected for registration to the database for search from a face reflected in the photo image will also be referred to as "registered face features", face feature information indicating this registered face features will also be referred to as "registered face feature information".

Such as illustrated in FIG. 3, the central processing unit 20 registers the registered face feature information or the like as image-related information into, for example, the recording device 33 to build a database DB for search used for detection of photo images.

Accordingly, after detecting the registered face features of the single face for multiple faces, the central processing unit 20 compares the registered face feature information indicating the detected registered face features with the registered face feature information already registered in the database DB for search.

As a result thereof, in the event that the registered face feature information indicating the registered face features detected at this time has not been registered in the database DB for search, the central processing unit 20 generates personal identification information whereby the person of the face thereof can individually be identified.

Incidentally, the personal identification information is not information for determining who a person is such as a name, and is generated to simply distinguish the person thereof from other persons, for example, as a number sequentially appended to individual persons.

Also, the central processing unit 20 crops out the face portion of the person thereof from a photo image as a predetermined shaped face image such as a circle. Further, the central processing unit 20 subjects the face image to, for example, reduction processing wherein pixels are thinned out to generate an icon indicating the face of the person thereof (hereafter, also referred to as "face icon").

Subsequently, the central processing unit 20 registers, such that the personal identification information is recorded in the recording device 33, this personal identification information in the database DB for search. Also, the central processing unit 20 registers, such that a face icon, file identification information, shot date information, and shot position information are recorded in the recording device 33 as well as the registered face feature information, these in the database DB for search in a manner correlated with the personal identification information.

In this way, each time a new person is photographically taken, the central processing unit 20 registers the photographically taken new person thereof in the database DB for search as personal identification information. Also, each time a new person is photographically taken, the central processing unit 20 registers registered face feature information indicating the registered face features of this person, and an icon indicating the person thereof in the database DB for search in a manner correlated with the personal identification information of the person thereof.

Further, each time a new person is photographically taken, the central processing unit 20 also registers the file identification information of an image file generated at the photo shooting thereof, and shot date information and shot position information indicating the shot date and the shot place of this person in the database DB for search in a manner correlated with the personal identification information. Incidentally, at this time, the central processing unit 20 mutually correlates a set of file identification information, shot date information, and shot position information in the database DB for search.

On the other hand, with the central processing unit 20, in the event that the registered face features detected at this time has already been registered in the database DB for search as registered face feature information, the personal identification information corresponding to this registered face features has also already been registered in the database DB for search.

Also, with the central processing unit 20, in the event that the registered face features detected at this time has already been registered in the database DB for search as registered face feature information, the face icon corresponding to this registered face features has also already been registered in the database DB for search.

Therefore, in the event that the registered face feature information generated according to detection of a face has already been registered in the database DB for search, at this time, the central processing unit 20 does not particularly generate the personal identification information of the person of the face thereof. Also, at this time, the central processing unit 20 does not particularly generate a face icon indicating the face of the person thereof.

Accordingly, the central processing unit 20 this time registers, such that the file identification information of an image file generated by photographically shooting the person thereof is recorded in the recording device 33, the file identification information thereof in the database DB for search in a manner additionally correlated with the personal identification information of this person.

Also, the central processing unit 20 this time registers, such that the shot date information indicating the shot date when the person thereof was photographically taken is recorded in the recording device 33, the shot date information thereof in the database DB for search in a manner additionally correlated with the personal identification information of this person.

Further, the central processing unit 20 this time registers, such that the shot position information indicating the shot place where the person thereof was photographically taken is recorded in the recording device 33, the shot position information thereof in the database DB for search in a manner additionally correlated with the personal identification information of this person.

Thus, in the event that the same person has photographically been taken twice or more, in each case, the central processing unit 20 registers the file identification information of an image file, the shot date information and shot position information indicating a shot date and a shot place in the database DB for search in a manner correlated with the registered personal identification information.

Incidentally, in the event that the same person has photographically been taken over and over again, the central processing unit 20 mutually correlates a set of file identification information, shot date information, and shot position information at the database DB for search for each photo shooting.

Also, in the event that the faces of multiple persons are reflected in one photo image, the central processing unit 20 registers the same file identification information, shot date information, and shot position information in the database DB for search in a manner correlated with the personal identification information of each of the multiple persons.

Incidentally, in the event that the faces of multiple persons are reflected in a photo image, the central processing unit 20 detects the distance of mutual faces, the directions of mutual faces, whether or not the faces are smiling faces, and so forth based on the face detection information, and the analysis results of face portions. Subsequently, based on the detection results thereof, the central processing unit 20 detects the intimacy degree of multiple persons reflected in the photo image.

Actually, with the central processing unit 20, the closer the distance of the faces of persons reflected in a photo image is, the higher the intimacy degree of the persons thereof is, and the farther the distance thereof is, the lower the intimacy degree of the persons thereof is.

Also, with the central processing unit 20, in the event that the faces of persons reflected in a photo image are mutually directed to the partner's face, and both are smiling faces, the intimacy degree of the persons thereof is high. On the other hand, with the central processing unit 20, even in the event that the faces of persons reflected in a photo image are mutually directed to the partner's face, when only one of the persons has a smiling face, and the other person has no smiling face, the intimacy degree of the persons thereof is low, and when both have no smiling face, the intimacy degree is even lower.

Further, with the central processing unit 20, even in the event that one of the faces of persons reflected in a photo image is directed to the partner's face, when the other face is directed to another direction different from the partner, the intimacy degree of the persons thereof is low. Also, with the central processing unit 20, in the event that the faces of persons reflected in a photo image are mutually directed to a direction different from the partner's face, the intimacy degree of the persons thereof is even lower.

After detecting the intimacy degree of multiple persons reflected in a photo image based on such multiple detection references, the central processing unit 20 compares the intimacy degree thereof with a predetermined threshold. Also, based on the comparison result thereof, the central processing unit 20 generates intimacy correlated information for correlating persons having an intimacy degree equal to or greater than a threshold. Incidentally, the central processing unit 20 generates, for each person, intimacy correlated information indicating the personal identification information of a partner having a high intimacy degree with the person thereof.

Subsequently, the central processing unit 20 registers, so as to record the intimacy correlated information of each person in the recording device 33, this intimacy correlated information in the database DB for search in a manner correlated with the personal identification information of the person thereof.

In this way, each time photo shooting is performed, the central processing unit 20 determines whether or not multiple persons' faces are reflected in the photo image thereof. Subsequently, when multiple persons' faces are reflected in the photo image thereof, the central processing unit 20 correlates, so as to detect the intimacy degree of the persons thereof, persons having a high intimacy degree on the database DB for search.

Incidentally, when a person's face is not reflected in the photo image based on photo image data, the digital processing unit 31 transmits only the compressed image data and thumbnail data generated based on the photo image data thereof to the central processing unit 20.

Accordingly, in the event that only the compressed image data and thumbnail data have been provided from the digital processing unit 31, the central processing unit 20 generates an image file such as described above, and records the image file thereof and the thumbnail data in the recording device 33 in a correlated manner.

Also, at this time, the central processing unit 20 records the file identification information of the image file generated at this photo shooting in the recording device 33 along with the shot date information and the shot position information indicating the shot date and shot place of this photo shooting, as information for registration. Thus, the central processing unit 20 registers a set of file identification information, shot date information, and shot position information obtained at this photo shooting in the database DB for search in a mutually correlated manner.

In this way, in the event that a subject other than persons has photographically been shot, the central processing unit 20 does not register personal identification information and registered face feature information and the like relating to a person in the database DB for search, and registers the file identification information, shot date information, and shot position information obtained at this photo shooting.

In addition to this, in the event that photo shooting has been performed for the first time, regardless of the photo shooting thereof being a subject (regardless of a person, scene, or the like), the central processing unit 20 assumes that some sort of event has been performed to generate event identification information whereby this event can individually be identified.

Incidentally, the event identification information is not information for determining what the event is such as an event name, and is generated, for example, as a number sequentially appended to an individual event to simply distinguish the event thereof from other events.

Subsequently, the central processing unit 20 registers, such that the event identification information thereof is recorded in the recording device 33, this event identification information in the database DB for search in a manner correlated with a set of file identification information, shot date information, and shot position information obtained at this photo shooting.

Also, when registration of event identification information to the database DB for search is completed, the central processing unit 20 records the shot date information, shot position information, and event identification information obtained this time, for example, in the recording device 33 as not information for registration but information for event determination.

In this state, in the event that the second photo shooting has been performed, the central processing unit 20 reads out the information for event determination (the shot date information, shot position information, and event identification information obtained the last time, i.e., the first photo shooting) from the recording device 33.

Subsequently, based on the shot place of this photo shooting, and the shot place of the last photo shooting, the central processing unit 20 determines whether or not this shot position is included in a circle area with the last shot position as the center, and with a predetermined first distance as a radius.

Also, based on the shot date of this photo shooting, and the shot date of the last photo shooting, the central processing unit 20 also determines whether or not elapsed time from the last shot date to this shot date is included in a predetermined first time.

Incidentally, with the following description, a circle area with the last shot position as the center, and with the predetermined first distance as a radius will also be referred to as the last shot area. Also, with the following description, the elapsed time from the last shot date to this shot date will also be referred to as shooting pause elapsed time. Subsequently, the above first time is arbitrarily selected, for example, for several minutes through tens of minutes.

Incidentally, when there is almost no obstacle which disturbs communication with an artificial satellite for GPS in the circumference such as an outdoor riverside location, a sports playing field, or the like, the central processing unit 20 can detect the camera position and shot position with high precision.

However, when there is an obstacle which disturbs communication with an artificial satellite for GPS in the circumference such as indoor, the valley between high buildings, or the like, with the central processing unit 20, the detection accuracy of the camera position and shot position decreases, and accordingly, there may be caused large error regarding the camera position and shot position thereof.

Therefore, the above first distance that stipulates the last shot area is arbitrarily selected from several meters through tens of kilometers whereby the digital camera 1 can be moved on foot within the above first time.

That is to say, in the case that the camera position or shot position changes by distance where the digital camera 1 is not moved during the first time, and accordingly, large error is caused at this camera position and shot position, the first distance is selected so as to determine this case according to a combination with the first time.

In the event that this shot position is included in the last shot area, and also the shooting pause elapsed time is included in the first time, the central processing unit 20 determines that this photo shooting has been performed at the same event as that of the last photo shooting.

Also, in the event that this shot position is not included in the last shot area, but the shooting pause elapsed time is included in the first time, the central processing unit 20 assumes that error is caused at the shot position, and determines that this photo shooting has been performed at the same event as that of the last photo shooting.

On the other hand, in the event that this shot position is not included in the last shot area, and also the shooting pause elapsed time is longer than the first time, the central processing unit 20 determines that this photo shooting has been performed at an event different from that of the last photo shooting.

Further, in the event that this shot position is included in the last shot area, but the shooting pause elapsed time is longer than the first time, at this time, the central processing unit 20 also determines that this photo shooting has been performed at an event different from that of the last photo shooting.

After determining that this photo shooting has been performed at the same event as that of the last photo shooting, the central processing unit 20 records the same event identification information as that at the last photo shooting (the event identification information read out this time from the recording device 33) in the recording device 33 as information for registration.

Thus, the central processing unit 20 registers the same event identification information as that of the last photo shooting in the database DB for search in a manner correlated with a set of the file identification information, shot date information, and shot position information obtained at this photo shooting.

After registration of the event identification information to the database DB for search is completed, the central processing unit 20 takes the shot date information and shot position information indicating the shot date and shot place at this time, and the event identification information at this time as new information for event determination.

Subsequently, the central processing unit 20 transmits the information for event determination (the shot date information, shot position information, and event identification information at this time) to the recording device 33, and records this on the recorded information for event determination in an overwrite manner.

On the other hand, after determining that this photo shooting has been performed at a new event different from that of the last photo shooting, the central processing unit 20 generates new event identification information whereby the new event thereof can individually be identified.

Subsequently, the central processing unit 20 registers, such that the newly generated event identification information is recorded in the recording device 33, this event identification information in the database DB for search in a manner correlated with a set of the file identification information, shot date information, and shot position information obtained at this photo shooting.

Also, after registration of the event identification information to the database DB for search is completed, the central processing unit 20 takes the shot date information and shot position information indicating the shot date and shot place at this time, and the newly generated event identification information as new information for event determination.

Subsequently, the central processing unit 20 transmits the information for event determination (the shot date information, and shot position information at this time, and the newly generated event identification information) to the recording device 33, and records this on the recorded information for event determination in an overwrite manner.

In the event that further photo shooting has been performed after the second photo shooting, in each case, the central processing unit 20 reads out the information for event determination (shot date information, shot position information, and event identification information) recorded at the last time from the recording device 33 in the same way as with the second photo shooting.

Subsequently, based on the shot place and shot date at this photo shooting, and the shot place and shot data at the last photo shooting, the central processing unit 20 determines whether or not this photo shooting has been performed at the same event as that of the last photo shooting.

As a result thereof, in the event that this photo shooting has been performed at the same event as that of the last photo shooting, the central processing unit 20 takes the last event identification information as this event identification information. Subsequently, the central processing unit 20 registers this event identification information (actually, the last event identification information) in the database DB for search in a manner correlated with a set of the file identification information, shot date information, shot position information obtained at this photo shooting.

Also, the central processing unit 20 records the shot date information and shot position information at this time, and the event identification information at this time in the recording device 33 as new information for event determination to update the information for event determination recorded at the last time.

On the other hand, in the event that this photo shooting has been performed at an event different from that of the last time, the central processing unit 20 generates new event identification information. Subsequently, the central processing unit 20 registers the new generated event identification information thereof in the database DB for search in a manner correlated with a set of the file identification information, shot date information, and shot position information obtained at this photo shooting.

Also, the central processing unit 20 records the shot date information and shot position information at this time, and the new event identification information in the recording device 33 as new information for event determination to update the information for event determination recorded at the last time.

Thus, the central processing unit 20 is configured so that photo images registered in the database DB for search can be classified into events such as a party where photo shooting has been performed, an athletic meeting, a walk of the neighborhood, and so forth while performing photo shooting.

Incidentally, after returning to the shooting mode again to perform photo shooting after proceeding from the shooting mode to another mode, at this time, the central processing unit 20 reads out the information for event determination recorded at the last time (at the last photo shooting in the shooting mode before transition to another mode) from the recording device 33. Incidentally, another mode is the reproducing mode, a setting mode for setting shooting conditions, or the like.

Now, after turning on the power to proceed to the shooting mode again for photo shooting through power off from the shooting mode, the central processing unit 20 also reads out the information for event determination recorded at the last time (at the last photo shooting in the shooting mode before power off) from the recording device 33.

Subsequently, after proceeding to the shooting mode by another mode or turning on the power, and performing photo shooting, in the same way as described above, the central processing unit 20 uses the information for event determination thereof to determine the event, and additionally registers the event identification information in the database DB for search.

Thus, such as described above, even though temporarily ending the shooting mode, in the event of the photo shootings before and after this ending being performed at the same event, the central processing unit 20 can accurately determine the event thereof to classify photo images, obtained before and after this ending, into the same event.

In this way, each time photo shooting is performed, the central processing unit 20 registers personal identification information, registered face feature information, face icon, and intimacy correlated information in the database DB for search as image-related information as appropriate to update the content of the database DB for search.

Also, each time photo shooting is performed, the central processing unit 20 also registers file identification information, shot date information, shot position information, and event identification information in the database DB for search as image-related information to update the content of the database DB for search.

1-4. Search Key Presenting Processing at the Time of Shooting Mode

Next, description will be made regarding search key presenting processing for realizing a search key function for presenting a search key for photo image search according to a shooting state at the time of the shooting mode. Though the details will be described below, the central processing unit 20 is configured so as to present a person's face reflected in the shooting status presenting image, and a search key for photo image search according to the camera position, when in the shooting mode.

Actually, the central processing unit 20 is configured so as to take advantage of a face icon indicating the face of a person, and a camera position icon indicating the camera position on a map as such a search key. However, the central processing unit 20 allows the user to select whether or not the search key presenting processing is executed at the time of the shooting mode on a predetermined setting screen, and sets this.

Also, in the event that the user has selected so as to execute the search key presenting processing at the time of the shooting mode, the central processing unit 20 allows the user to select at least one of the face icon and the camera position icon as a search key to be actually presented on the setting screen, and sets this.

Accordingly, first, description will be made below regarding the search key presenting processing to be executed in a state in which the search key presenting function is set to be realized with the first setting content for presenting both of the face icon and the camera position icon at the time of the shooting mode.

Next, description will be made regarding the search key presenting processing to be executed in a state in which the search key presenting function is set to be realized with the second setting content for presenting only the face icon without presenting the camera position icon at the time of the shooting mode.

Subsequently, description will be made regarding the search key presenting processing to be executed in a state in which the search key presenting function is set to be realized with the third setting content for presenting only the camera position icon without presenting the face icon at the time of the shooting mode.

First, after proceeding to the shooting mode in a state in which the search key presenting function is set to be realized with the first setting content, the central processing unit 20 controls the digital processing unit 31 according to the first setting content thereof during the shooting mode.

Also, the central processing unit 20 executes the first camera position detection processing for using the GPS at the time of proceeding to the shooting mode to detect the camera position. Further, the central processing unit 20 also periodically (e.g., with five-minute interval regardless of the input timing of the release signal) executes the camera position detection processing subsequently to the first camera position detection processing during the shooting mode.

Actually, after executing the camera position detection processing, the central processing unit 20 communicates with artificial satellite for GPS via the GPS receiver 32, and continuously detects the camera position by a predetermined number of times over a short amount of time. Subsequently, the central processing unit 20 detects, for example, distances between camera positions detected multiple times in a round robin.

As a result thereof, when the multiple camera positions are almost matched (i.e., any distance between multiple camera positions is equal to or shorter than a predetermined second distance), the central processing unit 20 determines that the camera positions have accurately been detected. In this case, the central processing unit 20 detects the intermediate position of these multiple camera positions as the current camera position of the digital still camera 1.

However, when the multiple camera positions vary (i.e., at least one of the distances between multiple camera positions is longer than the second distance), the central processing unit 20 determines that the detection accuracy of the camera positions deteriorates, and accordingly, the camera positions are not accurately detected. In this case, the central processing unit 20 halts the camera position detection processing (i.e., detection of the current camera position).

In this way, the central processing unit 20 periodically executes the camera position detection processing during the shooting mode, but only when the detection accuracy of the camera positions is high, detects the current camera position.

After detecting the current camera position, in each case, the central processing unit 20 executes icon generating processing for generating a camera position icon for indicating the camera position on a map. In this case, in the event that no camera position icon has been generated, the central processing unit 20 sets, for example, a quadrangular seeking area having a predetermined extent with the current camera position detected at this time as the center.

Incidentally, with the seeking area, for example, the length of a diagonal line passing through the current camera position is arbitrarily selected between several kilometers and a hundred kilometers or so, and the width is determined based on the length of the diagonal line.

Subsequently, the central processing unit 20 compares the seeking area with the shot position information registered in the database DB for search. As a result thereof, upon detecting the shot position information indicating a shot position within the seeking area out of the shot position information registered in the database DB for search, the central processing unit 20 sets this seeking area to a search area where a photo image can be detected according to the current camera position.

That is to say, in the event that a shot position within the seeking area can be detected, the photo image obtained by taking an image within the seeking area has already been registered in the database DB for search, and a photo image can be detected within this seeking area, and accordingly the central processing unit 20 sets this seeking area as the search area.

Now, for example, the map image data of a map image has already been stored in the recording device 33. Accordingly, when setting the search area, the central processing unit 20 reads out a portion equivalent to the search area within the map image data as area map image data.

Subsequently, the central processing unit 20 crops out, for example, a circular partial map image with the current camera position as the center from the search area map image based on the area map image data thereof. Also, the central processing unit 20 synthesizes the partial map image with the image of a predetermined mark indicating the current camera position, and then subjects this to, for example, reduction processing for thinning out pixels. Thus, the central processing unit 20 generates a camera position icon which indicates the current camera position on the partial map image thereof, and can be used as a search key for photo image search.

Also, after generating a camera position icon, the central processing unit 20 records the camera position icon thereof, area information indicating the search area, area map image data, and camera position information indicating the current camera position, for example, in the RAM 22 in a correlated manner.

However, in the event that no shot position within the seeking area has been detected (i.e., shot position information indicating a shot position within the seeking area has not been registered in the database DB for search), the central processing unit 20 halts the icon generating processing at this time.

Thus, after executing the icon generating processing in a state in which no camera position icon has been generated, the central processing unit 20 sets the search area according to detection of a shot position within the seeking area, and also generates a camera position icon.

Incidentally, after executing the icon generating processing in a state in which a camera position icon has already been generated, the central processing unit 20 reads out the camera position information recorded along with the camera position icon and so forth from the RAM 22 (hereafter, also referred to as "past camera position information").

Subsequently, the central processing unit 20 detects camera movement distance between the current camera position detected at this time, and the camera position indicated by the past camera position information (hereafter, also referred to as "past camera position"), and compares this detected camera movement distance with predetermined third distance. Incidentally, the third distance is arbitrarily selected, for example, between several kilometers and tens of kilometers or so.

As a result thereof, when the camera movement distance is equal to or shorter than the third distance, and the current camera position does not very far away from the past camera position, the central processing unit 20 halts the icon generating processing.

On the other hand, in the event that the camera movement distance is longer than the third distance, and the current camera position is relatively far from the past camera position, the central processing unit 20 sets the seeking area with the current camera position as the center in the same way as described above.

Subsequently, the central processing unit 20 compares the seeking area thereof with the shot position information registered in the database DB for search. As a result thereof, after detecting the shot position information indicating a shot position within the seeking area out of the shot position information registered in the database DB for search, the central processing unit 20 sets this seeking area as a new search area.

Also, the central processing unit 20 reads out a portion equivalent to the new search area in the map image data from the recording device 33 in the same way as described above as new area image data. Subsequently, the central processing unit 20 generates a camera position icon indicating the current camera position on the map based on the new area map image data thereof again in the same way as described above.

Also, after generating a camera position icon again, the central processing unit 20 records this camera position icon in the RAM 22 along with the area information, area map image data, and camera position information obtained this time. In this way, the central processing unit 20 updates the camera position icon, area information, area map image data, and camera position information to be recorded in the RAM 22 to the newest.

However, in this case as well, when no shot position is detectable within the new seeking area (i.e., shot position information indicating a shot position within the seeking area has not been registered in the database DB for search), the central processing unit 20 halts the icon generating processing at the time thereof.

Thus, after executing the icon generating processing in a state in which a camera position icon has already been generated, the central processing unit 20 updates the search area and the camera position icon according to detection of a shot position within the new seeking area.

On the other hand, upon proceeding to the shooting mode, under the control of the central processing unit 20, each time unit image data is generated, the digital processing unit 31 also executes face detection processing as to this unit image data using the reference face feature information.

As a result of the face detection processing being executed, upon detecting a single person's face portion or multiple person's face portions within the unit image based on the unit image data, the digital processing unit 31 also detects the size(s) and position(s) of the single person's face portion or multiple person's face portions detected within the unit image thereof.

Subsequently, after detecting the size(s) and position(s) of the single person's face portion or multiple person's face portions within the unit image based on the unit image data, the digital processing unit 31 transmits the unit image data thereof to the central processing unit 20 along with face detection information indicating the size(s) and position(s) of the single person's face portion or multiple person's face portions.

The central processing unit 20 executes icon detection processing for detecting a face icon according to the face detection processing of the digital processing unit 31. Thus, each time the face detection information and the unit image data are provided from the digital processing unit 31, based on this face detection information the central processing unit 20 determines a single person's face portion or multiple person's face portions within the unit image based on the unit image data, and analyzes the determined face portion(s).

Thus, the central processing unit 20 detects the features (the shape and color of a face, the shapes of eyes, nose, mouth, and eyebrows, etc.) of a single person's face or multiple person's faces reflected in the unit image. Also, each time the face detection information and the unit image data are provided from the digital processing unit 31, the central processing unit 20 sequentially compares the features of the detected single person's face or multiple person's faces.

As a result thereof, after continuously detecting the features of the face of the same person out of a predetermined number of unit images that continue during predetermined second time, the central processing unit 20 determines the features of the detected face thereof as features for comparison with the registered face features (i.e., registered face feature information) within the database DB for search.

Incidentally, the second time is arbitrarily selected, for example, for ten-odd seconds through tens of seconds. Also, with the following description, the features of the face of the same person continuously detected from a predetermined number of unit images that continue for the predetermined second time (i.e., the features of a face determined as for comparison with the registered face features) will also be referred to as comparative face features.

That is to say, the person of a continuously detected face is, for example, a family or acquaintance, and is reflected in a shooting status presenting image for a longer time to determine a composition and so forth, and has a high possibility to be photographically taken. Also, in the event that the person of a continuously detected face has a high possibility to be photographically taken this time, the person of a continuously detected face also has a high possibility that his/her photograph was taken in the past.

Therefore, the central processing unit 20 excludes the face of a person instantaneously reflected in the shooting status presenting image by crossing the shooting range, or the like, and the comparative face features of the face of a person reflected in this shooting status presenting image for a relatively longer time are employed for comparison with the registered face features.

After obtaining the first comparative face features in the icon detection processing, the central processing unit 20 compares the comparative face features thereof with the registered face features within the database DB for search. As a result thereof, after detecting the registered face features matched with the comparative face features out of the registered face features within the database DB for search, the central processing unit 20 sets the comparative face features as face features for search whereby a photo image is detectable.

That is to say, after detecting the registered face features matched with the comparative face features, the central processing unit 20 has already registered the photo image obtained by the person of a face having the comparative face features being photographically taken, in the database DB for search, whereby the photo image can be searched by the comparative face features. Accordingly, the central processing unit 20 sets the comparative face features as the face features for search used for photo image search.

After setting the comparative face features as the face features for search, the central processing unit 20 detects the personal identification information and face icon corresponding to the registered face features matched with the face features for search within the database DB for search. Also, the central processing unit 20 reads out the detected face icon thereof from the database DB for search (recording device 33) as a search key for photo image search.

That is to say, the central processing unit 20 reads out a face icon indicating the face of a person reflected in the shooting status presenting image being displayed at this time for relatively longer time from the database DB for search (recording device 33) as a search key for photo image search.

Also, at this time, the central processing unit 20 also reads out the personal identification information detected along with the face icon from the database DB for search (recording device 33). Subsequently, the central processing unit 20 records the face feature information for search indicating the face features for search, face icon, and personal identification information, for example, in the RAM 22 in a correlated manner.

However, in the event that, though the comparative face features have been obtained, there are no registered face features matched with the comparative face features thereof (the registered face feature information indicating the registered face features matched with the comparative face features has not registered in the database DB for search), the central processing unit 20 does not set the comparative face features thereof as the face features for search. Subsequently, the central processing unit 20 does not execute the subsequent processing wherein the comparative face features thereof ought to be used as the face features for search.

Also, after detecting the second comparative face features in the icon detection processing, the central processing unit 20 compares the second comparative face features with the face features for search indicated by the face feature information for search recorded in the RAM 22.

As a result thereof, in the event that the second comparative face features are different from the face features for search indicated by the face feature information for search recorded in the RAM 22, the central processing unit 20 subsequently executes the same processing as with the case where the above first comparative face features were detected.

On the other hand, in the event that the second comparative face features are matched with the face features for search indicated by the face feature information for search recorded in the RAM 22, the central processing unit 20 does not set the second comparative face features thereof as the face features for search. Subsequently, the central processing unit 20 does not execute the subsequent processing wherein the second comparative face features thereof ought to be used as the face features for search.

Further, after detecting further several comparative face features after detection of the second comparative face features, in each case, the central processing unit 20 compares the detected comparative face features thereof with the face features for search indicated by all of the face feature information for searching, recorded in the RAM 22 by the point in time thereof.

As a result thereof, in the event that the comparative face features further detected after detection of the second comparative face features differ from the face features for search indicated by one of the face feature information for search recorded in the RAM 22, the central processing unit 20 subsequently executes the same processing as with the case where the above first comparative face features were detected.

On the other hand, in the event that the comparative face features further detected after detection of the second comparative face features are matched with the face features for search indicated by one of the face feature information for search recorded in the RAM 22, the central processing unit 20 does not set the further detected comparative face features as the face features for search. Subsequently, the central processing unit 20 does not execute the subsequent processing wherein the further detected comparative face features after detection of the second comparative face features ought to be used as the face features for search.

In this way, the central processing unit 20 sets, according to detection of the comparative face features of the face of a person reflected in the shooting status presenting image for relatively longer time, this comparative face features as the face features for search as appropriate, and also detects the face icon indicating the face thereof as a search key for photo image search.

Incidentally, the icon layout image data of an icon layout image, which becomes the origin of the icon presenting image data for presenting a camera position icon along with face icons, is recorded beforehand in the nonvolatile memory 34 whereby the camera position icon can be disposed along with the face icons.

Accordingly, after proceeding to the shooting mode, until a camera position icon or face icon is obtained as a search key such as described above, the central processing unit 20 reads out the icon layout image data from the nonvolatile memory 34. Subsequently, the central processing unit 20 transmits the icon layout image data thereof to the digital processing unit 31.

In the event of proceeding to the shooting mode, and the icon layout image data being provided from the central processing unit 20, each time unit image data is generated based on shot data, the digital processing unit 31 synthesizes this generated unit image data with the icon layout image data to generate synthesized image data.

Figure 4:
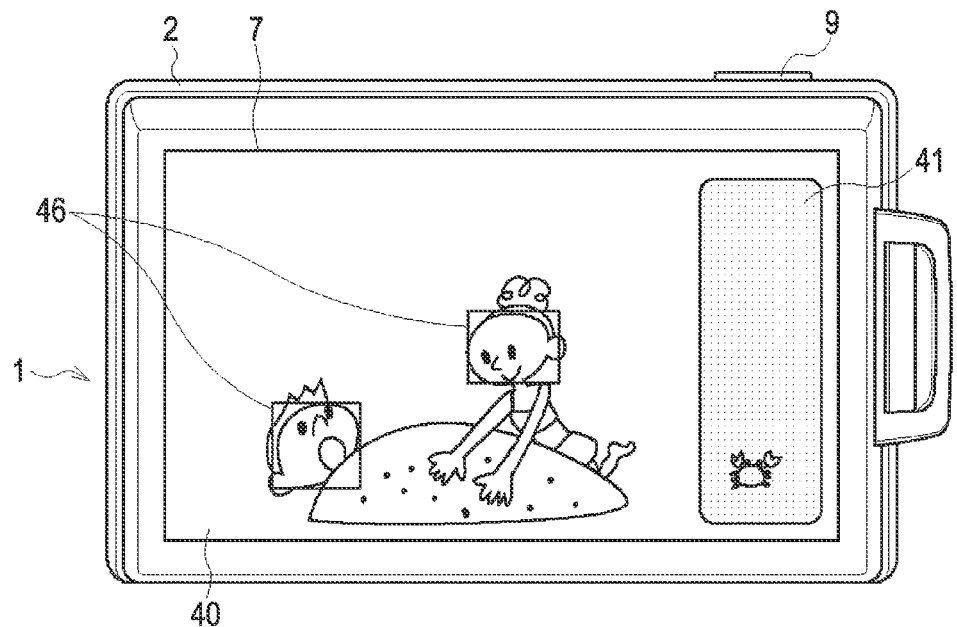
FIG. 4 is a schematic diagram for describing display of an icon layout image onto a shooting status presenting image.

Subsequently, the digital processing unit 31 sequentially transmits the synthesized image data to the liquid crystal panel 7B. Thus, such as illustrated in FIG. 4, the digital processing unit 31 displays a shooting status presenting image 40 on the liquid crystal panel 7B, and also displays a long strip-shaped icon layout image 41 in the image-vertical direction, for example, in a manner overlaid on the right edge portion in the image-horizontal direction of this shooting status presenting image 40.

Incidentally, the icon layout image 41 is generated so that the right edge portion of the shooting status presenting image 40 serving as a background can be seen though, for example, such as an open mesh pattern or polka-dot pattern drawn in monochrome such as white or gray.

Accordingly, the central processing unit 20 displays the icon layout image 41 in a manner overlaid on the shooting status presenting image 40, but prevents the shooting status from being unable to be confirmed by showing the overlaid portion of the icon layout image 41 in this shooting status presenting image 40 as much as possible.

In a state in which only the icon layout image 41 is displayed on the shooting status presenting image 40, for example, after generating a camera position icon serving as a search key, the central processing unit 20 synthesizes the camera position icon with the icon layout image data to generate icon presenting image data. Subsequently, the central processing unit 20 transmits the icon presenting image data to the digital processing unit 31.

In the event that the icon presenting image data has been provided from the central processing unit 20, subsequently, each time unit image data is generated, the digital processing unit 31 synthesizes this unit image data with the icon presenting image data instead of the icon layout image data to generate synthesized image data. Subsequently, the digital processing unit 31 sequentially transmits the synthesized image data thereof to the liquid crystal panel 7B.

Figure 5:
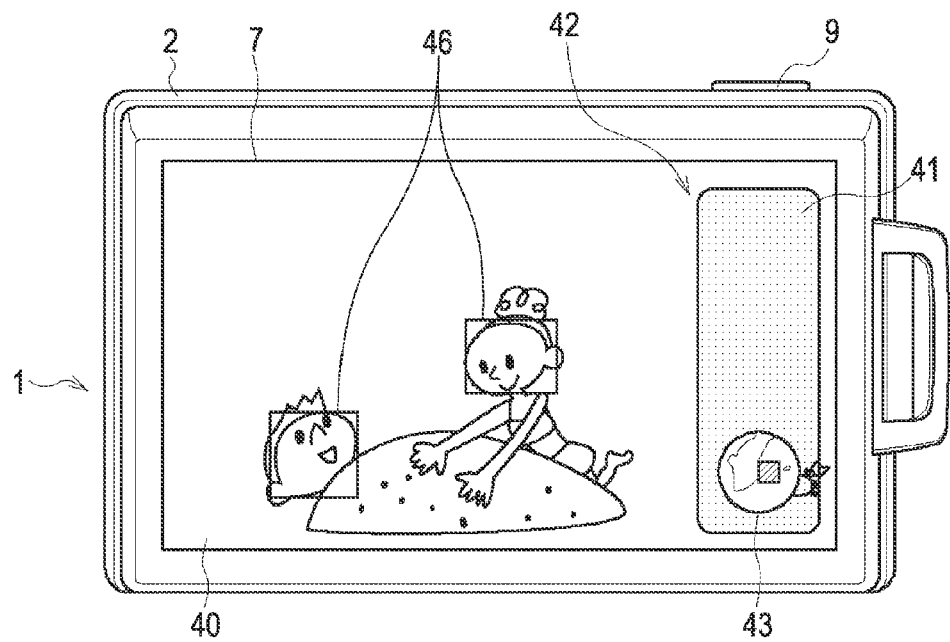
FIG. 5 is a schematic diagram for describing display of a camera position icon onto the shooting status presenting image.

Thus, such as illustrated in FIG. 5, the digital processing unit 31 displays the shooting status presenting image 40 on the liquid crystal panel 7B, and also displays the icon presenting image 42 in a manner overlaid on this shooting status presenting image 40.

In this case, the icon presenting image 42 includes the icon layout image 41 displayed in a manner overlaid on the right edge portion of the shooting status presenting image 40, and a camera position icon 43 serving as a search key for photo image search is disposed and displayed on this icon layout image 41.

Also, after generating a new camera position icon, the central processing unit 20 synthesizes the new camera position icon thereof with the icon layout image data to generate icon presenting image data again.

In this way, after updating the content of the icon presenting image data, the central processing unit 20 transmits the icon presenting image data of which the content has been updated to the digital processing unit 31.

In the event that the icon presenting image data of which the content has been updated has been provided from the central processing unit 20, the digital processing unit 31 switches the icon presenting image data to be used for generation of synthesized image data from one before updating to one after updating.

That is to say, in the event that the icon presenting image data has been updated, subsequently, each time unit image data is generated, the digital processing unit 31 synthesizes this unit image data with the icon presenting image data after updating instead of the icon presenting image data before updating to generate new synthesized image data. Subsequently, the digital processing unit 31 sequentially transmits the new synthesized image data thereof to the liquid crystal panel 7B.

Thus, the digital processing unit 31 displays the shooting status presenting image 40 on the liquid crystal panel 7B, and also with the icon presenting image 42 overlaid on this shooting status presenting image 40, changes the camera position icon 43 on the icon layout image 41 to a new camera position icon.

In this way, each time a new camera position icon is generated, with the icon presenting image 42, the central processing unit 20 updates the camera position icon 43 to be disposed on the icon layout image 41 to the new camera position icon.

Subsequently, in the event of displaying the camera position icon 43 on the liquid crystal panel 7B along with the shooting status presenting image 40, the central processing unit 20 is configured so as to allow the user to specify this camera position icon 43 as a search key for photo image search by a tapping operation.

Also, for example, in the event that the first face icon serving as a search key has been detected after generating a camera position icon, the central processing unit 20 synthesizes the camera position icon with the icon layout image data along with this first face icon to generate icon presenting image data again.

Thus, after updating the content of the icon presenting image data according to detection of the face icon, the central processing unit 20 transmits the icon presenting image data of which the content has been updated to the digital processing unit 31.

In the event that the icon presenting image data of which the content has been updated according to detection of the face icon has been provided from the central processing unit 20, the digital processing unit 31 switches the icon presenting image data to be used for generation of synthesized image data from one before updating to one after updating.

Accordingly, after updating of the icon presenting image data, each time unit image data is generated, the digital processing unit 31 synthesizes the icon presenting image data after updating instead of the icon presenting image data before updating with this unit image data to generate new synthesized image data. Subsequently, the digital processing unit 31 sequentially transmits the new synthesized image data thereof to the liquid crystal panel 7B.

Figure 6:
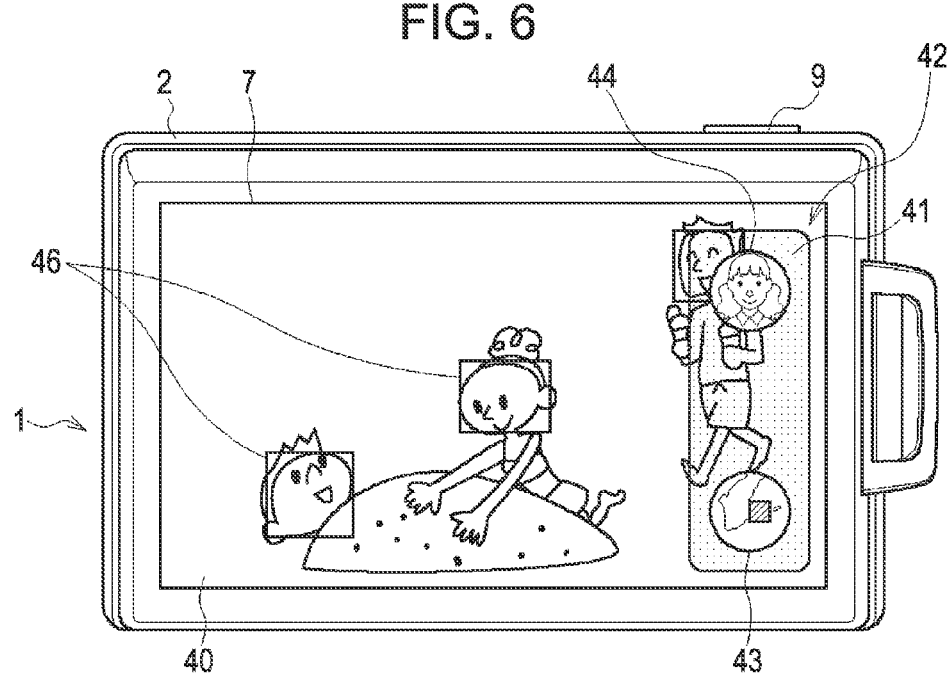
FIG. 6 is a schematic diagram for describing the display of a face icon onto the shooting status presenting image.

Thus, such as illustrated in FIG. 6, the digital processing unit 31 displays the shooting status presenting image 40 on the liquid crystal panel 7B, and also with the icon presenting image 42 overlaid thereupon, displays the camera position icon 43 serving as a search key for photo image search on the icon layout image 41. Also, at this time, with the icon presenting image 42, the digital processing unit 31 also disposes and displays a face icon 44 serving as a search key for photo image search on the icon layout image 41.

Further, after detecting the second face icon, the central processing unit 20 synthesizes the first and second face icons with the icon layout image data along with the camera position icon to generate icon presenting image data.

In this way, the central processing unit 20 updates the content of the icon representing image data again according to detection of the second face icon, and transmits this icon presenting image data of which the content has been updated to the digital processing unit 31.

In the event that the icon presenting image data of which the content has further been updated has been provided from the central processing unit 20, the digital processing unit 31 switches the icon presenting image data to be used for generation of synthesized image data from one before updating to the newest one after updating again.

Accordingly, after updating of the icon presenting image data, each time unit image data is generated, the digital processing unit 31 synthesizes the icon presenting image data after updating instead of the icon presenting image data before updating with this unit image data to generate new synthesized image data. Subsequently, the digital processing unit 31 sequentially transmits the new synthesized image data thereof to the liquid crystal panel 7B.

Figure 7:
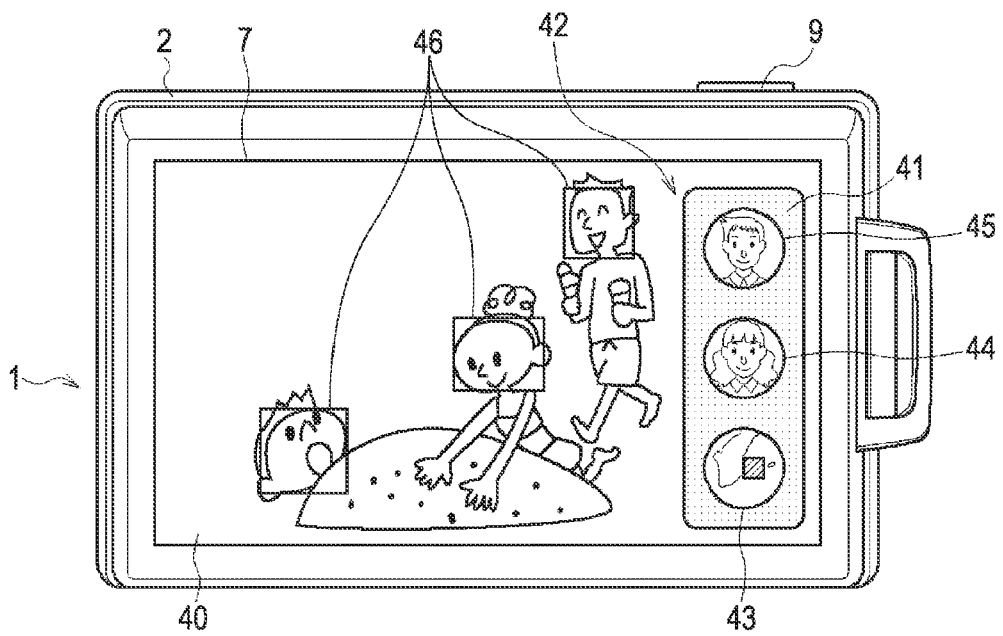
FIG. 7 is a schematic diagram for describing the additional display of a face icon onto the shooting status presenting image.

Thus, such as illustrated in FIG. 7, the digital processing unit 31 displays the shooting status presenting image 40 on the liquid crystal panel 7B, and also with the icon presenting image 42, additionally displays the second face icon 45 on the icon layout image 41.

In this way, each time the face icons 44 and 45 indicating the faces of the persons continuously reflected in the shooting status presenting image 40 are detected, the central processing unit 20 sequentially and additionally displays the detected face icons 44 and 45 on the icon layout image 41.

Subsequently, in the event of displaying the face icons 44 and 45 on the liquid crystal panel 7B along with the shooting status presenting image 40, the central processing unit 20 is configured so as to allow the user to specify the face icons 44 and 45 by a tapping operation as a search key for photo image search.

Incidentally, each time unit image data is generated such as described above, as a result of the face detection processing, upon detecting the size and position of a face portion along with the face of a person, the digital processing unit 31 generates, for example, the frame image data of a quadrangular frame image that surrounds the face portion thereof according to the size of the face portion thereof.

At this time, the digital processing unit 31 also synthesizes the frame image data according to the position of the face portion to the unit image data, and also synthesizes the icon layout image data and the icon presenting image data such as described above to generate synthesized image data. Subsequently, the digital processing unit 31 transmits the synthesized image data thereof to the liquid crystal panel 7B.

Thus, such as illustrated in FIGS. 4 through 7, the digital processing unit 31 displays a frame image 46 in a manner overlaid on the shooting status presenting image 40 displayed on the liquid crystal panel 7B so as to surround the face of a person (face detected within a unit image).

Incidentally, the frame image 46 to be displayed in a manner overlaid on the shooting status presenting image 40 is drawn, for example, with a predetermined initial-setting color such as green, and is used for notifying the user of detection of the face of a person, focusing on this face at the time of photo shooting, or the like.

However, if the comparative face features are set as the face features for search, such as described later, the central processing unit 20 takes advantage of the face of the face features for search reflected in the shooting status presenting image 40 as a search key for photo image search in a state reflected in this shooting status presenting image 40. Incidentally, with the following description, the face of the face features for search will also be referred to as "search utilization face".

Therefore, if the comparative face features is set as the face features for search, in response to this, the central processing unit 20 controls the digital processing unit 31 change the frame image 46 surrounding the search utilization face displayed in a manner overlaid on the shooting status presenting image 40 to, for example, a color different from the initial-setting color.

Also, even after the comparative face features is set as the face features for search, each time face features are detected from a unit image, the central processing unit 20 compares the detected face features with the face feature information for search recorded in the RAM 22.

Thus, the central processing unit 20 detects whether or not the search utilization face is reflected in the shooting status presenting image 40, and when the search utilization face thereof is reflected therein, changes the color of the frame image 46 surrounding this search utilization face.

Thus, while the search utilization face is reflected in the shooting status presenting image 40, the central processing unit 20 can notify the user that the search utilization face thereof is available as a search key by the color of the frame image 46 surrounding this search utilization face.

Incidentally, after proceeding to the shooting mode such as described above, the central processing unit 20 immediately executes the first camera position detection processing, and thereafter periodically executes the camera position detection processing. Subsequently, after executing the camera position detection processing, upon detecting the current camera position, the central processing unit 20 subsequently executes the icon generating processing.

Also, after proceeding to the shooting mode, the central processing unit 20 immediately causes the digital processing unit 31 to start the face detection processing, and when continuously detecting the face features of the same person, executes the icon detection processing.

Therefore, after detecting the current camera position in the first camera position detection processing, and generating a camera position icon in the subsequently executed icon generating processing, the central processing unit 20 first, in the same way as with the above case regarding FIGS. 4 through 7, displays the camera position icon 43. Subsequently to the display of the camera position icon 43, the central processing unit 20 additionally displays the face icons 44 and 45.

However, for example, in the event that the current camera position is undetectable in the first camera position detection processing, the central processing unit 20 may generate the face icons 44 and 45 before generating the camera position icon 43.

That is to say, for example, depending on the execution situation of the camera position detection processing, unlike the above case described regarding FIGS. 4 through 7, the processing unit 20 may first display the face icons 44 and 45, and then additionally display the camera position icon 43.

Therefore, with the following description, in the case that the face icons 44 and 45, and the camera position icon 43 do not particularly have to be distinguished, these face icons 44 and 45, and camera position icon 43 will also be referred to as search key icons collectively.

Actually, after generating the camera position icon 43, such as illustrated in FIGS. 5 through 7, with the icon layout image 41, for example, the central processing unit 20 disposes and displays the camera position icon 43 on the lower edge portion in the image-vertical direction.

Also, after detecting the face icons 44 and 45, with the icon layout image 41, the central processing unit 20 disposes and displays the latest face icons 44 and 45 on the upper edge portion in the image-vertical direction.

In accordance with this, the central processing unit 20 displays the face icons 44 and 45, and camera position icon 43 already disposed and displayed on the icon layout image 41 by sequentially lowering the locating positions thereof in the lower edge portion side in the image-vertical direction one step at a time.

Figure 8A:
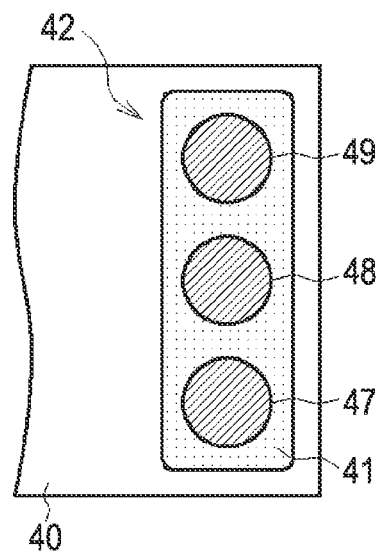
FIGS. 8A and 8B are schematic diagrams for describing the additional display of a search key icon.
Figure 8B:
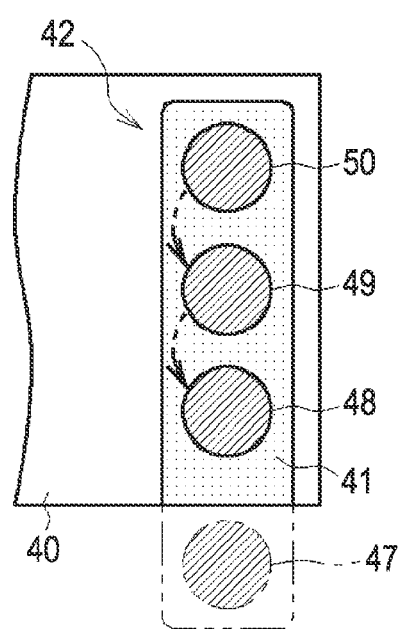

In this way, such as illustrated in FIGS. 8A and 8B, the central processing unit 20 disposes three search key icons 47 through 49 at a maximum in tandem along with the icon layout image 41, and collectively displays these on the liquid crystal panel 7B as the icon presenting image 42.

Also, after obtaining a search key icon 50, which exceeds a collectively displayable number, the central processing unit 20 adds the search key icon 50 on the icon layout image 41 such that the icon layout image 41 is expanded in the image-vertical direction.

However, at this time, the central processing unit 20 eliminates, along with the lower edge portion side of the icon layout image 41, the search key icon 47 disposed on this lower edge portion side from the liquid crystal panel 7B. That is to say, at this time, the central processing unit 20 expands the icon layout image 41 in the image-vertical direction to eliminate, along with the lower edge portion side, the search key icon 47 disposed on this lower edge portion side as if the search key icon 47 were allowed to exit to the outside of the shooting status presenting image 40.

Subsequently, if all of the search key icons 47 through 50 are not collectively displayable, the central processing unit 20 changes the color of the icon layout image 41 to a color different from the original color (e.g., light blue). Thus, if all of the search key icons 47 through 50 are not collectively displayable, the central processing unit 20 can notify the user that there is the search key icon 47 which is not displayable by change in the color of the icon layout image 41.

Figure 9A:
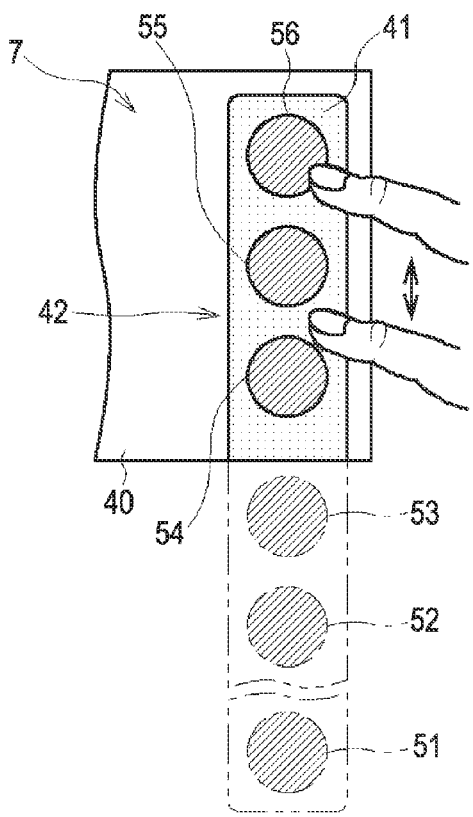
FIGS. 9A and 9B are schematic diagrams for describing the scroll display of the search key icon.
Figure 9B:
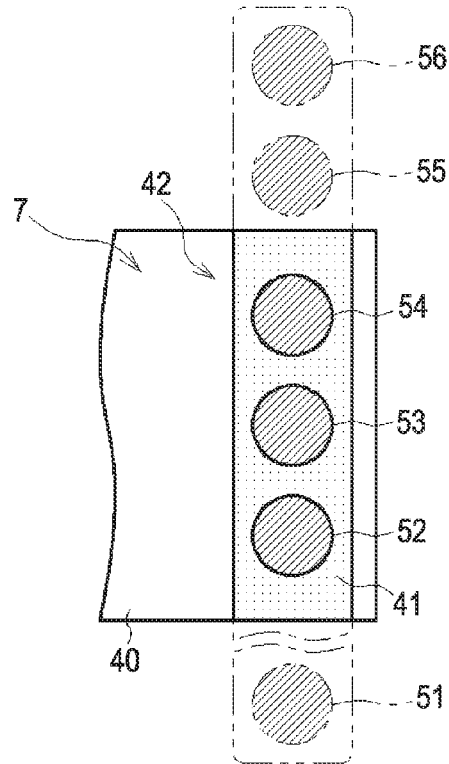

Also, such as illustrated in FIGS. 9A and 9B, in the event that the user has performed a sliding operation in the image-vertical direction above the icon layout image 41, in response to this, the central processing unit 20 scrolls the search key icons 51 through 56 in the image-vertical direction along with the icon layout image 41.

Accordingly, the central processing unit 20 moves the already displayed search key icons 51 through 56 to the outside of the shooting status presenting image 40 along with an already displayed portion of the icon layout image 41.

In accordance with this, the central processing unit 20 moves the search key icons 51 through 56 which have not been displayed so far into the shooting status presenting image 40 along with a portion of the icon layout image 41 which has not been displayed so far.

Thus, even though the number of the search key icons 51 through 56 is greater than a collectively displayable number, the central processing unit 20 allows the user to view the search key icons 51 through 56 along with the icon layout image 41 and to specify these as an object for search by a tapping operation.

Incidentally, the central processing unit 20 manages, by the face icons 57 through 60 recorded in the RAM 22 along with the face feature information for search through execution of the face icon detection processing, the alignment sequence of the face icons 57 through 60 to be disposed on the icon layout image 41.

For example, the central processing unit 20 assigns the alignment sequence to the face icons 57 through 60 across the upper edge portion through the lower edge portion of the icon layout image 41 so as to take the upper edge portion of the icon layout image 41 as the top, and so as to take the lower edge portion thereof as the back of the alignment sequence of the face icons 57 through 60.

Actually, after recording the first face icons 57 through 60 in the RAM 22 with the face icon detection processing, the central processing unit 20 takes the first face icons 57 through 60 as the top (i.e., disposes on the upper edge portion of the icon layout image 41).

Also, after recording the second face icons 57 through 60 in the RAM 22 with the face icon detection processing, the central processing unit 20 takes the second face icons 57 through 60 as the top. In accordance with this, the central processing unit 20 moves down the alignment sequence of the first face icons 57 through 60 previously recorded in the RAM 22 one at a time (this also holds true hereinafter).

Thus, each time the face icons 57 through 60 are recorded in the RAM 22, the central processing unit 20 takes the latest face icons 57 through 60 as the top, and moves down the alignment sequence of the last recorded face icons 57 through 60 one at a time.

However, with the face icon detection processing, in the event that the detected comparative face features are matched with the face features for search indicated by the face feature information for search already recorded in the RAM 22, the central processing unit 20 determines the face icon 60 corresponding to the matched face features for searching.

Subsequently, the central processing unit 20 detects the alignment sequence of the determined face icon 60. As a result thereof, in the event that the alignment sequence of the determined face icon 60 is the top, the central processing unit 20 does not change the alignment sequence of this face icon 60.

On the other hand, in the event that the alignment sequence of the determined face icons 57 through 59 is after the top, the central processing unit 20 changes the alignment sequence of the face icons 57 through 59. Also, the central processing unit 20 changes the alignment sequence of other face icons 58 through 60 that is on the top side than the alignment sequence of the determined face icons 57 through 59 by sequentially moving down the sequence thereof toward the back side one at a time.

Subsequently, after changing the alignment sequence of the face icons 57 through 59, in response to this, the central processing unit 20 controls the digital processing unit 31 to change the display positions of the face icons 57 through 60 on the icon layout image 41 so as to accord with this change in the alignment sequence.

Figure 10:
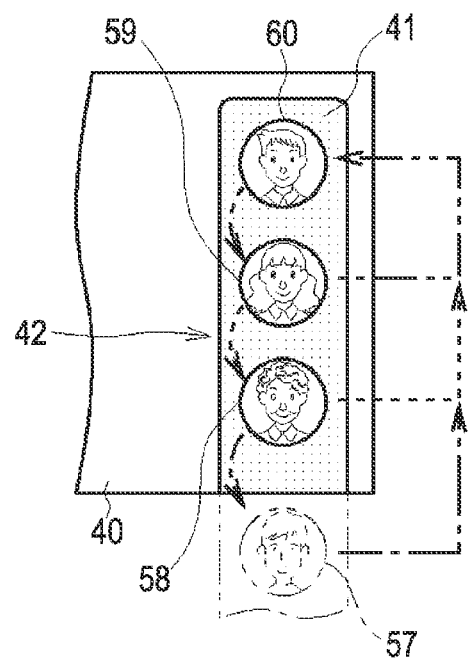
FIG. 10 is a schematic diagram for describing sorting of face icons.

Such as illustrated in FIG. 10, actually, in the event that when changing the alignment sequence of the face icons 57 through 59, the upper edge portion of the icon layout image 41 is displayed, the central processing unit 20 changes only the display positions of the face icons 57 through 60 without changing the display portion of the icon layout image 41.

Figure 11:
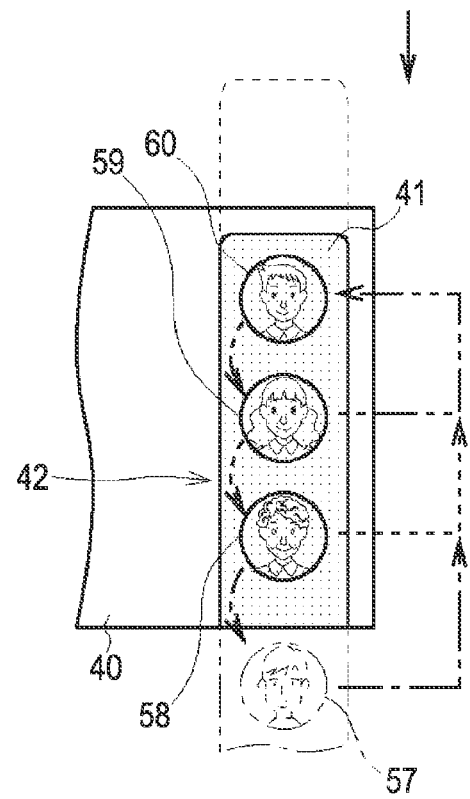
FIG. 11 is a schematic diagram for describing another sorting of face icons.

Also, such as illustrated in FIG. 11, in the event that when changing the alignment sequence of the face icons 57 through 59, the upper edge portion of the icon layout image 41 is not displayed, the central processing unit 20 automatically scrolls the icon layout image 41.

Thus, the central processing unit 20 changes the display portion of the icon layout image 41 so as to display the upper edge portion. Moreover, the central processing unit 20 also changes the display positions of the face icons 57 through 60.

Thus, each time the face of a person consecutively reflected in the shooting status presenting image 40 is detected as the comparative face features, the central processing unit 20 displays the face icons 57 through 60 indicating the face of this person along with the upper edge portion of the icon layout image 41.

Accordingly, the central processing unit 20 allows the user to readily specify the face icons 57 through 60 indicating the face of a person consecutively reflected in the shooting status presenting image 40 as a search key for photo image search.

Also, after proceeding to the shooting mode so as to realize the search key presenting function with the second setting content, the central processing unit 20 controls the digital processing unit 31 in accordance with the second setting content thereof during the shooting mode.

In this case, each time unit image data is generated in the same way as described above, the digital processing unit 31 executes the face detection processing as to the unit image data using the reference face feature information. Subsequently, after detecting the face(s) of a single or multiple persons within the unit image based on the unit image data, and also the size(s) and position(s) of the face portion(s) thereof, the digital processing unit 31 displays the frame image 46 in a manner overlaid on the shooting status presenting image 40 displayed on the liquid crystal panel 7B so as to surround the face(s) of the person(s).

Also, after detecting the face portion(s) and position(s) of a single or multiple persons within the unit image based on the unit image data, the digital processing unit 31 transmits the face detection information indicating the size(s) and position(s) of the single or multiple persons, and the unit image data thereof to the central processing unit 20.

The central processing unit 20 executes the face icon detection processing in the same way as described above. Thus, the central processing unit 20 detects a face icon so as to detect face features each time the face detection information and unit image data are provided from the digital processing unit 31.

Subsequently, the central processing unit 20 displays the shooting status presenting image 40 on the liquid crystal panel 7B, and also displays face icons along with the icon layout image 41 having the same configuration as described above, as the icon presenting image 42.

In this way, the central processing unit 20 presents a face icon indicating the face of a person consecutively reflected in the shooting status presenting image 40 as a search key for photo image search by the icon presenting image 42 displayed on the liquid crystal panel 7B along with the shooting status presenting image 40.

Incidentally, in this case as well, in the event that the comparative face features have been set as the face features for search in the face icon detection processing, the central processing unit 20 changes the color of the frame image 46 surrounding the search utilization face of the face features for search in the same way as described above.

Accordingly, while the search utilization face is reflected in the shooting status presenting image 40, the central processing unit 20 notifies the user that the search utilization face is available as a search key by the color of the frame image 46 surrounding this search utilization face.

Further, after proceeding to the shooting mode in a state in which the search key presenting function has been set so as to be realized with the third setting content, the central processing unit 20 controls the digital processing unit 31 in accordance with the third setting content thereof during the shooting mode.

Also, during the shooting mode, the central processing unit 20 periodically executes the camera position detection processing in the same way as described above, and also according to the execution results, executes the icon generating processing to generate a camera position icon as appropriate.

Incidentally, in addition to the above icon layout image data, icon layout image data for disposing the camera position icon alone is also held in the nonvolatile memory 34.

Accordingly, upon proceeding to the shooting mode, the central processing unit 20 reads out the icon layout image data for camera position icon from the nonvolatile memory 34. Subsequently, until the camera position icon serving as a search key is obtained as described above, the central processing unit 20 transmits the icon layout image data thereof to the digital processing unit 31 without change.

In the event of proceeding to the shooting mode, and the icon layout image data being provided from the central processing unit 20, each time unit image data is generated based on shot data, the digital processing unit 31 synthesizes the generated unit image data with the icon layout image data to generate synthesized image data.

Figure 12:
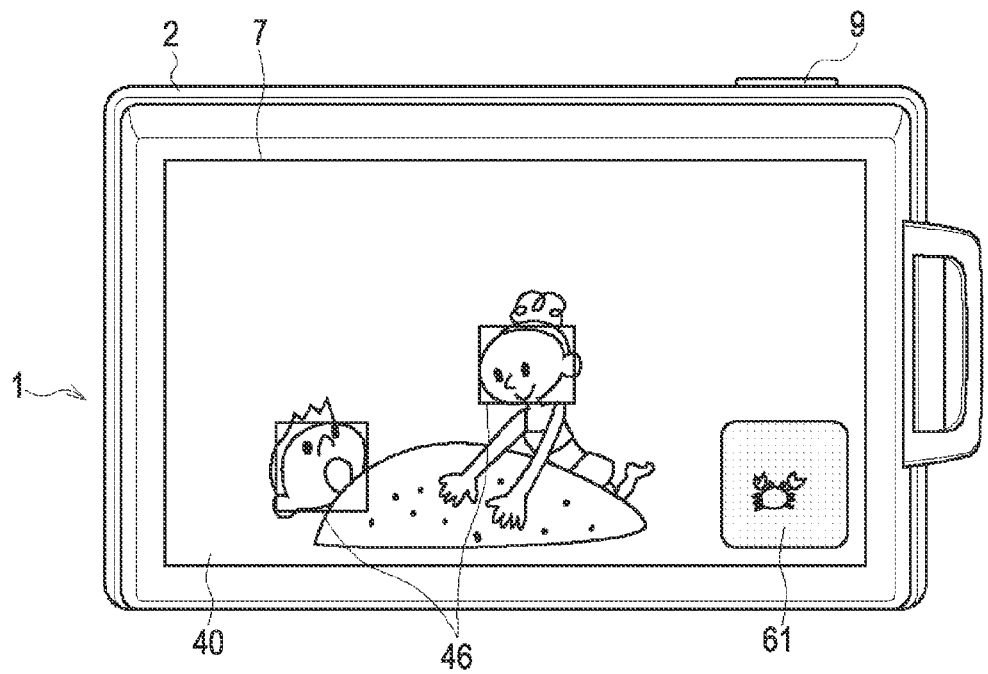
FIG. 12 is a schematic diagram for describing another display of an icon layout image onto the shooting status presenting image.

Subsequently, the digital processing unit 31 sequentially transmits the synthesized image data to the liquid crystal panel 7B. Thus, such as illustrated in FIG. 12, the digital processing unit 31 displays the shooting status presenting image 40 on the liquid crystal panel 7B, and also displays a quadrangular icon layout image 61 in a manner overlaid on, for example, the lower right corner in the image-horizontal direction of this shooting status presenting image 40.

Incidentally, the icon layout image 61 is generated, in the same way as with the above icon layout image 41, so that the lower right corner portion of the shooting status presenting image 40 serving as a background can be seen though, for example, such as an open mesh pattern or polka-dot pattern drawn in monochrome such as white or gray.

Accordingly, the central processing unit 20 displays the icon layout image 61 in a manner overlaid on the shooting status presenting image 40, but prevents the shooting status from being unable to be confirmed by showing the overlaid portion of the icon layout image 61 in this shooting status presenting image 40 as much as possible.

Also, in the event that a camera position icon has been generated in a state in which the icon layout image 61 has been displayed in a manner overlaid on the shooting status presenting image 40, the central processing unit 20 synthesizes the icon layout image data with this camera position icon to generate icon presenting image data. Subsequently, the central processing unit 20 transmits the icon presenting image data thereof to the digital processing unit 31.

In the event that the icon presenting image data has been provided from the central processing unit 20, subsequently, each time unit image data is generated, the digital processing unit 31 synthesizes this unit image data with the icon presenting image data instead of the icon layout image data to generate synthesized image data. Subsequently, the digital processing unit 31 sequentially transmits the synthesized image data thereof to the liquid crystal panel 7B.

Figure 13:
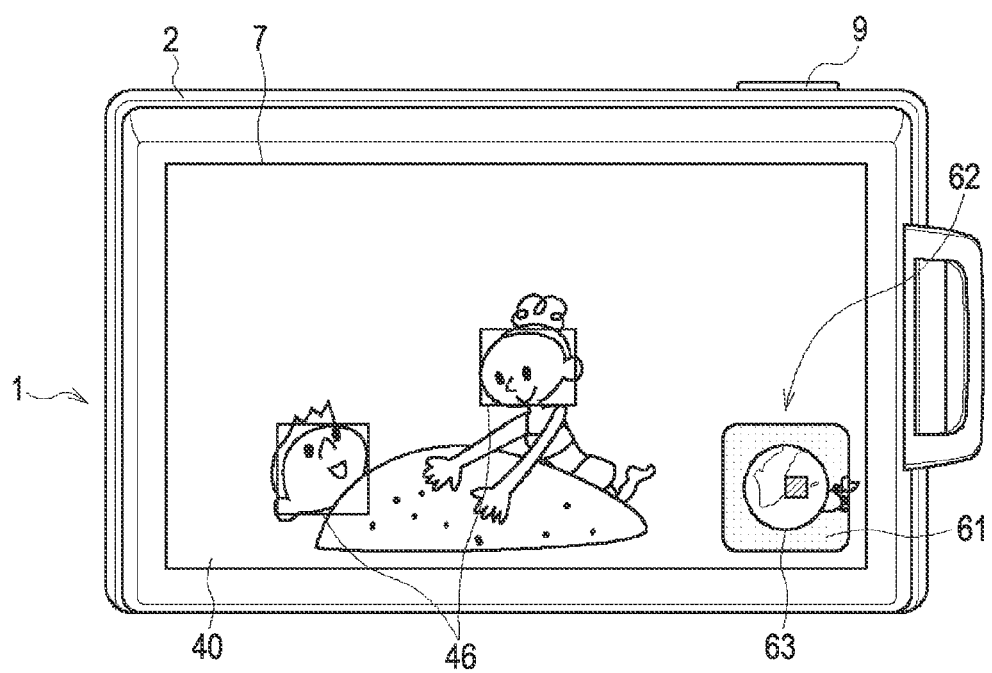
FIG. 13 is a schematic diagram for describing another display of a camera position icon onto the shooting status presenting image.

Thus, such as illustrated in FIG. 13, the digital processing unit 31 displays the shooting status presenting image 40 on the liquid crystal panel 7B, and also displays an icon presenting image 62 in a manner overlaid on this shooting status presenting image 40.

In this case, the icon presenting image 62 includes the icon layout image 61 displayed in a manner overlaid on the lower right corner portion of the shooting status presenting image 40, and a camera position icon 63 serving as a search key for photo image search is disposed and displayed on this icon layout image 61.

Also, after generating a new camera position icon, in each case, the central processing unit 20 updates the content of the icon presenting image data to transmit this to the digital processing unit 31. Subsequently, in the event that the icon presenting image data of which the content has been updated has been provided from the central processing unit 20, in each case, the digital processing unit 31 switches the icon presenting image data to be used for generation of synthesized image data from one before updating to one after updating in the same way as described above.

Thus, the central processing unit 20 updates the camera position icon 63 to be displayed on the icon layout image 61 with the icon presenting image 62 to be displayed on the liquid crystal panel 7B to new one.

In this way, the central processing unit 20 presents the camera position icon 63 as a search key for photo image search by the icon presenting image 62 displayed on the liquid crystal panel 7B along with the shooting status presenting image 40.

Incidentally, at this time as well, each time unit image data is generated in the same way as described above, the digital processing unit 31 executes the face detection processing as to the unit image data using the reference face feature information. Subsequently, after detecting the face(s) of a single or multiple persons within the unit image based on the unit image data, and also the size(s) and position(s) of the face portion(s) thereof, the digital processing unit 31 displays the frame image 46 in a manner overlaid on the shooting status presenting image 40 displayed on the liquid crystal panel 7B so as to surround the face(s) of the person(s).

Also, after detecting size and position the face portion(s) of a single or multiple persons within the unit image based on the unit image data, the digital processing unit 31 transmits the face detection information indicating the size(s) and position(s) of the face(s) single or multiple persons, and the unit image data thereof to the central processing unit 20.

In the same way as with the above icon detection processing, each time the face detection information and the unit image data are provided from the digital processing unit 31, based on this face detection information the central processing unit 20 determines a single person's face portion or multiple person's face portions within the unit image based on this face detection information, and analyzes the determined face portion(s). Thus, the central processing unit 20 detects the features of a single person's face or multiple person's faces reflected in the unit image.

Also, in the same way as with the above icon detection processing, each time the face detection information and the unit image data are provided from the digital processing unit 31, the central processing unit 20 sequentially compares the features of the single person's face or multiple person's faces detected from the unit image data. Subsequently, after continuously detecting the features of the face of the same person out of a predetermined number of unit images that continue during predetermined second time, the central processing unit 20 determines the features of the detected face thereof to be comparative face features.

In this way, after obtaining the first comparative face features, the central processing unit 20 compares the comparative face features thereof with the registered face features within the database DB for search. As a result thereof, after detecting the registered face features matched with the comparative face features out of the registered face features within the database DB for search, the central processing unit 20 sets the comparative face features as the face features for search.

Also, the central processing unit 20 reads out the personal identification information correlated with the registered face features matched with the face features for search thereof from the database DB for search (recording device 33). Subsequently, the central processing unit 20 records the face feature information for search indicating the face features for search, and the personal identification information, for example, in the RAM 22 in a correlated manner.

However, in the event that, though the comparative face features have been obtained, there are no registered face features matched with the comparative face features thereof (the registered face feature information indicating the registered face features matched with the comparative face features has not registered in the database DB for search), the central processing unit 20 does not set the comparative face features thereof as the face features for search. Subsequently, the central processing unit 20 does not execute the subsequent processing wherein the comparative face features thereof ought to be used as the face features for search.

Also, after detecting the second comparative face features, the central processing unit 20 compares the second comparative face features with the face features for search indicated by the face feature information for search recorded in the RAM 22. As a result thereof, in the event that the second comparative face features are different from the face features for search indicated by the face feature information for search recorded in the RAM 22, the central processing unit 20 subsequently executes the same processing as with the case where the above first comparative face features were detected.

On the other hand, in the event that the second comparative face features are matched with the face features for search indicated by the face feature information for search recorded in the RAM 22, the central processing unit 20 does not set the second comparative face features thereof as the face features for search. Subsequently, the central processing unit 20 does not execute the subsequent processing wherein the second comparative face features thereof ought to be used as the face features for search.

Further, after detecting further several comparative face features after detection of the second comparative face features, in each case, the central processing unit 20 compares the detected comparative face features thereof with the face features for search indicated by all of the face feature information for searching recorded in the RAM 22 by the point in time thereof.

As a result thereof, in the event that the comparative face features further detected after detection of the second comparative face features differ from the face features for search indicated by one of the face feature information for search recorded in the RAM 22, the central processing unit 20 subsequently executes the same processing as with the case where the above first comparative face features were detected.

In this way, the central processing unit 20 sets, in accordance with detection of the comparative face features of the face of a person reflected in the shooting status presenting image 40 for relatively longer time, this comparative face features as the face features for search as appropriate.

Also, after thus setting the comparative face features as the face features for search, the central processing unit 20 controls, in the same way as described above, the digital processing unit 31 to change the color of the frame image 46 surrounding the search utilization face. Thus, while the search utilization face is reflected in the shooting status presenting image 40, the central processing unit 20 notifies the user that the search utilization face thereof is available as a search key by the color of the frame image 46 surrounding this search utilization face.

Figure 14A:
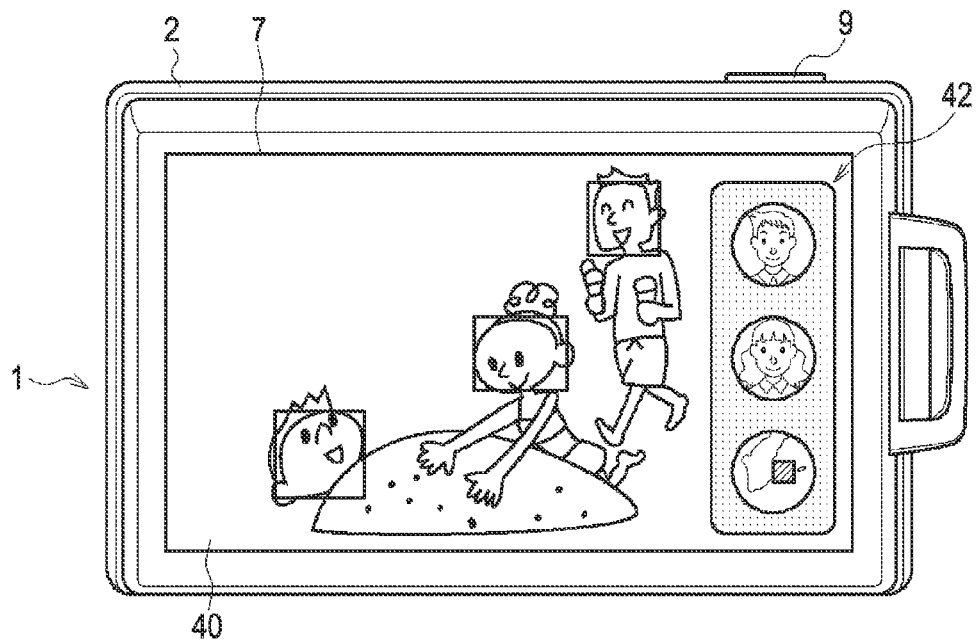
FIGS. 14A and 14B are schematic diagrams for describing elimination of an icon presenting image corresponding to a half-pressing operation and a full-pressing operation of a shutter button.
Figure 14B:
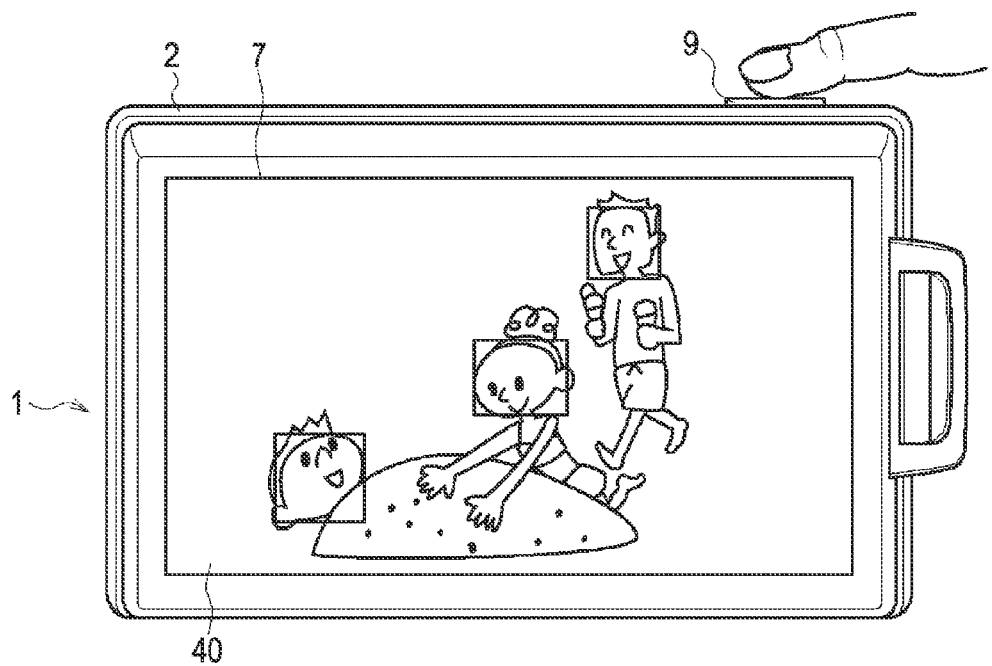

Now, such as illustrated in FIGS. 14A and 14B, in the event that the search key presenting function is set so as to be realized with the first setting content or the second setting content, such as described above, the central processing unit 20 displays the icon presenting image 42 on the liquid crystal panel 7B along with the shooting status presenting image 40.

However, search key icons included in the icon presenting image 42 (face icons and camera position icon) are generated so that the picture patterns thereof can be clearly distinguished from the picture pattern of the shooting status presenting image 40, and this shooting status present image 40 is not seen therethrough.

Therefore, in the event that the shutter button 9 has been half-pressed, and a condition adjusting signal has been input, in response to this, the central processing unit 20 controls the digital processing unit 31 to eliminate the icon presenting image 42 from the liquid crystal panel 7B.

Similarly, in the event that the shutter button 9 has been full-pressed, and a release signal has been input, in response to this, the central processing unit 20 also controls the digital processing unit 31 to eliminate the icon presenting image 42 from the liquid crystal panel 7B.

Incidentally, such as described regarding FIG. 4, even though the shutter button 9 has been half-pressed in a state in which the icon layout image 41 has been displayed on the liquid crystal panel 7B along with the shooting status presenting image 40, the central processing unit 20 eliminates this icon layout image 41 from the liquid crystal panel 7B.

Also, such as described regarding FIG. 4, even though the shutter button 9 has been full-pressed in a state in which the icon layout image 41 has been displayed on the liquid crystal panel 7B along with the shooting status presenting image 40, the central processing unit 20 also eliminates this icon layout image 41 from the liquid crystal panel 7B.

In this way, while the shutter button 9 has been half-pressed or full-pressed, the central processing unit 20 controls the digital processing unit 31 to display the shooting status presenting image 40 alone on the liquid crystal panel 7B.

Thus, while the shutter button 9 has been half-pressed or full-pressed for photo shooting, the central processing unit 20 allows the user to view the whole of the shooting status presenting image 40, and to accurately confirm the shooting status of a subject.

Figure 15A:
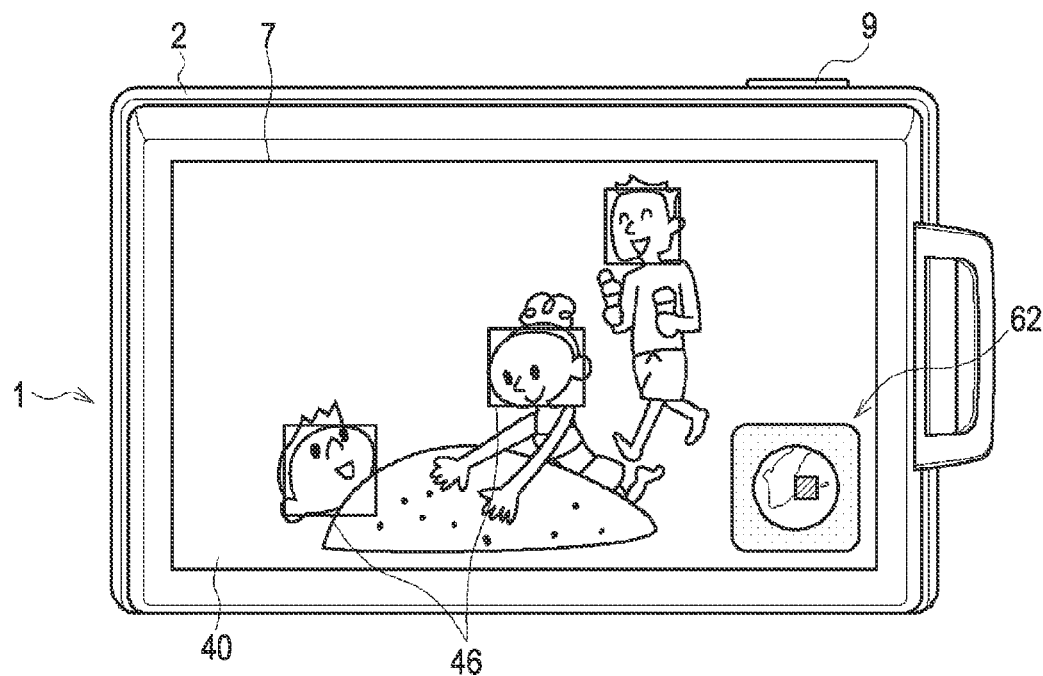
FIGS. 15A and 15B are schematic diagrams for describing another elimination of the icon presenting image corresponding to a half-pressing operation and a full-pressing operation of the shutter button.
Figure 15B:
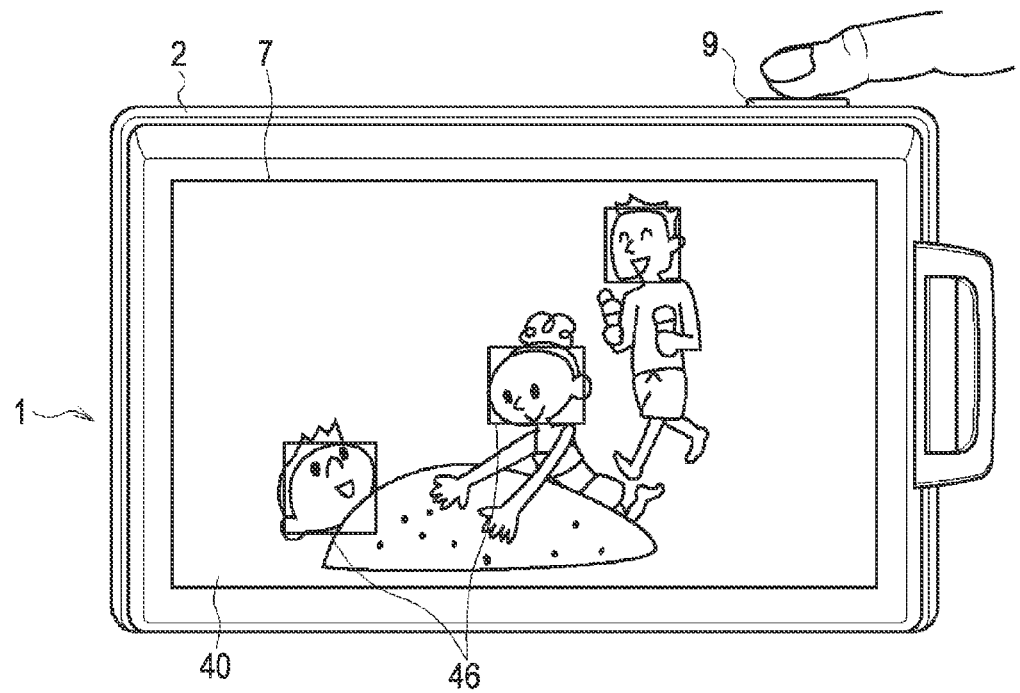

Also, such as illustrated in FIGS. 15A and 15B, even though the search key presenting function has been set in accordance with the third setting content, while the shutter button 9 has been half-pressed or full-pressed, the central processing unit 20 displays the shooting status presenting image 40 alone on the liquid crystal panel 7B.

Accordingly, in the case that the search key presenting function has been set in accordance with the third setting content as well, while the shutter button 9 has been half-pressed or full-pressed, the central processing unit 20 allows the user to view the whole of the shooting status presenting image 40, and to accurately confirm the shooting status of a subject.

1-5. Image Search Processing of Photo Images at the Time of the Shooting Mode

Next, description will be made regarding image search processing for searching a photo image according to the specification of a search key icon at the time of the shooting mode. However, first, description will be made below regarding image search processing to be executed in response to a camera position icon serving as a search key displayed on the liquid crystal panel 7B being specified at the time of the shooting mode.

Next, description will be made regarding image search processing to be executed in response to a face icon serving as a search key displayed on the liquid crystal panel 7B being specified at the time of the shooting mode. Subsequently, description will be made regarding image search processing to be executed in response to a face portion being specified along with the frame image 46 within the shooting status presenting image 40 displayed on the liquid crystal panel 7B at the time of the shooting mode.

In the event that, in a state in which a camera position icon has been displayed on the liquid crystal panel 7B as the icon presenting image 42(62), the user has specified this camera position icon by a tapping operation, the central processing unit 20 reads out the area information and area map image data from the RAM 22.

Also, the central processing unit 20 compares the search area indicated by the area information with the shot position information registered in the database DB for search to search out of this shot position information shot position information indicating a shot position within the search area.

Incidentally, with the following description, the shot position information searched based on the search area (i.e., shot position information indicating a shot position within the search area) will also be referred to as search shot position information, and the shot position indicated by this search shot position information will also be referred to as a search shot position.

Further, based on event identification information correlated with search shot position information within the database DB for search, the central processing unit 20 classifies this search shot position information by photo shooting events.

Further, for each event classified from the search shot position information, the central processing unit 20 detects shot date information indicating a shot date when photo shooting was performed for the first time at this event out of the shot date information correlated with the search shot position information within the database DB for search, for example.

Incidentally, with the following description, the shot date when photo shooting was performed for the first time detected at one of the events classified from the search shot position information will also be referred to as an initial shot date, and the shot date information indicating this initial shot date will also be referred to as initial shot date information.

Subsequently, for each event classified from the search shot position information, the central processing unit 20 detects out of the search shot position information thereof the search shot position information indicating the search shot position of the initial shot date as event position information indicating the event position of the event thereof where photo shooting was performed.

Also, for each event classified from the search shot position information, the central processing unit 20 determines which of today and the past (i.e., before today) photo shooting was performed at the event thereof, based on the initial shot date.

Subsequently, based on the determination result thereof, the central processing unit 20 synthesizes an event position icon serving as a search key for searching a photo image at this event, which indicates an event where photo shooting was performed today or in the past, and the event position thereof, with area map image data.

Thus, based on the area map image data, the central processing unit 20 disposes the event position icon on the area map image to generate map image data for searching a map image for search to be used for searching a photo image.

Incidentally, an event position icon indicating an event where photo shooting was preformed today, and also the event position thereof is generated so as to have a shape, size, and the like different from those of an event icon indicating an event where photo shooting was performed in the past, and also the event position thereof.

However, with the following description, in the case that the event position icon of today's event, and the event position icon of an event in the past do not have to be distinguished, these will also be referred to as search key icons collectively.

Incidentally, such as described above, in the event of having generated a camera position icon at the time of the shooting mode, in response to this, the central processing unit 20 records this camera position icon, and camera position information indicating the camera position thereof in the RAM 22 in a correlated manner.

However, separately from such recording of the camera position information to the RAM 22, the central processing unit 20 records all of the camera positions detected from a transition time point to the shooting mode to the instruction time point of a camera position icon in the RAM 22 as position detected history information indicating the detection history thereof.

Accordingly, at this time, based on the position detected history information recorded in the RAM 22, the central processing unit 20 detects the displacement of the camera positions from a transition time point to the shooting mode to the instruction time point of a camera position icon on the map image for search.

In the event that the camera position is displaced along a road drawn on the map image for search, the central processing unit 20 processes the map image data for search so that, with the road tracing the displacement of this camera position, a section equivalent to between the starting point and the end point of displacement is changed to a color different from the other portions. Also, in the event that the camera position has generally stopped at one point on the map image for search, at this time, the central processing unit 20 subjects the map image data for search to no processing.

In this way, upon generating the map image data for search, the central processing unit 20 transmits the map image data for search to the digital processing unit 31. Also, at this time, the central processing unit 20 records event identification information indicating an even classified from the search shot position information, even position information indicating the event position of this event, and a search key icon in the RAM 22 in a correlated manner.

Figure 16:
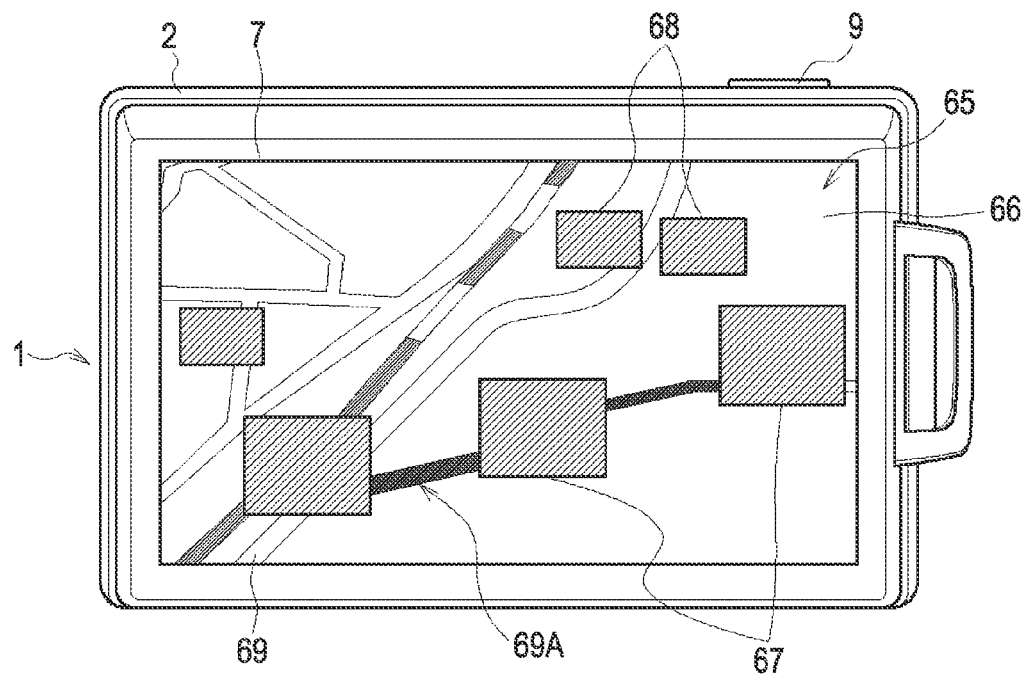
FIG. 16 is a schematic diagram illustrating the configuration of a map image for search.

In the event that the map image data for search has been provided from the central processing unit 20, the digital processing unit 31 transmits the map image data for search to the liquid crystal panel 7B instead of the unit image data from the point in time thereof, under control of this central processing unit 20. Thus, based on the map image data for search, the digital processing unit 31 displays, for example, a map image 65 for search such as illustrated in FIG. 16 on the liquid crystal panel 7B.

With this map image 65 for search, the event position icon 67 of a today's event, and the event position icon 68 of a past event are disposed on an event position of the original area map image 66 as a search key for photo image search. Also, with the map image 65 for search, of a road 69 tracing the displacement of a camera position, a section 69A equivalent to the starting point and terminal point of this displacement is colored with a color different from other portions.

Thus, the central processing unit 20 allows the user to confirm an event where photo shooting was performed today or in the past, and also the event position thereof on the map image 65 for search presented to the user through the event position icons 67 and 68.

Also, in the event that the user was moving and performing photo shooting at a different event as appropriate today, the central processing unit 20 also allows the user to confirm the movement route thereof by partial color difference of the road 69. That is to say, the central processing unit 20 allows the user to confirm where he/she was moving and performing photo shooting passing through which movement route.

In the event that the user has specified a search key icon by a tapping operation in a state in which the map image 65 for search has been displayed on the liquid crystal panel 7B, the central processing unit 20 detects the event position information indicated by this specified search key icon in the RAM 22. Also, the central processing unit 20 reads out the event identification information and the search key icon corresponding to the detected event position information from the RAM 22.

Further, based on the event identification information read out from the RAM 22, the central processing unit 20 searches and reads out all of the file identification information correlated with this event identification information from the database DB for search (i.e., recording device 33).

Further, the central processing unit 20 reads out thumbnail data corresponding to the searched file identification information thereof from the recording device 33. Subsequently, based on the thumbnail data and search key icon, the central processing unit 20 generates event search photo image data for presenting a photo image searched at the event of the event position indicated by this search key icon according to the search key icon specified by the user. Also, the central processing unit 20 transmits the event search photo image data thereof to the digital processing unit 31.

Figure 17:
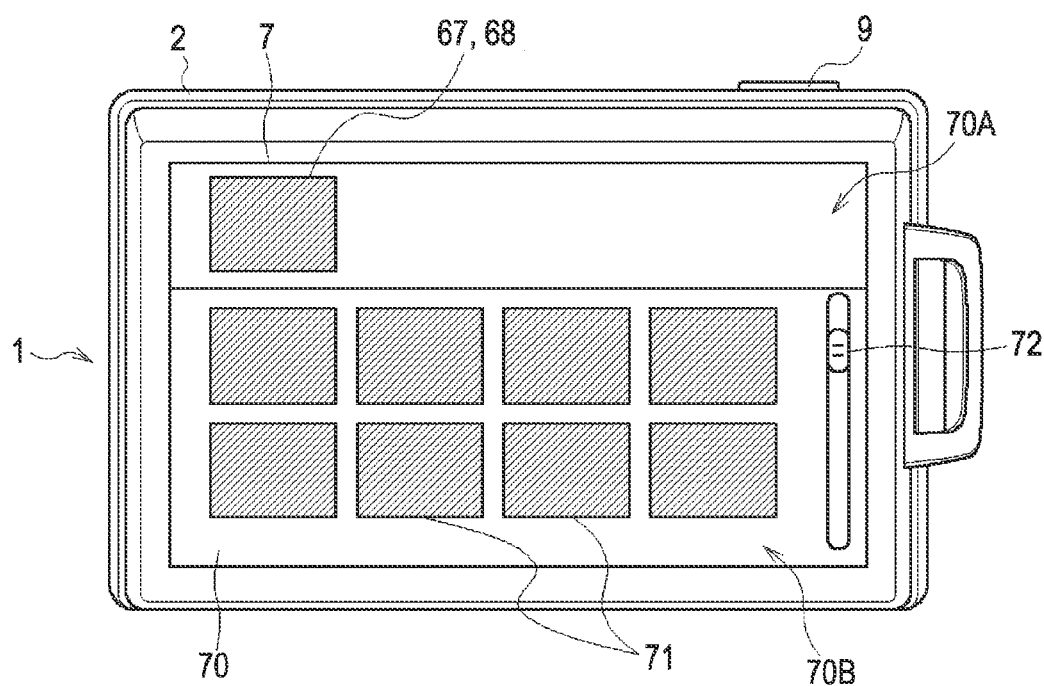
FIG. 17 is a schematic diagram illustrating the configuration of an event search photo image.

Accordingly, in the event that the event search photo image data has been provided from the central processing unit 20, the digital processing unit 31 transmits this event search photo image data to the liquid crystal panel 7B instead of the map image data for search. Thus, the digital processing unit 31 displays an event search photo image 70 such as illustrated in FIG. 17 on the liquid crystal panel 7B based on the event search photo image data.

With this event search photo image 70, an icon display region 70A and a thumbnail display region 70B are provided so that these regions divide the entirety into two in the image-vertical direction. Further, with the icon display region 70A of the event search photo image 70, a search key icon specified by the user (i.e., event position icon 67(68)) is disposed.

Also, with the icon display region 70B of the event search photo image 70, the thumbnails 71 of photo images generated through photo shooting at the event of the event position indicated by the search key icon specified by the user are disposed in a matrix manner. Further, with the thumbnail display region 70B, a scroll bar 72 which slides in the image-vertical direction is provided on the right edge portion in the image-horizontal direction.

Accordingly, after displaying the event search photo image 70 on the liquid crystal panel 7B, the central processing unit 20 allows the user to view photo images searched at the event of the event position specified by the user as the thumbnails 71 via this event search photo image 70.

Also, in the event that, in a state in which the event search photo image 70 has been displayed on the liquid crystal panel 7B, the user has slide-operated the scroll bar 72 so as to move in the image-vertical direction, in response to this, the central processing unit 20 controls the digital processing unit 31 for scroll display.

Thus, the central processing unit 20 scrolls the thumbnails 71 in the image-vertical direction within the thumbnail display region 70B of the event search photo image 70. Accordingly, even in the case that the thumbnails 71 of the photo images searched at the event are not disposed collectively within the thumbnail display region 70B of the event search photo image 70, the central processing unit 20 allows the user to view the thumbnails 71 thereof by being switched and disposed as appropriate.

Further, in the event that, in a state in which the event search photo image 70 has been displayed on the liquid crystal panel 7B, the user has specified a thumbnail 71 by a tapping operation, the central processing unit 20 determines the file identification information corresponding to the specified thumbnail 71.

Subsequently, based on the determined file identification information thereof, the central processing unit 20 reads out the image file identified from this file identification information from the recording device 33. Also, the central processing unit 20 reads out compressed image data from the image file thereof to transmit this to the digital processing unit 31.

Accordingly, in the event that the compressed image data has been provided from the central processing unit 20, the digital processing unit 31 subjects the compressed image data thereof to decompressed decoding processing to generate the original photo image data. Subsequently, the digital processing unit 31 transmits the photo image data thereof to the liquid crystal panel 7B instead of the event search photo image data. Thus, the digital processing unit 31 displays the photo image based on the photo image data over the whole screen of the liquid crystal panel 7B instead of the event search photo image 70.

In this way, in the event that the user has specified a thumbnail 71 on the event search photo image 70, the central processing unit 20 separately displays the photo image serving as the origin of the specified thumbnail 71 on the liquid crystal panel 7B to allow the user to view this.

Incidentally, in the event that, in a state in which a photo image has been displayed on the liquid crystal panel 7B, the user has specified any position of the touch panel 7A by consecutive two tapping operations, in response to this, the central processing unit 20 controls the digital processing unit 31 to return the display of the liquid crystal panel 7B.

Thus, the digital processing unit 31 transmits the event search photo image data to the liquid crystal panel 7B instead of the photo image data, and displays the event search photo image 70 again instead of the photo image.

In this way, even though a photo image is displayed on the liquid crystal panel 7B, the central processing unit 20 can return the display of this photo image to the display of the event search photo image 70 by a simple operation. Subsequently, after returning the display of the photo image to the display of the event search photo image 70, the central processing unit 20 allows the user to specify a thumbnail 71 again for display of a desired photo image.

Also, in the event that, in a state in which the event search photo image 70 has been displayed on the liquid crystal panel 7B, the user has specified a search key icon by a tapping operation, in response to this, the central processing unit 20 controls the digital processing unit 31 to return the display of the liquid crystal panel 7B.

Thus, the digital processing unit 31 transmits the map image data for search to the liquid crystal panel 7B instead of the event search photo image data to display the map image 65 for search instead of the event search photo image 70.

In this way, in the case that the event search photo image 70 is displayed on the liquid crystal panel 7B as well, the central processing unit 20 can return the display of this event search photo image 70 to the display of the map image 65 for search by a simple operation.

Subsequently, after returning the display of this event search photo image 70 to the display of the map image 65 for search, the central processing unit 20 allows the user to specify a search key icon indicating a desired event position for detection of a photo image again.

Further, in the event that, in a state in which the map image 65 for search has been displayed, the user has specified a portion other than the portion facing a search key icon of the touch panel 7A by consecutive two tapping operations, in response to this, the central processing unit 20 controls the digital processing unit 31 to return the display of the liquid crystal panel 7B.

At this time, the digital processing unit 31 generates synthesized image data based on the unit image data again instead of the map image data for search to transmit this to the liquid crystal panel 7B. Thus, the digital processing unit 31 displays the shooting status presenting image 40 and the icon presenting image 42(62) on the liquid crystal panel 7B instead of the map image 65 for search.

In this way, even after displaying the map image 65 for search on the liquid crystal panel 7B, the central processing unit 20 can return the display of this map image 65 for search to the display of the shooting status presenting image 40 and the icon presenting image 42(62) with an easy operation.

Subsequently, after returning the display of the map image 65 for search to the display of the shooting status presenting image 40 and the icon presenting image 42(62), the central processing unit 20 allows the user to perform photo shooting of a subject again, and after the camera position is displaced, allows the user to specify a camera position icon again.

Note that, in the case of the present embodiment, after returning the display of the map image 65 for search to the display of the shooting status presenting image 40 and the icon presenting image 42(62), the central processing unit 20 executes processing executed before the display of the map image 65 for search again.

Thus, the central processing unit 20 periodically executes the camera position detection processing again, and also according to the execution results thereof, executes the icon generating processing as appropriate to update the camera position icon to be displayed as the icon presenting images 42 and 62.

On the other hand, in the event that, in a state in which a face icon has been displayed on the liquid crystal panel 7B as the icon presenting image 42, the user has specified this face icon by a tapping operation, the central processing unit 20 reads out the face icon thereof, and the personal identification information corresponding to this from the RAM 22.

Also, based on the personal identification information read out from the RAM 22, the central processing unit 20 searches and reads out all of the file identification information correlated with this personal identification information from the database DB for search (i.e., recording device 33).

Further, the central processing unit 20 reads out the thumbnail data corresponding to the searched file identification information from the recording device 33. Subsequently, based on the thumbnail data and face icon, the central processing unit 20 generates face search photo image data for presenting the photo image searched from the face icon specified by the user. Also, the central processing unit 20 transmits the face search photo image data thereof to the digital processing unit 31.

Figure 18:
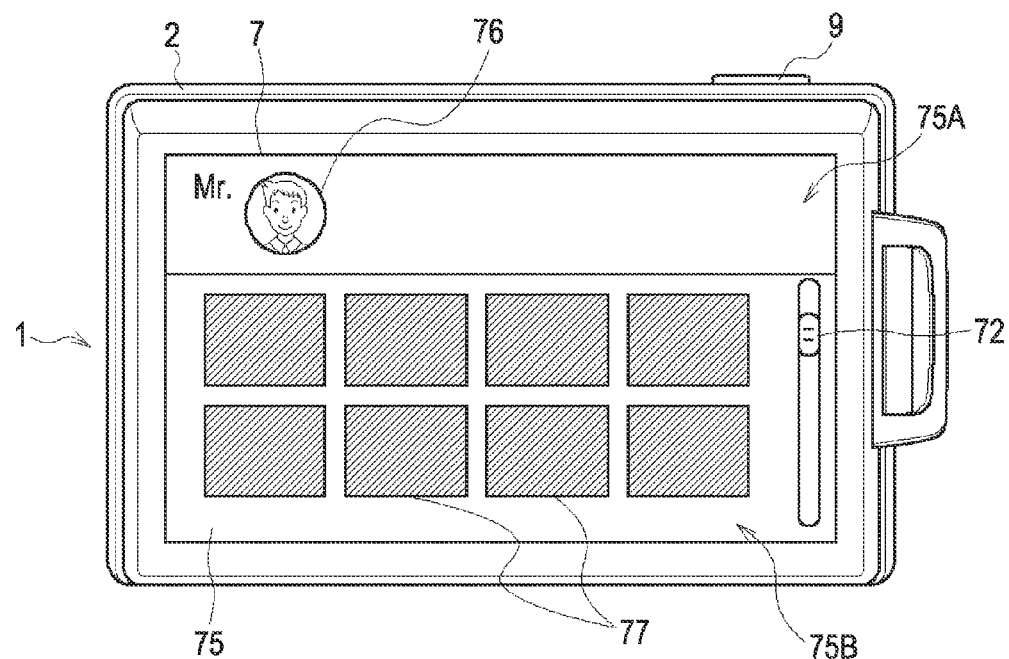
FIG. 18 is a schematic diagram illustrating the configuration of a face search photo image.

Accordingly, in the event that the face search photo image data has been provided from the central processing unit 20, the digital processing unit 31 transmits this face search photo image data to the liquid crystal panel 7B instead of synthesized image data. Thus, based on the face search photo image data, the digital processing unit 31 displays a face search photo image 75 such as illustrated in FIG. 18 on the liquid crystal panel 7B.

With this face search photo image 75, an icon display region 75A and a thumbnail display region 75B are provided so that these regions divide the entirety into two in the image-vertical direction. Further, with the icon display region 75A of the face search photo image 75, a face icon 76 specified by the user is disposed.

Also, with the thumbnail display region 75B of the face search photo image 75, the thumbnails 77 of photo images (i.e., photo images in which the person of the face indicated by the face icon 76 is reflected) searched by the face icon 76 specified by the user are disposed in a matrix manner. Further, with the thumbnail display region 75B, a scroll bar 77 which slides in the image-vertical direction is provided on the right edge portion in the image-horizontal direction.

Accordingly, after displaying the face search photo image 75 on the liquid crystal panel 7B, the central processing unit 20 allows the user to view photo images searched by the face icon 76 specified by the user as the thumbnails 77 via this face search photo image 75.

Also, in the event that, in a state in which the face search photo image 75 has been displayed on the liquid crystal panel 7B, the user has slide-operated the scroll bar 72 so as to move in the image-vertical direction, in response to this, the central processing unit 20 controls the digital processing unit 31 for scroll display.

Thus, the central processing unit 20 scrolls the thumbnails 77 in the image-vertical direction within the thumbnail display region 75B of the face search photo image 75. Accordingly, even in the case that the thumbnails 77 of the photo images searched by the face icon 76 are not disposed collectively within the thumbnail display region 75B of the face search photo image 75, the central processing unit 20 allows the user to view the thumbnails 77 thereof by being switched and disposed as appropriate.

Further, in the event that, in a state in which the face search photo image 75 has been displayed on the liquid crystal panel 7B, the user has specified a thumbnail 77 by a tapping operation, the central processing unit 20 determines the file identification information corresponding to the specified thumbnail 71.

Subsequently, based on the determined file identification information thereof, the central processing unit 20 reads out the image file identified from this file identification information from the recording device 33. Also, the central processing unit 20 reads out compressed image data from the image file thereof to transmit this to the digital processing unit 31.

Accordingly, in the event that the compressed image data has been provided from the central processing unit 20, the digital processing unit 31 subjects the compressed image data thereof to decompression decoding processing to generate the original photo image data. Subsequently, the digital processing unit 31 transmits the photo image data thereof to the liquid crystal panel 7B instead of the face search photo image data. Thus, the digital processing unit 31 displays the photo image based on the photo image data over the whole screen of the liquid crystal panel 7B instead of the face search photo image 75.

In this way, in the event that the user has specified a thumbnail 77 on the face search photo image 75, the central processing unit 20 separately displays the photo image serving as the origin of the specified thumbnail 77 on the liquid crystal panel 7B to allow the user to view this.

Incidentally, in the event that, in a state in which a photo image has been displayed on the liquid crystal panel 7B, the user has specified any position of the touch panel 7A by consecutive two tapping operations in the same way as described above, in response to this, the central processing unit 20 controls the digital processing unit 31 to return the display of the liquid crystal panel 7B.

Thus, the digital processing unit 31 transmits the face search photo image data to the liquid crystal panel 7B instead of the photo image data, and displays the face search photo image 75 again instead of the photo image.

In this way, even though a photo image is displayed on the liquid crystal panel 7B, the central processing unit 20 returns the display of this photo image to the display of the face search photo image 75 by a simple operation. Subsequently, after returning the display of the photo image to the display of the face search photo image 75, the central processing unit 20 allows the user to specify a thumbnail 77 again for display of a desired photo image.

Also, in the event that, in a state in which the face search photo image 75 has been displayed on the liquid crystal panel 7B, the user has specified the face icon 76 by a tapping operation, in response to this, the central processing unit 20 controls the digital processing unit 31 to return the display of the liquid crystal panel 7B.

Thus, the digital processing unit 31 generates synthesized image data based on the unit image data instead of the face search photo image data again to transmit this to the liquid crystal panel 7B. Thus, the digital processing unit 31 displays the shooting status presenting image 40 and the icon presenting image 42 on the liquid crystal panel 7B instead of the face search photo image 75 again.

In this way, even though the face search photo image 75 is displayed on the liquid crystal panel 7B, the central processing unit 20 can return the display of this face search photo image 75 to the display of the shooting status presenting image 40 and the icon presenting image 42 by a simple operation.

Subsequently, after returning the display of this face search photo image 75 to the display of the shooting status presenting image 40 and the icon presenting image 42, the central processing unit 20 allows the user to perform photo shooting of a subject, and to specify a face icon again.

Figure 19:
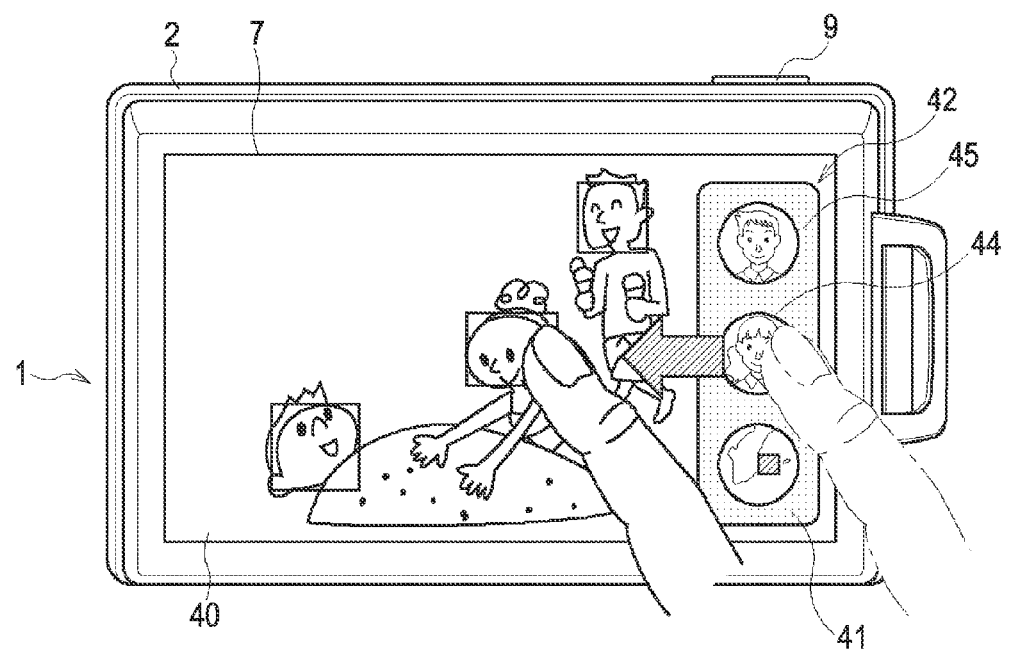
FIG. 19 is a schematic diagram for describing person search.

In addition to this, such as illustrated in FIG. 19, in the event that, in a state in which the face icons 44 and 45 have been displayed on the liquid crystal panel 7B, the user has performed a sliding operation to the left side of the image with the face icon 44 as the origin, the central processing unit 20 recognizes that search of a person has been requested.

At this time, the central processing unit 20 reads out, from the RAM 22, the personal identification information corresponding to the face icon 44 specified as the origin of the sliding operation by the user (hereafter, also particularly referred to as "reference personal identification information").

Also, the central processing unit 20 determines whether or not the reference personal identification information has been correlated with the intimacy correlated information within the database DB for search. As a result thereof, in the event that the reference personal identification information has been correlated with the intimacy correlated information, the central processing unit 20 reads out the personal identification information of a single person or multiple persons determined by this intimacy correlated information from the database DB for search (i.e., recording device 33). Also, the central processing unit 20 also reads out the face icon correlated with the personal identification information thereof from the database DB for search.

Specifically, the central processing unit 20 searches a single person or multiple persons having a high intimacy degree with the person indicated by the face icon 44 specified as the origin of the sliding operation by the user. Subsequently, the central processing unit 20 reads out the personal identification information whereby the searched person(s) can be identified, and the face icon indicating the face of this searched person from the database DB for search (i.e., recording device 33).

Incidentally, with the following description, the person indicated by the face icon specified as the origin of the sliding operation by the user will also be referred to as "reference person", and a person having intimacy with the reference person thereof, which has been searched based on this reference person, will also be referred to as "search person".

Incidentally, such as described above, the intimacy degree of persons has been detected based on the photo image generated by the persons photographically being taken together. Accordingly, after detecting a search person, based on the shot date information and the shot position information corresponding to the reference person and the search person, the central processing unit 20 detects a shot date and a shot position of the reference person and the search person photographically being taken together.

Also, for example, based on the detected shot date thereof, the central processing unit 20 detects, of the shot positions detected in the same way, a shot position where photo shooting has been performed on the latest shot date. Further, after detecting the shot position, the central processing unit 20 reads out a portion equivalent to a predetermined circular area with this shot position as the center within the map image data from the recording device 33 as partial map image data.

Further, the central processing unit 20 synthesizes the partial map image data with the image of a predetermined mark indicating the shot position thereof, and then subjects this to, for example, reduction processing for thinning pixels.

Thus, based on the partial map image data thereof, the central processing unit 20 indicates the shot position thereof on the map to generate a shot position icon that is available as a search key for photo image search. In this way, the central processing unit 20 generates a single or multiple shot position icons indicating a shot position where the reference person and a single or multiple search persons were photographically taken together.

Also, after detecting multiple (two or more) search persons, based on the intimacy correlated information correlated with the personal identification information of the multiple search persons, the central processing unit 20 detects whether or not there are intimate persons of the multiple search persons from the database DB for search.

Further, in the event that there are intimate search persons, in this case as well, based on the shot date when the search persons thereof were photographically taken together in the same way as described above, the central processing unit 20 detects, of the shot positions photographically taken together, the shot position photographically taken on the latest shot date.

Moreover, upon detecting the shot position, in the same way as described above, the central processing unit 20 indicates the shot position thereof on the map to generate a shot position icon that is available as a search key for photo image search. In this way, the central processing unit 20 also generates a single or multiple shot position icons indicating a shot position where the search persons were photographically taken together.

Subsequently, the central processing unit 20 records the personal identification information and the face icon thereof in the RAM 22 in a correlated manner. Also, the central processing unit 20 also records the shot position icon, and the shot position information indicating the shot position detected for generation of this shot position icon in the RAM 22 in a correlated manner.

Further, based on the multiple face icons indicating the faces of the reference person and the search person, the shot position icon, and information indicating the relationship between the reference person and the search person (intimate persons), the central processing unit 20 generates person presenting image data for presenting a search person having intimacy with the reference person. Subsequently, the central processing unit 20 transmits the person presenting image data thereof to the digital processing unit 31.

In the event that the person presenting image data has been provided from the central processing unit 20, each time unit image data is generated, the digital processing unit 31 synthesizes this unit image data with the person presenting image data to generate synthesized image data.

Figure 20:
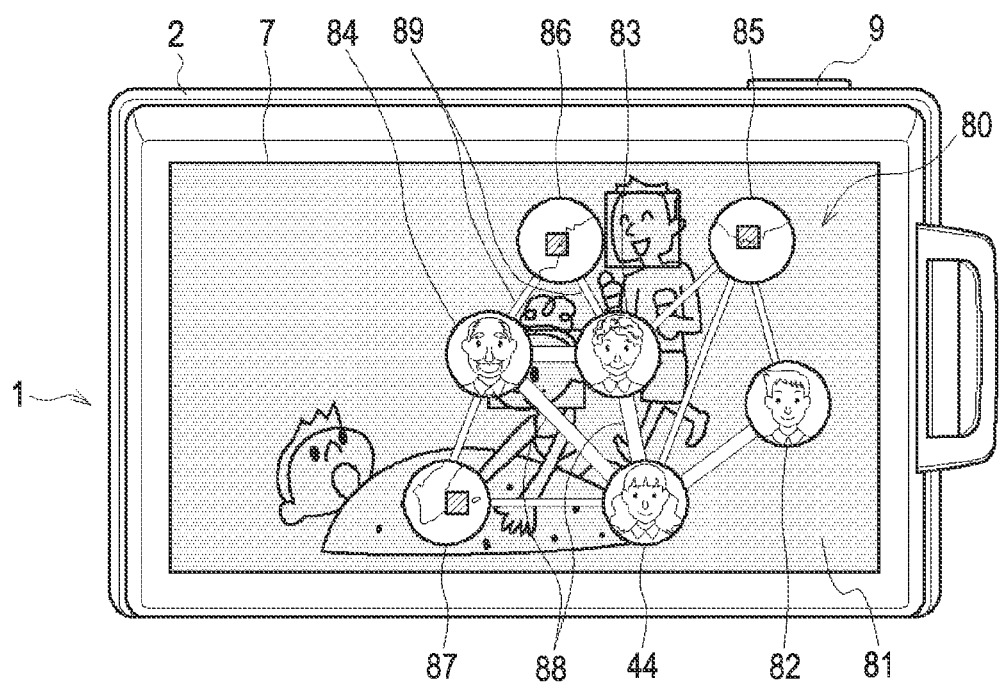
FIG. 20 is a schematic diagram illustrating a configuration of a person presenting image.

Subsequently, the digital processing unit 31 sequentially transmits the synthesized image data to the liquid crystal panel 7B. Thus, such as illustrated in FIG. 20, the digital processing unit 31 displays the shooting status presenting image 40, and also displays a person presenting image 80 above this shooting status presenting image 40.

This person presenting image 80 includes an icon layout image 81 covering the whole of the shooting status presenting image 40. Also, a face icon 44 indicating the face of the reference person, and face icons 82 through 84 indicating the faces of search persons are mutually and separately disposed above the icon layout image 81. Also, above the icon layout image 81, shot position icons 85 through 87 are mutually separated, and also separately disposed from each of the face icons 44, and 82 through 84.

Further, above the icon layout image 81, a connecting line image 88 for connecting the face icons 44, and 82 through 84 of intimate persons (a reference person and a search person, search persons) is also disposed. Moreover, above the icon layout image 81, a connecting line image 89 for connecting the face icons 44, and 82 through 84 of persons photographically taken together (a reference person and a search person, search persons), and shot position icons 85 through 87 indicating the shot positions of the photo shooting thereof is also disposed.

In this case, the icon layout image 81 is generated so that the whole of the shooting status presenting image 40 serving as a background can be seen though, for example, such as a fine mesh pattern or polka-dot pattern drawn in a solid color such as gray.

Accordingly, while allowing the user to view the whole of the shooting status presenting image 40 to some extent by the icon layout image 81, the central processing unit 20 allows the user to view the face icons 44, and 82 through 84, and the shot position icons 85 through 87, and so forth so as to be clearly distinguished from the shooting status presenting image 40.

Also, the connecting line image 88 for connecting the face icons 44, and 82 through 84 has been generated so that the line type and color and the like thereof differ from those of the connecting line image 89 for connecting the face icons 44, and 82 through 84, and the shot position icons 85 through 87.

Accordingly, the central processing unit 20 is configured so as to allow the user to accurately recognize intimate persons, and persons photographically taken together by the connecting line images 88 and 89 in a clearly distinguished manner.

In this way, the central processing unit 20 can notify the user of the person (reference person) specified as the face icon 44 by the user, and an intimate person (search person) using the faces (face icons) of these persons by displaying the person presenting image 80 on the liquid crystal panel 7B.

Also, the central processing unit 20 can notify the user of both of persons (a reference person and a search person) photographically taken together, and the shot position of the photo shooting thereof (shot position icon) using the person presenting image 80 thereof.

In the case that the person presenting image 80 has been displayed on the liquid crystal panel 7B, the central processing unit 20 allows the user to specify the face icons 44, and 82 through 84 within the person presenting image 80, and the shot position icons 85 through 87 as a search key for photo image search by a tapping operation.

Figure 21:
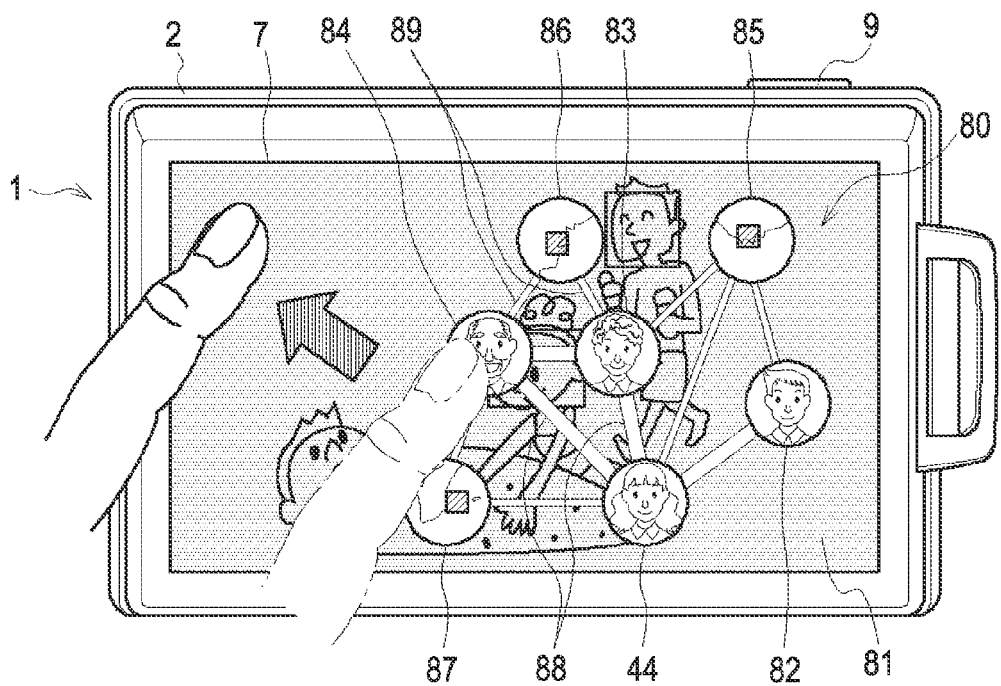
FIG. 21 is a schematic diagram for describing another person search.

Also, such as illustrated in FIG. 21, in the event that, in a state in which the person presenting image 80 has been displayed on the liquid crystal panel 7B, the user has performed a sliding operation with the face icon 84 indicating the face of a search person as the origin, the central processing unit 20 recognizes that search of a person has been requested again.

At this time, the central processing unit 20 reads out the personal identification information corresponding to the face icon 84 specified by the user as the origin of a sliding operation from the RAM 22. Also, the central processing unit 20 also reads out the reference personal identification information, and the personal identification information of other search persons from the RAM 22.

Incidentally, with the following description, the personal identification information corresponding to the face icon 84 specified by the user as the origin of a sliding operation will also be referred to particularly as specified personal identification information, and the search person of the face indicated by the specified face icon 84 will also be referred to particularly as a specified person. Also, with the following description, search person other than a specified person will also be referred to as other search persons, and the personal identification information of the other search persons will also be referred to particularly as other personal identification information.

Subsequently, the central processing unit 20 determines whether or not the specified personal identification information is correlated in the database DB for search with intimacy correlated information indicating other than the reference personal identification information and other personal identification information.

In the event that the specified personal identification information is correlated with intimacy correlated information indicating other than the reference personal identification information and other personal identification information, the central processing unit 20 reads out the personal identification information of a new search person determined by intimacy correlated information excluding the reference person and other search persons from the database DB for search. Also, the central processing unit 20 also reads out the face icon correlated with the personal identification information of the new search person thereof from the database DB for search.

That is to say, the central processing unit 20 further searches the specified person indicated by the face icon 84 specified by the user as the origin of a sliding operation, and a single person or multiple persons having a high intimacy degree with the specified person.

Also, with the database DB for search, the central processing unit 20 generates a shot position icon in the same way as described above based on the reference person, and the shot date information and shot position information corresponding to all of the search persons (including a specified person and other search persons) searched up to this point of time.

Further, with the database DB for search, the central processing unit 20 also detects whether or not there are intimate persons of all the search persons (including a specified person and other search persons) searched up to this point of time.

Moreover, in the event that there are intimate persons of all the search persons (including a specified person and other search persons) searched up to this point of time, the central processing unit 20 also generates a shot position icon.

Subsequently, the central processing unit 20 records the personal identification information and face icon of the new search person in the RAM 22 in a correlated manner. Also, the central processing unit 20 also additionally records the new generated shot position icon, and the shot position information indicating the shot position detected for generation of this shot position icon in the RAM 22 in a correlated manner.

Moreover, the central processing unit 20 generates person presenting image data again so as to add the face icon of the new search person, the new generated shot position icon, and the relationship of a reference person and a search person (including a specified person and other search persons). Subsequently, the central processing unit 20 transmits the person presenting image data of which the content has thus been updated to the digital processing unit 31.

In the event that the person presenting image data of which the content has been updated has been provided from the central processing unit 20, each time unit image data is generated, the digital processing unit 31 synthesizes this unit image data with the updated person presenting image data instead of the person presenting image data before updating to generate synthesized image data.

Figure 22:
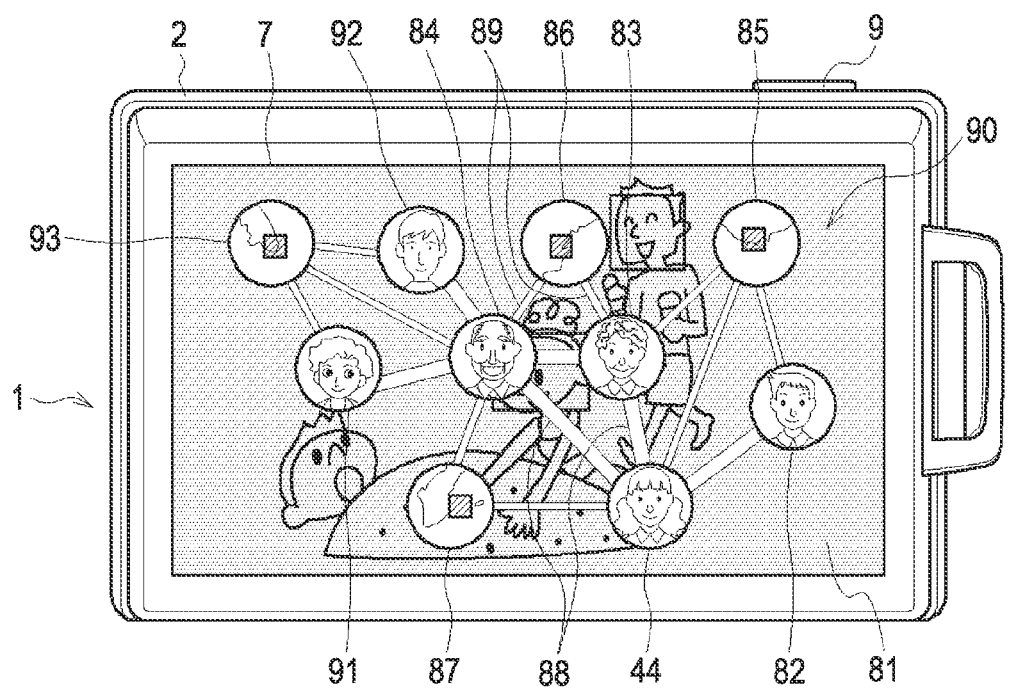
FIG. 22 is a schematic diagram illustrating another configuration of the person presenting image.

Subsequently, the digital processing unit 31 sequentially transmits the synthesized image data to the liquid crystal panel 7B. Thus, such as illustrated in FIG. 22 in which the same reference numeral is appended to a portion corresponding to that in FIG. 20, the digital processing unit 31 displays the shooting status presenting image 40, and also displays a person presenting image 90 above this shooting status presenting image 40. This person presenting image 90 has basically the same configuration as the above person presenting image 80, to which new face icons 91 and 92, and a shot position icon 93 are added.

Thus, in the event that a search person has been specified on the person presenting image 80 displayed on the liquid crystal panel 7B, and search of a person has been requested, in response to this, based on the specified search person, the central processing unit 20 can further search and present a person.

Subsequently, in the case that the person presenting image 90 is displayed on the liquid crystal panel 7B, the central processing unit 20 allows the user to specify new faces icons 91 and 92, and a new shot position icon 93 within this person presenting image 90 by a tapping operation as a search key for photo image search.

Actually, in the event that, in a state in which the person presenting images 80(90) has been displayed on the liquid crystal panel 7B, the user has specified the face icon 44(82 through 84, 91, 92) by a tapping operation, in the same way as described above, the central processing unit 20 generates a face search photo image to display this on the liquid crystal panel 7B.

Also, after displaying the face search photo image on the liquid crystal panel 7B, the central processing unit 20 can switch the display to a photo image according to a tapping operation in the same way as described above, and also can return to the display of the face search photo image from the photo image.

Further, after displaying the face search photo image on the liquid crystal panel 7B, in the same way as described above, in the event that the user has specified a face icon by a tapping operation, the central processing unit 20 displays the shooting status presenting image 40 and also the person presenting image 80(90) on the liquid crystal panel 7B again instead of the face search photo image.

In this way, the central processing unit 20 allows the user to specify a reference person as the face icon 44 to view the photo image of this specified reference person. Also, the central processing unit 20 also allows the user to specify a search person searched based on the reference person as the face icon 82(through 84, 91, 92) to allow the user to view the photo image of the specified search person as appropriate.

On the other hand, in the event that the user has specified the shot position icon 85(86, 87, 93) within the person presenting image 80(90) by a tapping operation, the central processing unit 20 reads the shot position information corresponding to this specified shot position icon 85(86, 87, 93) from the RAM 22.

At this time, the central processing unit 20 sets the same search area as the above search area with the shot position indicated by the shot position information thereof as the center. Also, the central processing unit 20 searches, in the same way as described above, the shot position information indicating a shot position within the search area thereof as search shot position information, and also classifies this searched search shot position information by events. Further, the central processing unit 20 detects the event position for each event classified from the search shot position information.

Moreover, the central processing unit 20 reads out a portion equivalent to the search area within the map image data as area map image data from the recording device 33. Subsequently, the central processing unit 20 generates, in the same way as described above, map image data for search so as to synthesize the area map image data thereof with an event position icon, and transmits the generated map image data for search to the digital processing unit 31.

Thus, the central processing unit 20 displays the map image for search having the same configuration as the map image 65 for search described above regarding FIG. 16 on the liquid crystal panel 7B via the digital processing unit 31. Incidentally, at this time, the central processing unit 20 records the event identification information indicating an event classified from the search shot position information, the event position information indicating the event position of this event, and a search key icon in the RAM 22 in a correlated manner.

After displaying the map image for search on the liquid crystal panel 7B, the central processing unit 20 can switch, in the same way as described above, the display to the event search photo image according to a tapping operation, or can return the display from the event search photo image to the map image for search.

Also, after displaying the event search photo image on the liquid crystal panel 7B, the central processing unit 20 can switch, in the same way as described above, the display to the photo image according to a tapping operation, or can return the display from the photo image to the event search photo image.

Further, even after displaying the event search photo image on the liquid crystal panel 7B, in the same way as described above, in the event that the user has specified a search key icon by a tapping operation, the central processing unit 20 displays the shoot status presenting image 40 and the person presenting image 80(90) again instead of the event search photo image.

In this way, the central processing unit 20 allows the user to specify a shot position as a search key icon as appropriate, and allows the user to view a photo image of a reference person and a search person, or search persons photographically taken together at the specified shot position.

Also, the central processing unit 20 allows the user to view not only a photo image of a reference person and a search person, or search persons photographically taken together but also other photo images photographically taken and generated at the event where the photo shooting thereof has been performed, as appropriate.

Incidentally, in the event that, in a state in which the person presenting image 80(90) has been displayed, the user has continuously performed a tapping operation twice regarding a portion other than a portion facing a search key icon of the touch panel 7A, the central processing unit 20 controls the digital processing unit 31 to return the display of the liquid crystal panel 7B.

Under the control of the central processing unit 20, each time unit image data is generated, the digital processing unit 31 synthesizes this unit image data with the icon presenting image data instead of the person presenting image data to generate synthesized image data, and transmits this to the liquid crystal panel 7B. Thus, the digital processing unit 31 displays the shooting status presenting image 40 and the icon presenting image 42(62) on the liquid crystal panel 7B instead of the shooting status presenting image 40 and the person presenting image 80(90).

In this way, even after displaying the shooting status presenting image 40 and the person presenting image 80(90) on the liquid crystal panel 7B, the central processing unit 20 allows the user to return the display thereof to the display of the shooting status presenting image 40 and the icon presenting image 42(62) by a simple operation.

Incidentally, as a result of determining whether or not the reference personal identification information is correlated with the intimacy correlated information such as described above, in the event that the reference personal identification information is not correlated with the intimacy correlated information, the central processing unit 20 does not generate the person presenting image 80.

Also, even after generating the person presenting image 80, in the event that the specified personal identification information is not correlated with the intimacy correlated information indicating other than the reference personal identification information and the other personal identification information, the central processing unit 20 does not update the content of this person presenting image 80.

Note that, in the case of the present embodiment, after returning the display of the shooting status presenting image 40 and the person presenting image 80(90) to the display of the shooting status presenting image 40 and the icon presenting image 42(62), the central processing unit 20 executes the icon generating processing, icon detection processing, and the like again.

Further, in the event that, in a state in which the shooting status presenting image 40 has been displayed on the liquid crystal panel 7B along with the icon presenting image 42(62) or the like, the user has performed a sliding operation with the search utilization face as the origin, at this time as well, the central processing unit 20 recognizes that search of a person has been requested.

At this time, the central processing unit 20 reads out the personal identification information corresponding to the search utilization face specified by the user as the origin of a sliding operation from the RAM 22 as reference personal identification information. Subsequently, the central processing unit 20 searches, with the person of the search utilization face thereof as a reference person, based on the reference personal identification information in the same way as described above, a single person and multiple persons having a high intimacy degree with this reference person.

Also, the central processing unit 20 generates a shot position icon by detecting a shot position where a reference person and a search person have photographically taken together, or a shot position where search persons have photographically taken together.

Subsequently, based on multiple face icons indicating the faces of a reference person and a search person, the shot position icon, and information indicating the relationship between a reference person and a search person (intimate persons), the central processing unit 20 generates person presenting image data having the same configuration as described above to transmit this to the digital processing unit 31.

Thus, the central processing unit 20 displays, in the same way as described above regarding FIG. 20, the shooting status presenting image 40 on the liquid crystal panel 7B, and also displays the person presenting image above this shooting status presenting image 40.

Subsequently, after displaying the person presenting image on the liquid crystal panel 7B, the central processing unit 20 updates, in the same way as described above as appropriate, the person presenting image thereof, and switches the display to the face search photo image, map image for search, or photo image.

Note that, in the case of the present embodiment, after returning the display of the shooting status presenting image 40 and the person presenting image to the display of the shooting status presenting image 40 and the icon presenting image 42(62), the central processing unit 20 executes the icon generating processing, icon detection processing, and so forth.

1-6. Image-Related Information Registration Processing Procedures

Next, description will be made regarding an image-related information registration processing procedures RT1 that the central processing unit 20 executes in accordance with an image-related information registration program each time photo shooting of a subject is performed, with reference to FIGS. 23 and 24.

Figure 23:
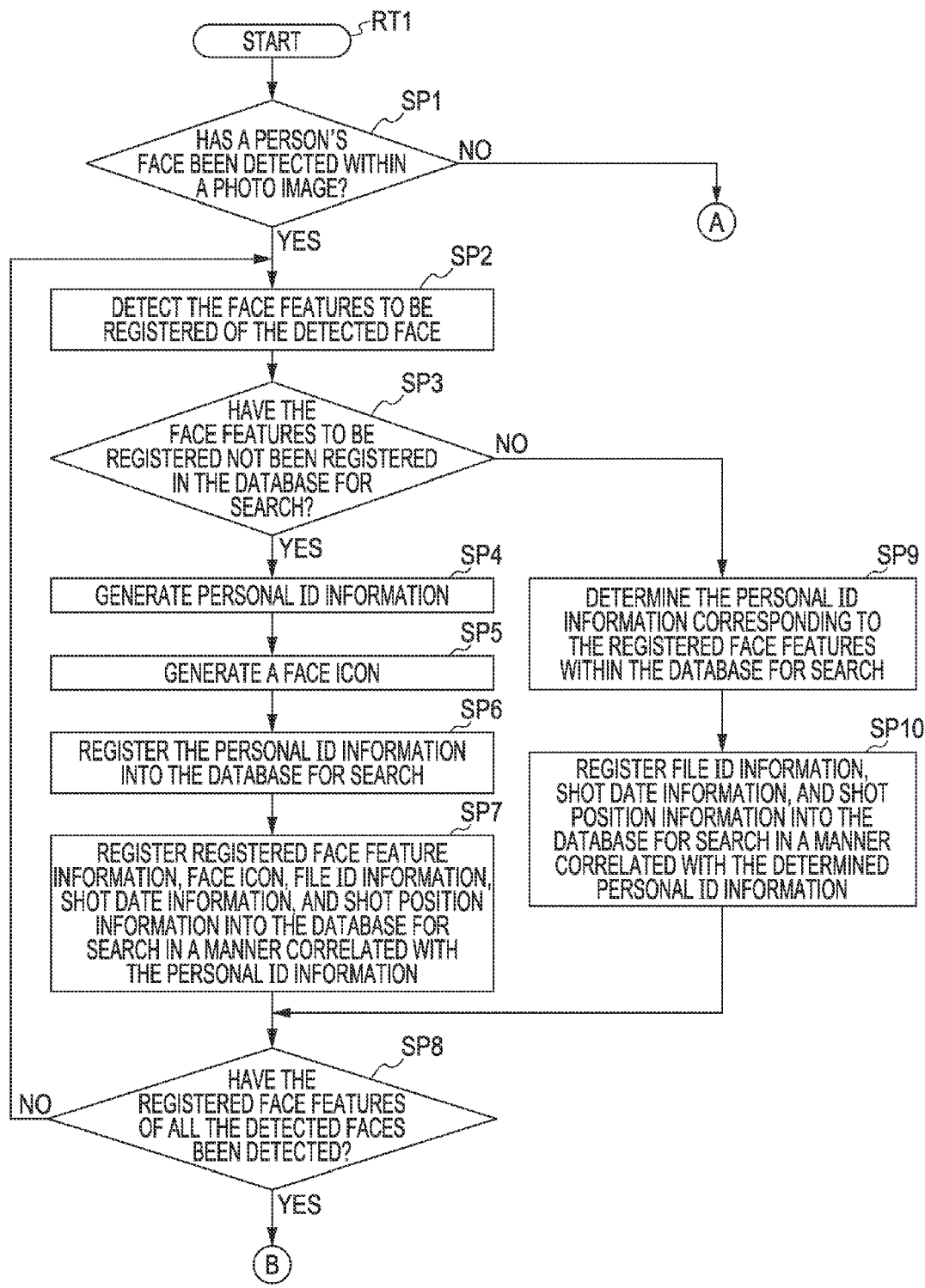
FIG. 23 is a flowchart illustrating image-related information registration processing procedures.
Figure 24:
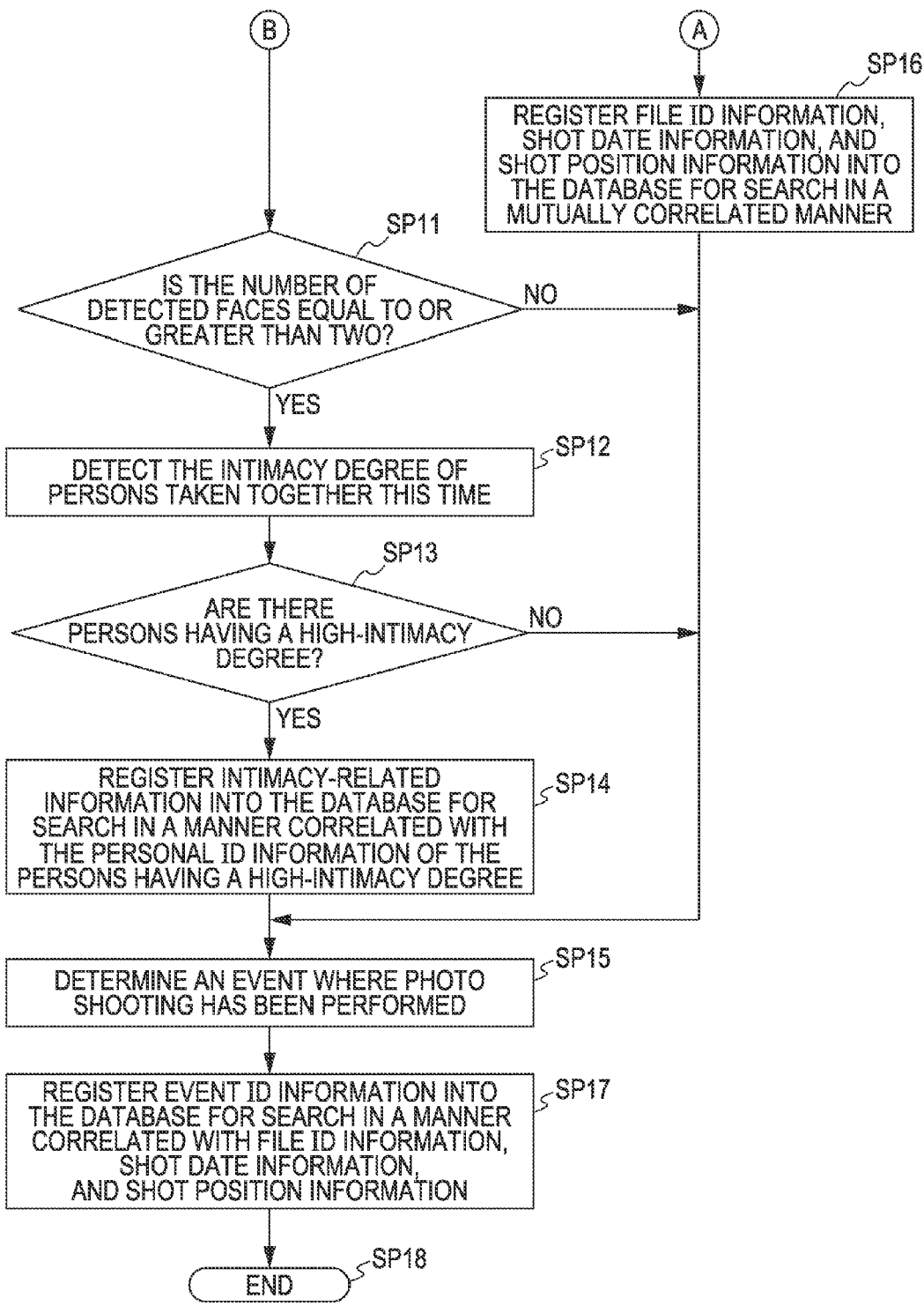
FIG. 24 is a flowchart illustrating another image-related information registration processing procedures.

After recording an image file generated according to photo shooting of a subject in the recording device 33, the central processing unit 20 starts the image-related information registration processing procedures RT1 illustrated in FIGS. 23 and 24 in accordance with the image-related information registration program stored beforehand in the ROM 21.

After starting the image-related information registration processing procedures RT1, in step SP1 the central processing unit 20 determines whether or not a person's face has been detected within the photo image based on photo image data generated by photographically taking a subject at this time.

Upon obtaining a positive result in step SP1, this means that a single person or multiple persons have photographically been taken as a subject this time, and photo image data and face detection information have been provided from the digital processing unit 31. Upon obtaining such a positive result in step SP1, the central processing unit 20 proceeds to the next step SP2.

In step SP2, the central processing unit 20 determines and analyzes a face portion within the photo image based on the face detection information, thereby detecting the features of the face thereof as registered face features for registration to the database DB for search, and proceeds to the next step SP3.

In step SP3, the central processing unit 20 determines whether or not the registered face features detected at this time have been registered in the database DB for search. Upon obtaining a positive result in this step SP3, this means that the person of a face having the registered face features detected at this time has photographically been taken for the first time at the digital still camera 1, and accordingly, the registered face features have not been registered in the database DB for search yet. Upon obtaining such a positive result in step SP3, the central processing unit 20 proceeds to the next step SP4.

In step SP4, the central processing unit 20 generates personal identification information of the person of the face having the registered face features detected at this time, and proceeds to the next step SP5. In step SP5, the central processing unit 20 crops out the face portion of the person thereof from the photo image as a face image, generates a face icon based on this face image, and proceeds to the next step SP6.

Subsequently, in step SP6, the central processing unit 20 registers the personal identification information in the database DB for search, and proceeds to the next step SP7. Also, in step SP7, the central processing unit 20 registers the registered face feature information, face icon, file identification information, shot date information, and shot position information in the database DB for search in a manner correlated with the personal identification information, and proceeds to the next step SP8.

In step SP8, the central processing unit 20 determines whether or not the registered face features of all the faces detected within the photo image have been detected. As a result thereof, at this time the registered face features of all the faces detected within the photo image have not been detected yet, and accordingly, upon obtaining a negative result, the central processing unit 20 returns to step SP2.

Also, upon obtaining a negative result in the above step SP3, this means that the person of a face having the registered face features detected at this time has photographically been taken at the digital still camera 1, and accordingly, the registered face features have already been registered in the database DB for search. Upon obtaining such a negative result in step SP3, the central processing unit 20 proceeds to step SP9.

In step SP9, the central processing unit 20 determines the personal identification information in the database DB for search, corresponding to the registered face features detected at this time, and proceeds to the next step SP10.

In step SP10, the central processing unit 20 registers the file identification information, shot date information, and shot position information in the database DB for search in a manner correlated with the determined personal identification information, and proceeds to step SP8.

In the event that the number of faces detected within the photo image is one, the central processing unit 20 executes one of the processing in steps SP2 through SP8, and processing in steps SP2, SP3, SP9, SP10, and SP8.

Also, in the event that the number of faces detected within the photo image is greater than one, the central processing unit 20 repeatedly executes the processing in steps SP2 through SP8, and the processing in steps SP2, SP3, SP9, SP10, and SP8 by the number of faces worth as appropriate.

In this way, the central processing unit 20 registers the personal identification information, registered face feature information, face icon, file identification information, shot date information, and shot position information, or file identification information, shot date information, and shot position information in the database DB for search for each face detected within the photo image.

In step SP8, the central processing unit 20 has detected the registered face features of all the faces detected within the photo image, and accordingly, registration of the file identification information, shot date information, and shot position information, and so forth has been completed, and accordingly, upon obtaining a positive result, the central processing unit 20 proceeds to step SP11.

In step SP11, the central processing unit 20 determines whether or not the number of faces detected within the photo image is greater than one. Upon obtaining a positive result in step SP11, this means that multiple persons have photographically been taken together this time. Upon obtaining such a positive result in step SP11, the central processing unit 20 proceeds to the next step SP12.

In step SP12, the central processing unit 20 detects the intimacy degree of persons photographically taken together this time based on the face detection information and the analysis results of face portions relating to multiple persons detected within the photo image, and proceeds to step SP13.

In step SP13, the central processing unit 20 determines whether or not there are persons having a high intimacy degree of multiple persons photographically taken together this time. Upon obtaining a positive result in step SP13, this means that intimate persons have photographically been taken together. Upon obtaining a positive result in step SP13, the central processing unit 20 proceeds to the next step SP14.

In step SP14, the central processing unit 20 registers the intimacy correlated information for mutually correlating persons having a high intimacy degree in the database DB for search in a manner correlated with the personal identification information of these persons having a high intimacy degree, and proceeds to the next step SP15.

Incidentally, upon obtaining a negative result in the above step SP1, this means that scenery, a building, an animal, or the like other than persons has photographically been taken as a subject this time. Upon obtaining such a negative result in step SP1, the central processing unit 20 proceeds to step SP16.

Subsequently, in step SP16, the central processing unit 20 registers the file identification information, shot date information, and shot position information in the database DB for search in a mutually correlated manner, and proceeds to step SP15.

In step SP15, the central processing unit 20 determines an event where photo shooting has been performed this time, based on the shot dates and shot positions of the last and this photo shootings, and proceeds to the next step SP17.

In step SP17, the central processing unit 20 registers the event identification information of the determined event in the database DB for search in a manner correlated with the file identification information, shot date information, and shot position information registered this time. Subsequently, upon completing the registration thereof, the central processing unit 20 proceeds to the next step SP18, and ends the image-related information registration processing procedures RT1.

1-7. Search Key Presenting Processing Procedures

Next, description will be made regarding search key presenting processing procedures RT2 that the central processing unit 20 executes, for example, in accordance with a search key presenting program that is a part of an image search program in the shooting mode, with reference to FIGS. 25 and 26.

Figure 25:
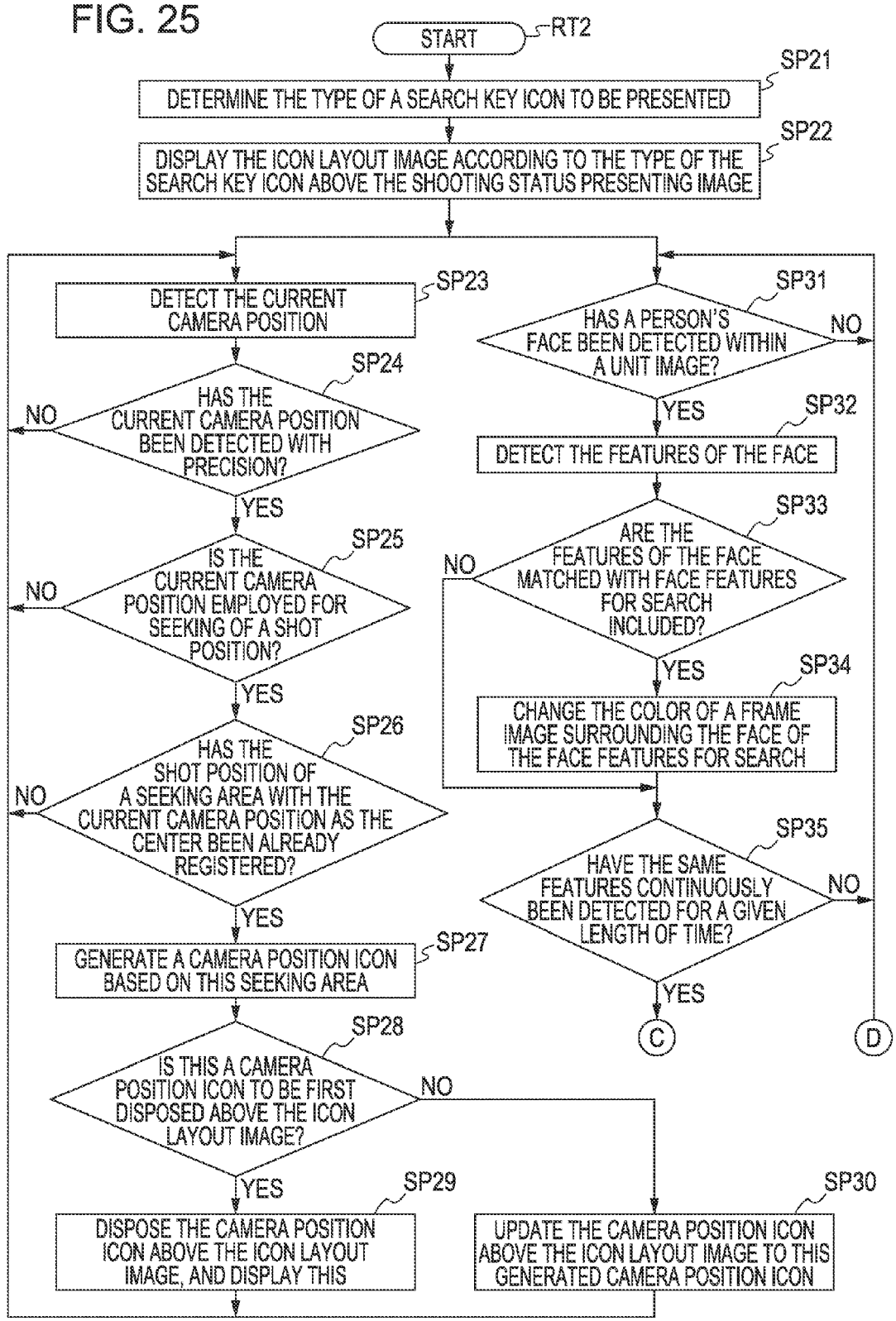
FIG. 25 is a flowchart illustrating search key presentation processing procedures.
Figure 26:
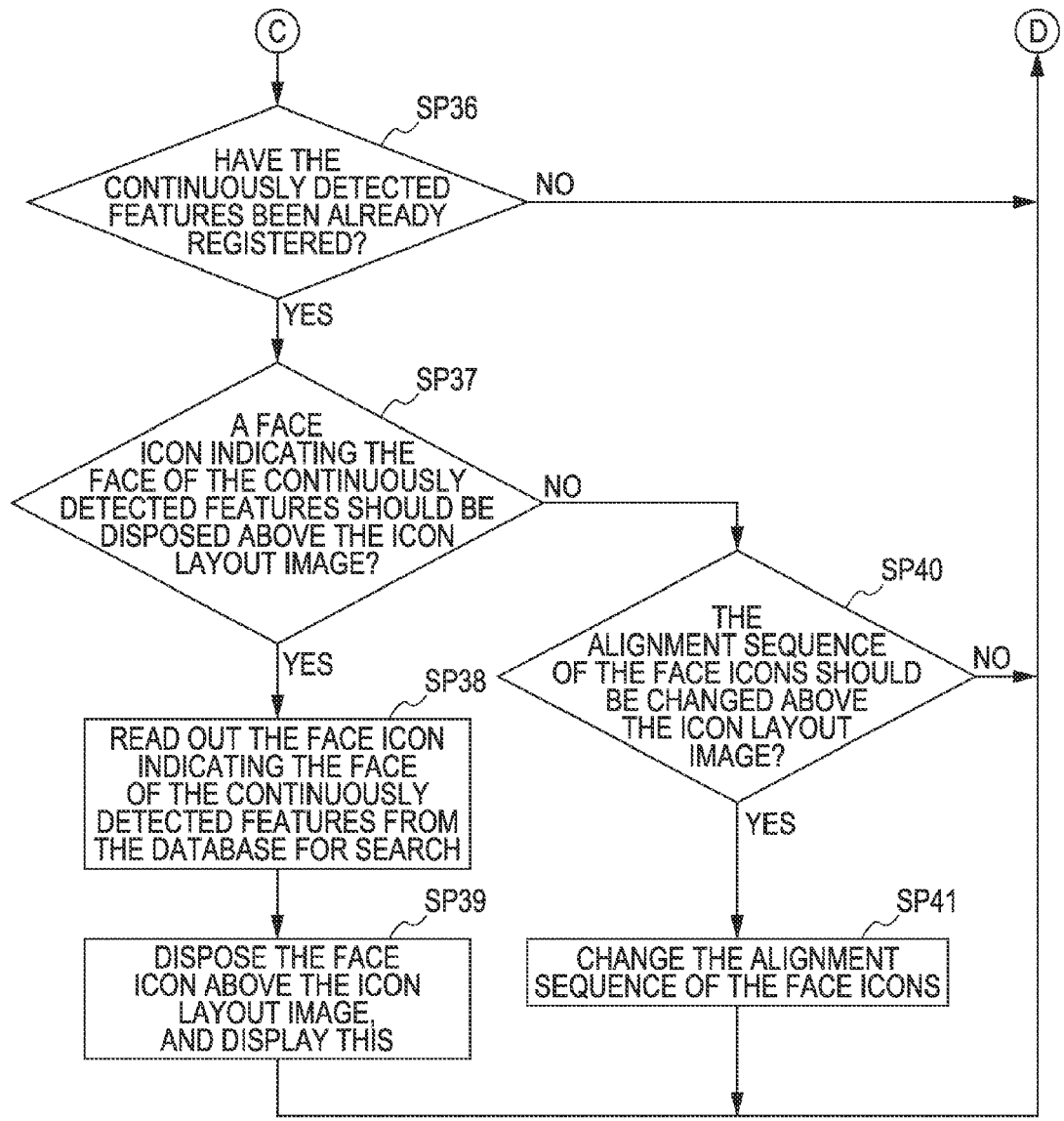
FIG. 26 is a flowchart illustrating other search key presentation processing procedures.
Figure 27:
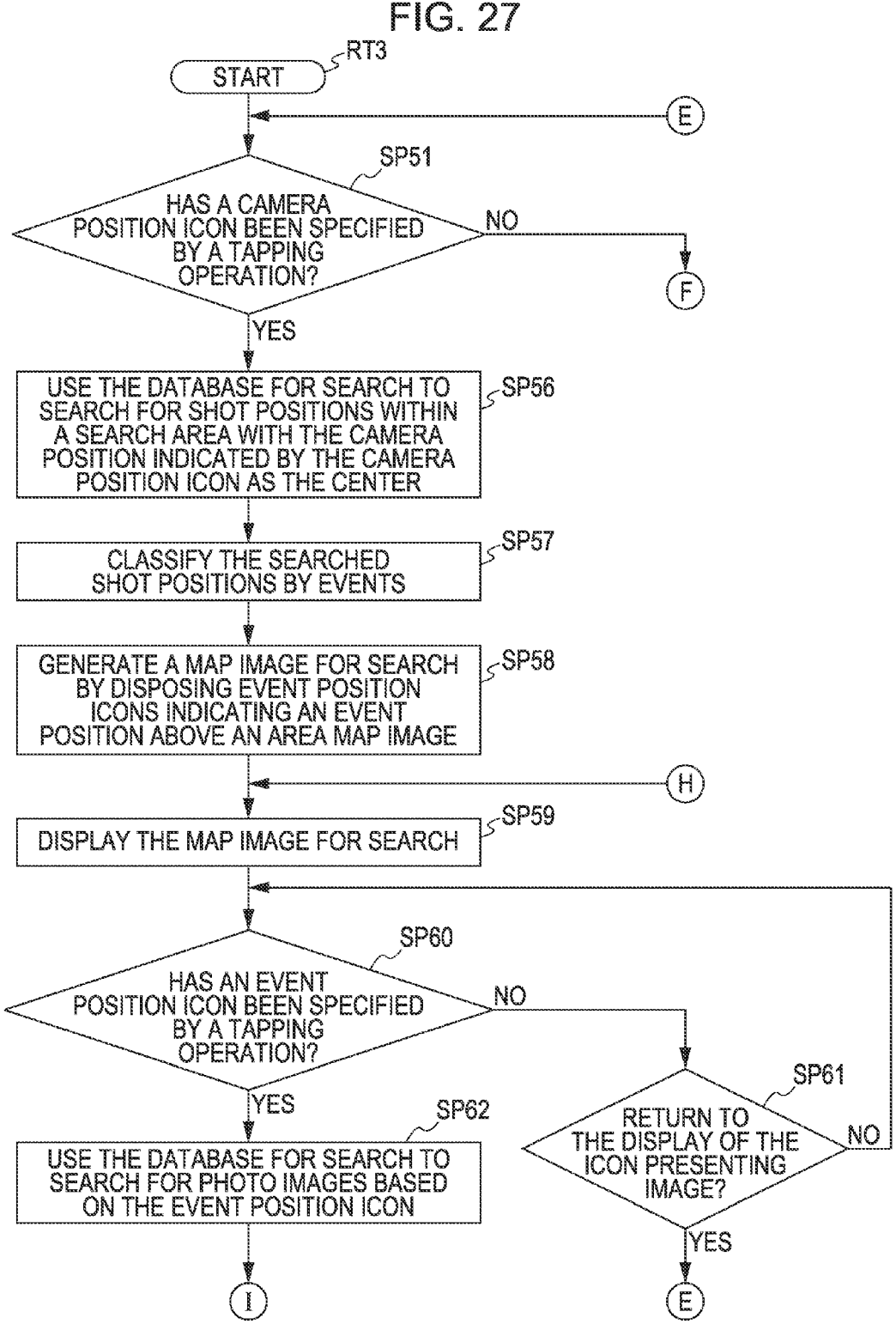
FIG. 27 is a flowchart illustrating image search processing procedures.
Figure 28:
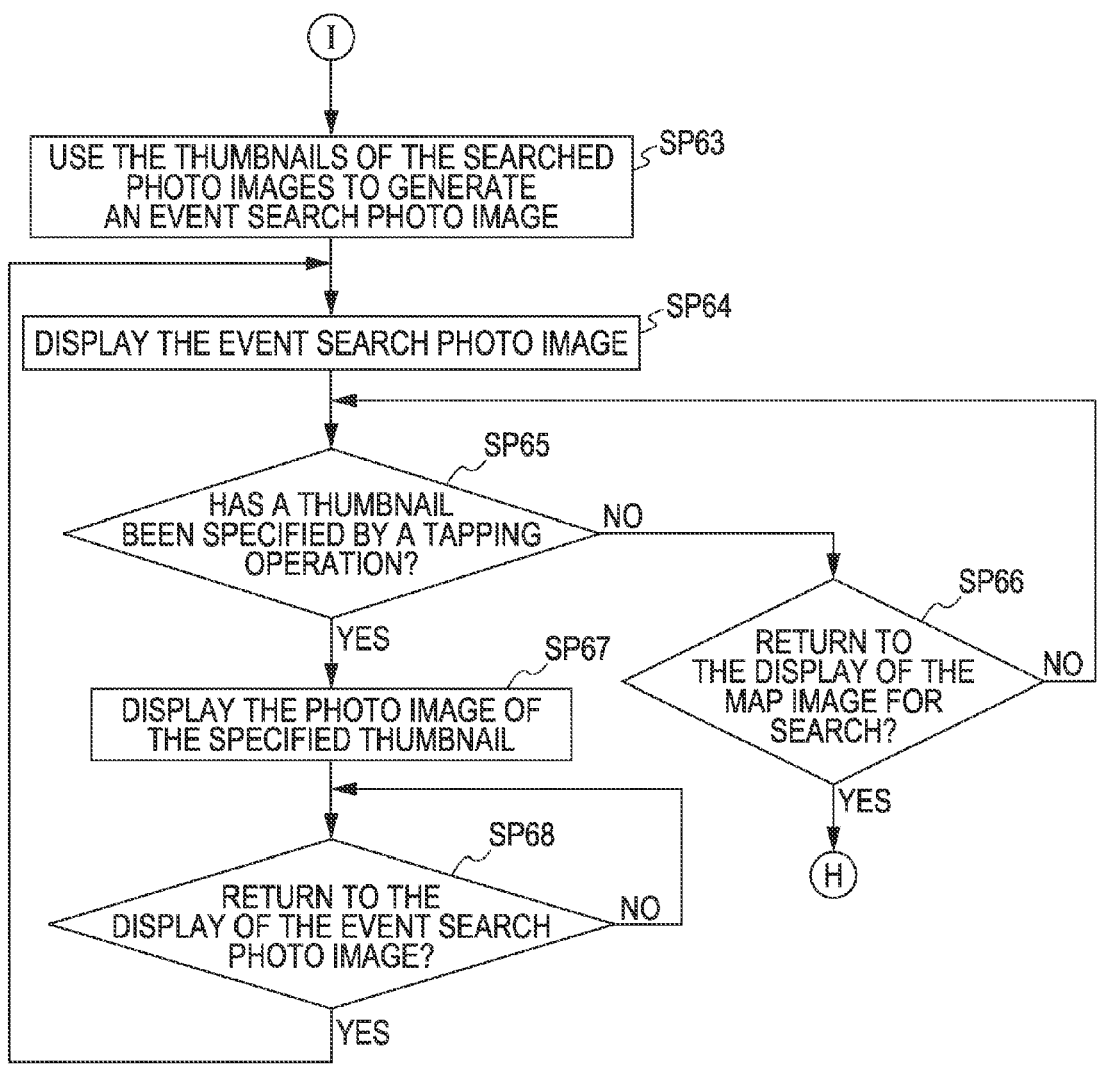
FIG. 28 is a flowchart illustrating other image search processing procedures.
Figure 29:
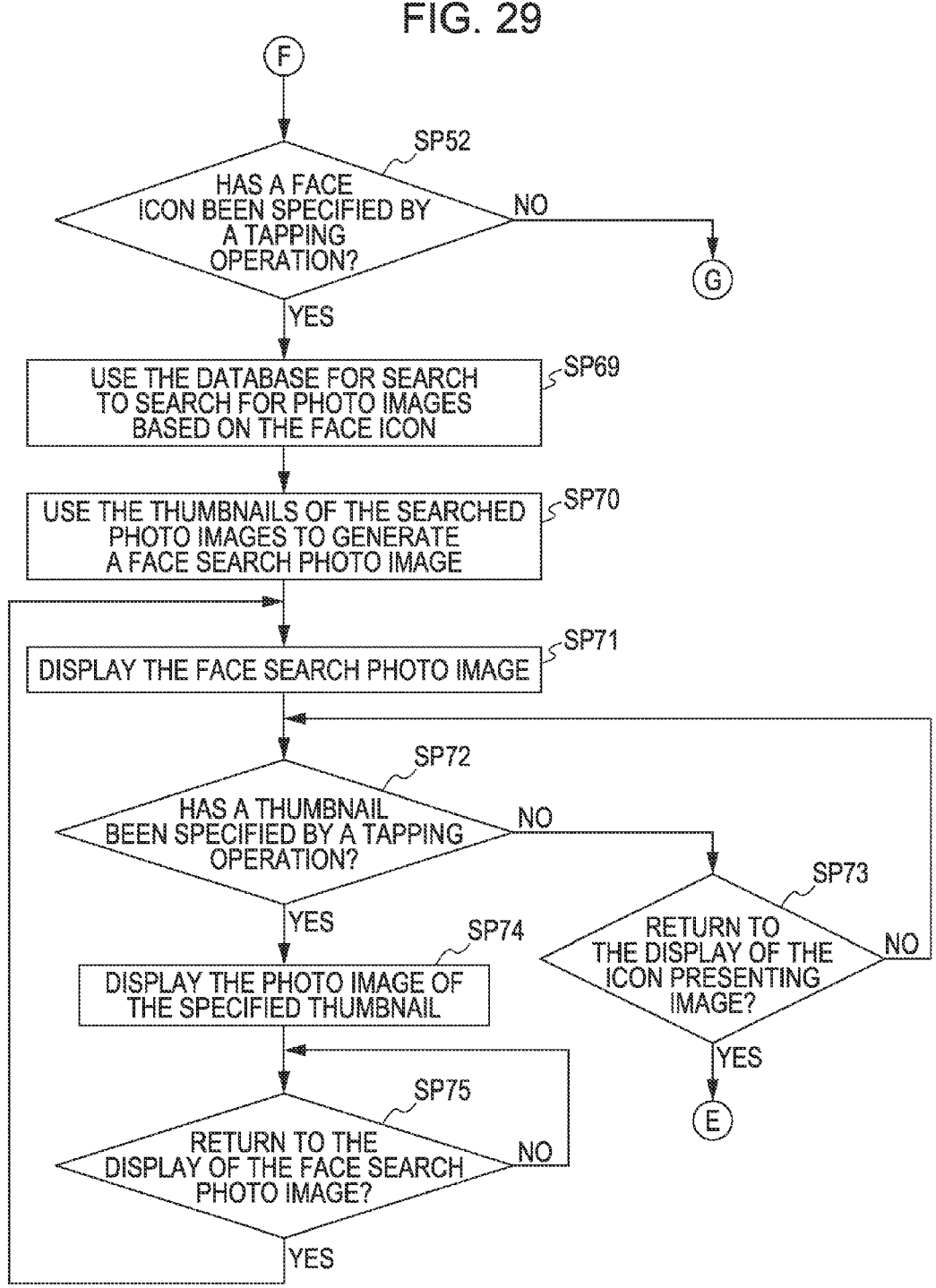
FIG. 29 is a flowchart illustrating yet other image search processing procedures.
Figure 30:
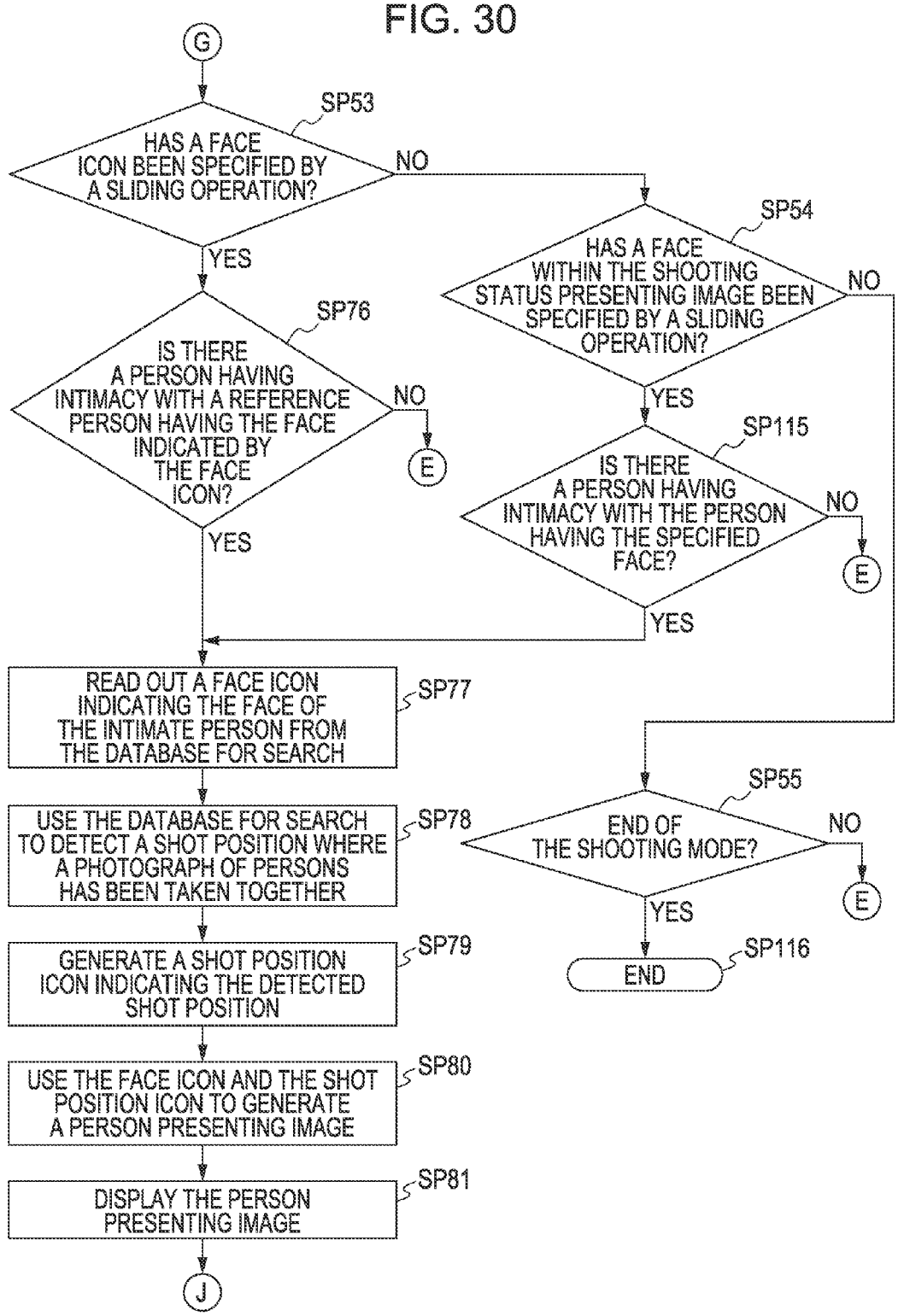
FIG. 30 is a flowchart illustrating yet other image search processing procedures.
Figure 31:
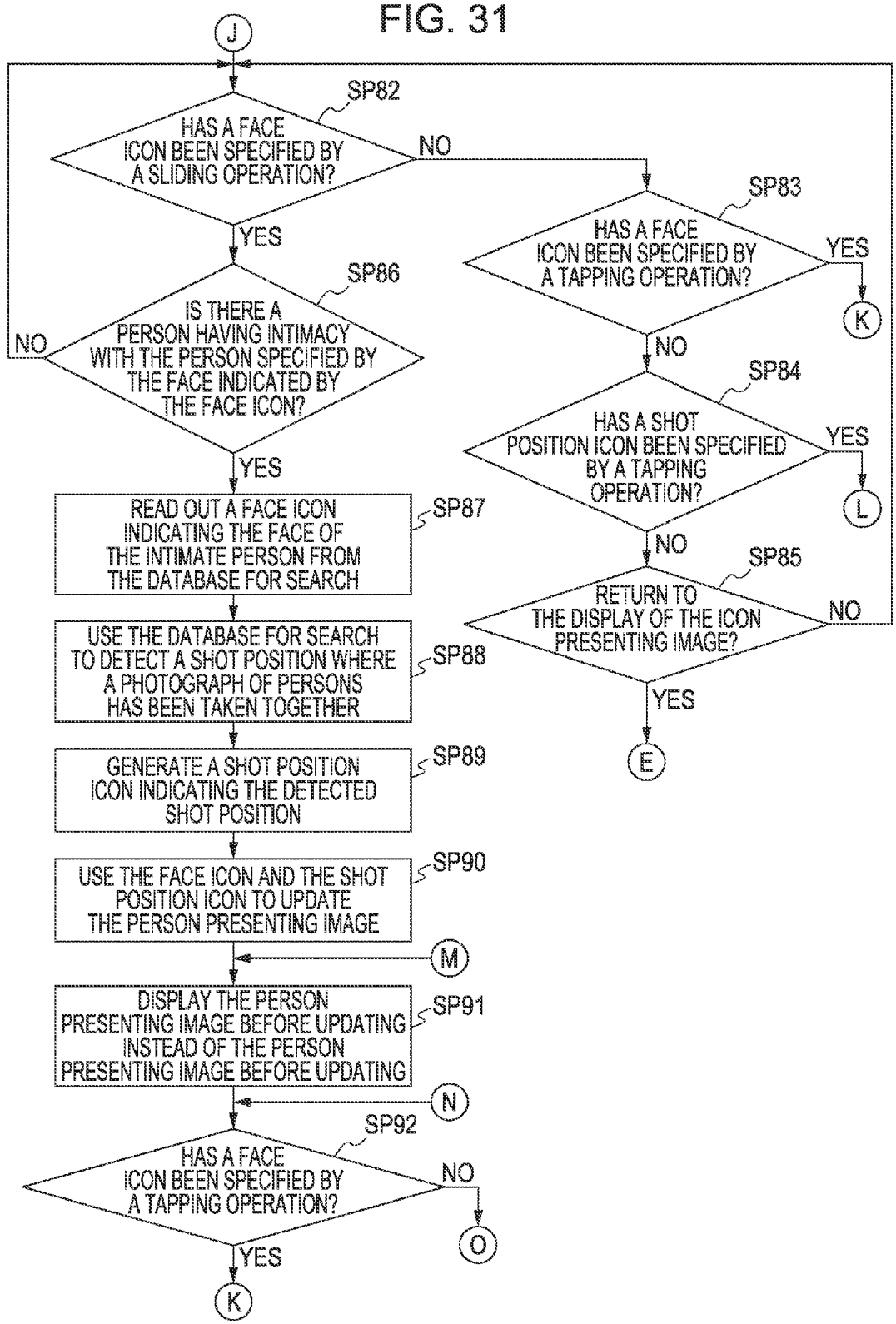
FIG. 31 is a flowchart illustrating yet other image search processing procedures.
Figure 32:
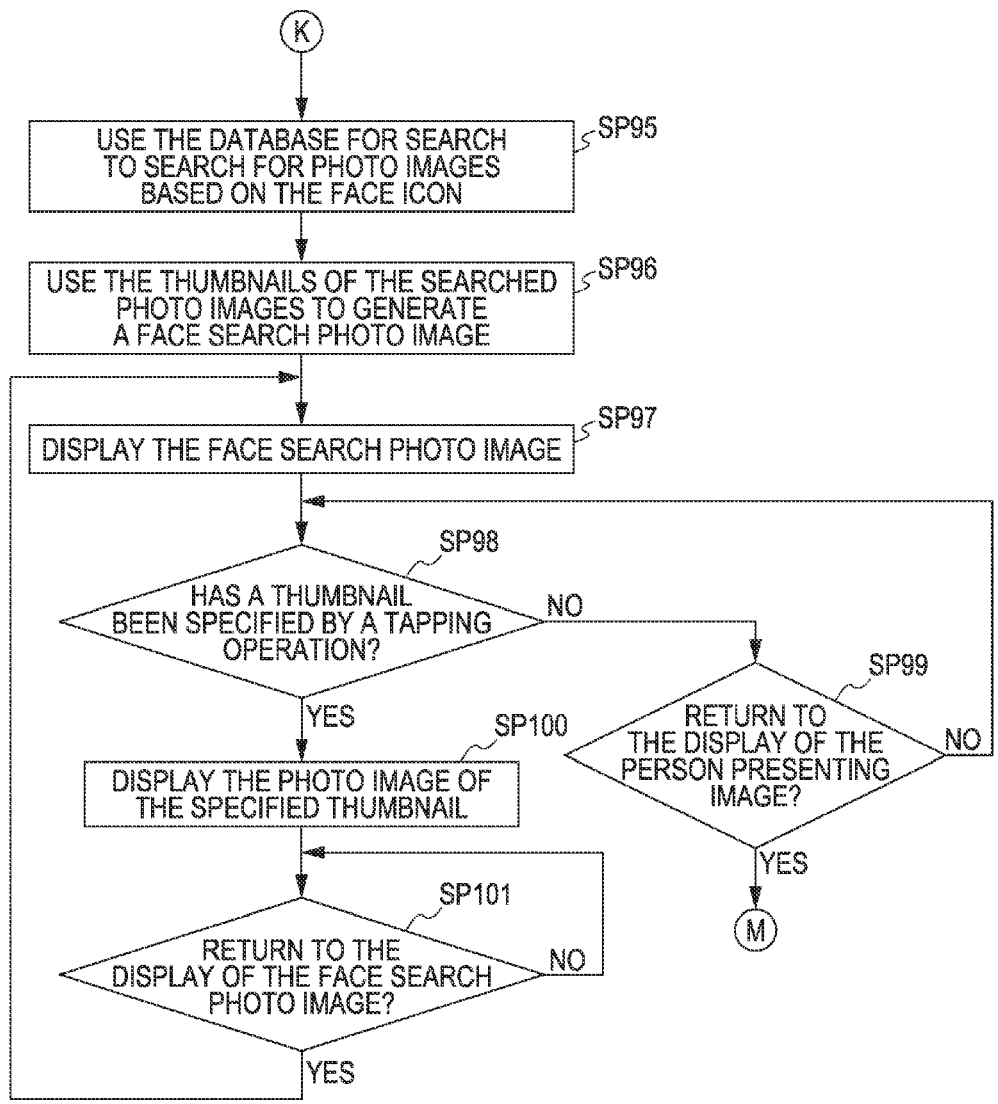
FIG. 32 is a flowchart illustrating yet other image search processing procedures.
Figure 33:
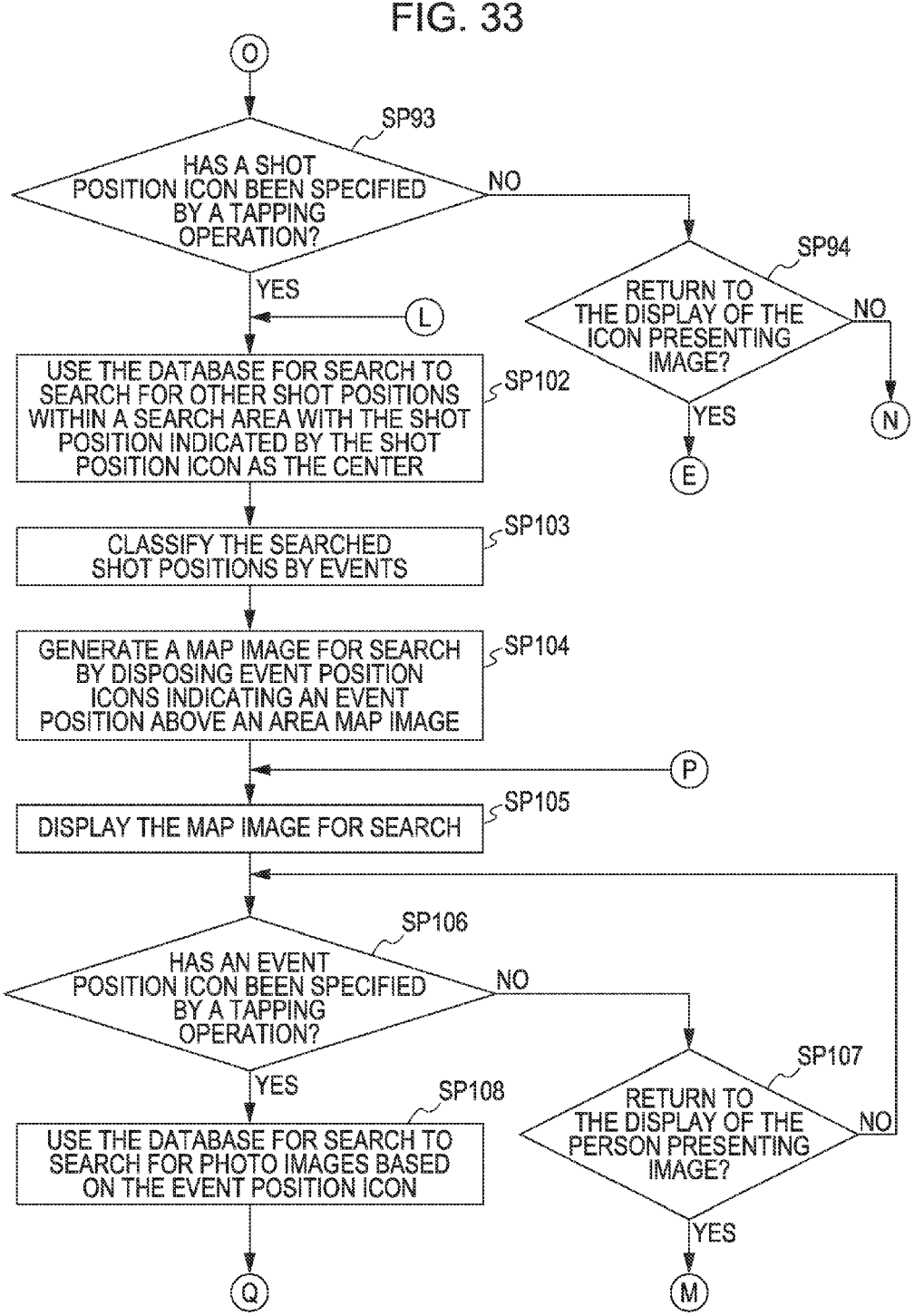
FIG. 33 is a flowchart illustrating yet other image search processing procedures.
Figure 34:
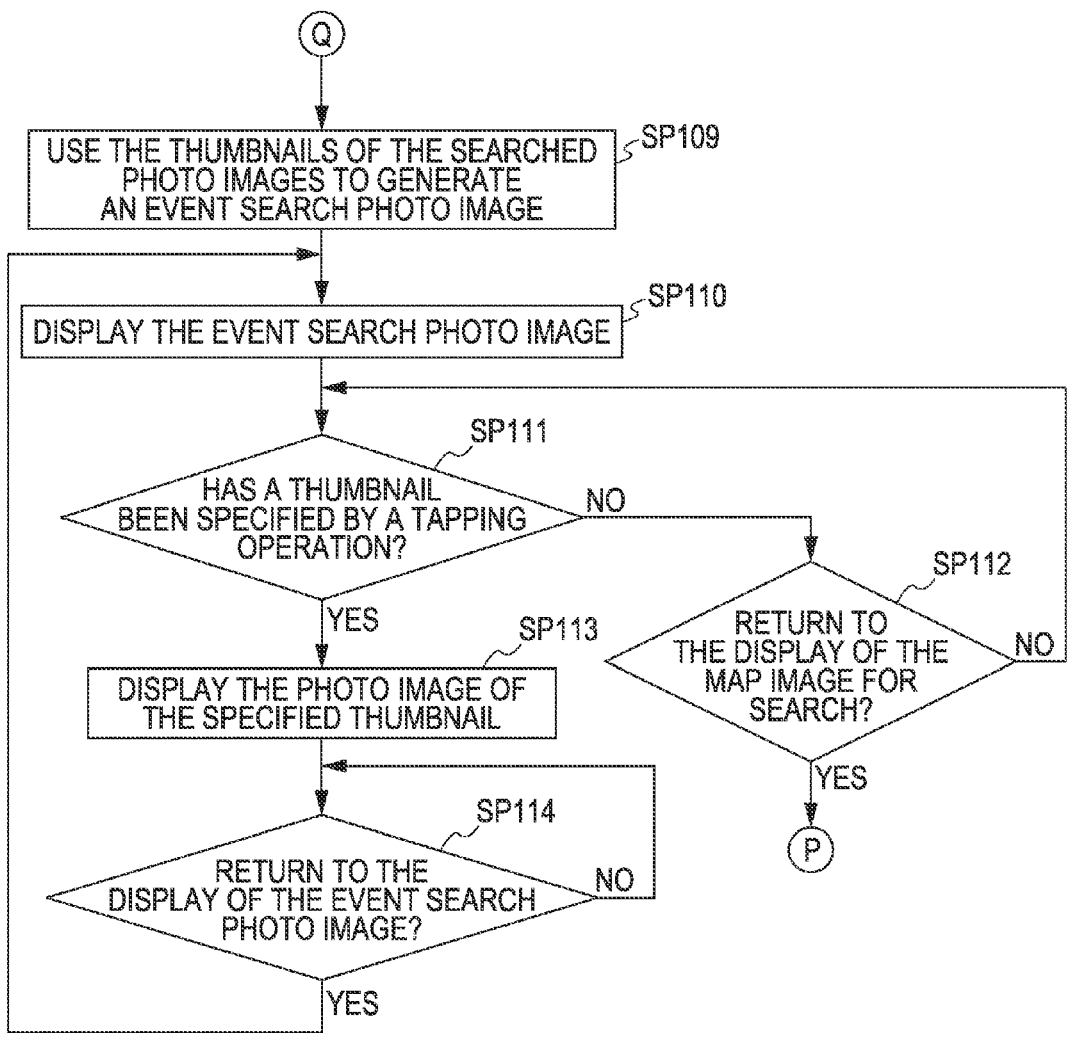
FIG. 34 is a flowchart illustrating yet other image search processing procedures.

After proceeding to the shooting mode in a state in which a search key presenting processing function is set so as to be realized, the central processing unit 20 starts the search key presenting processing procedures RT2 illustrated in FIGS. 25 and 26 in accordance with the search key presenting program stored beforehand in the ROM 21.

Upon starting the search key presenting processing procedures RT2, in step SP21 the central processing unit 20 determines, based on the setting content for presenting a search key, the type of the search key to be presented to the user, and proceeds to the next step SP22.

In step SP22, the central processing unit 20 displays one of the above two types of icon layout images 41 and 61 in a manner overlaid on the shooting status presenting image 40 displayed on the liquid crystal panel 7B according to the determined type of the search key.

Subsequently, in the event that both of the camera position icon and the face icon have been set so as to be presented as a search key, the central processing unit 20 executes processing beginning from step SP23 for presenting the camera position icon, and processing beginning from step SP31 for presenting the face icon.

Also, in the event that only the camera position icon has been set so as to be presented as a search key, the central processing unit 20 executes processing beginning from step SP23 for presenting the camera position icon. Further, in the event that only the face icon has been set so as to be presented as a search key, the central processing unit 20 executes processing beginning from step SP31 for presenting the face icon.

In the case of presenting the camera position icon, in step SP23 the central processing unit 20 uses the GPS to consecutively detect the camera position multiple times, and proceeds to the next step SP24.

In step SP24, the central processing unit 20 determines whether or not the camera position has accurately been detected. Upon obtaining a positive result in step SP24, this means that the camera positions consecutively detected multiple times have a little irregularities, and accordingly, the camera positions have accurately been detected.

Upon obtaining such a positive result in step SP24, the central processing unit 20 takes the intermediate position of the camera positions consecutively detected multiple times as the current camera position of the digital still camera 1, and proceeds to the next step SP25.

In step SP25, the central processing unit 20 determines whether or not the current camera position is used for search of a shot position. Upon obtaining a positive result in step SP25, this means that the current camera position has been detected for search of a shot position in this shooting mode for the first time.

Also, such a positive result represents that, the camera position last determined for detection of a shot position is relatively far away from the current camera position, and the camera position last determined has to be changed to the current camera position to reflect the current camera position into search of a shot position. Accordingly, upon obtaining such a positive result in step SP25, the central processing unit 20 proceeds to the next step SP26.

In step SP26, the central processing unit 20 determines whether or not a shot position within the seeking area with the current camera position as the center has already been registered in the database DB for search.

Upon obtaining a positive result in step SP26, this means that a shot position within the seeking area with the current camera position as the center can be searched out of the shot positions registered in the database DB for search.

Accordingly, upon obtaining such a positive result in step SP26, the central processing unit 20 sets the seeking area thereof to a search area whereby a shot position and a photo image can be searched, and proceeds to the next step SP27.

In step SP27, the central processing unit 20 crops out a predetermined portion with the current camera position as the center from the area map image equivalent to the search area as a partial map image, generates a camera position icon based on this partial map image, and proceeds to the next step SP28.

In step SP28, the central processing unit 20 determines whether or not the camera position icon generated at this time is a camera position icon to be first disposed above the icon layout image 42(62).

Upon obtaining a positive result, in step SP28 this means that the camera position icon generated at this time has first been generated in this shooting mode. Upon obtaining such a positive result in step SP28, the central processing unit 20 proceeds to the next step SP29. In step SP29, the central processing unit 20 disposes the camera position icon above the icon layout image 42(62) displayed along with the shooting status presenting image 40, and returns to step SP23.

Also, upon obtaining a negative result in step SP28, this means that in a state the camera position icon has already been generated and displayed, a camera position icon has further been generated at this time. Upon obtaining such a negative result in step SP28, the central processing unit 20 proceeds to step SP30.

In step SP30, the central processing unit 20 updates the camera position icon already disposed above the icon layout image 42(62) displayed along with the shooting status presenting image 40 to the camera position icon generated at this time, and returns to step SP23.

Incidentally, upon obtaining a negative result in the above step SP24, this means that the irregularities of the camera positions consecutively detected multiple times are great, and accordingly, detection accuracy of the camera positions deteriorates. Upon obtaining such a negative result in step SP24, the central processing unit 20 discards the camera positions consecutively detected multiple times, and returns to step SP23.

Also, upon obtaining a negative result in the above step SP25, this means that the current camera position is not far away from the last determined camera position as such, and accordingly, generally the same search result as the current camera position is obtained even by employing the last determined camera position. Accordingly, upon obtaining such a negative result in step SP25, the central processing unit 20 cancels employment of the current camera position detected at this time, and returns to step SP23.

Further, upon obtaining a negative result in the above step SP26, this means that a shot position within the seeking area with the current camera position as the center has not been registered in the shot positions registered in the database DB for search. Accordingly, upon obtaining such a negative result in step SP26, the central processing unit 20 cancels employment of the current camera position detected at this time, and returns to step SP23.

In this way, the central processing unit 20 repeatedly executes the processing in steps SP23 through SP30 during the shooting mode, and updates the camera position icon above the icon layout image 42(62) as appropriate while periodically detecting the camera position. At the time of end of the shooting mode, the central processing unit 20 also ends the processing in steps SP23 through SP30.

In the case of presenting a face icon, in step SP31 the central processing unit 20 awaits that the face of a person reflected in a unit image is detected by the digital processing unit 31. Subsequently, in the event that a single face or multiple faces within the unit image have been detected, and the unit image data and face detection information have been provided from the digital processing unit 31, the central processing unit 20 proceeds to the next step SP32.

In step SP32, the central processing unit 20 detects the features of a single face or multiple faces by determining and analyzing a single face portion or multiple face portions within the unit image based on the face detection information, and proceeds to the next step SP33.

In step SP33, the central processing unit 20 determines whether or not the face features detected at this time include face features matched with the face features for search already set so as to be used for search of a photo image.

Upon obtaining a positive result in step SP33, this means that the face of the face features for search already set so as to be used for search of a photo image has subsequently and photographically been taken after the setting thereof, or has been taken some other time, and has been reflected in the unit image. Upon obtaining such a positive result in step SP33, the central processing unit 20 proceeds to the next step SP34.

In step SP34, the central processing unit 20 changes, with the shooting status presenting image 40, the color of the frame image 46 surrounding the face of the face features for search so as to differ from the original color, and proceeds to step SP35.

Incidentally, upon obtaining a negative result in step SP33, this means that a person different from the person of the face of the face features for search has photographically been taken at this time. Upon obtaining such a negative result in step SP33, the central processing unit 20 proceeds to step SP35 without executing the processing in step SP34.

In step SP35, the central processing unit 20 determines whether or not the same features have consecutively been detected for a given length of time. Upon obtaining a positive result in step SP35, this means that the face of the same person has consecutively and photographically been taken for a given length of time. Upon obtaining such a positive result in step SP35, the central processing unit 20 proceeds to the next step SP36.

In step SP36, the central processing unit 20 determines whether or not the features consecutively detected for a given length of time have already been registered in the database DB for search as the registered face features. Upon obtaining a positive result in step SP36, this means that the features consecutively detected for a given length of time are the face features of a person who has already photographically been taken, and are available for search of a photo image. Upon obtaining such a positive result in step SP36, the central processing unit 20 proceeds to the next step SP37.

In step SP37, the central processing unit 20 determines whether or not a face icon indicating the face of the features consecutively detected for a given length of time has been disposed above the icon layout image 42. Upon obtaining a positive result in step SP37, this means that the features consecutively detected for a given length of time have not been set to the face features for search yet in this shooting mode, and accordingly, the face icon indicating the face of the features thereof has not been displayed yet.

Upon obtaining such a positive result in step SP37, the central processing unit 20 sets the features consecutively detected for a given length of time to the face features for search whereby a photo image can be searched, and proceeds to the next step SP38.

In step SP38, the central processing unit 20 reads out a face icon indicating the face of the face features for search set so as to be used for search of a photo image at this time from the database DB for search, and proceeds to the next step SP39.

In step SP39, the central processing unit 20 disposes the face icon indicating the face of the face features for search set so as to be used for search of a photo image at this time above the icon layout image 42 displayed along with the shooting status presenting image 40, and returns to step SP31.

Also, upon obtaining a negative result in step SP37, this means that the face features for search have consecutively been detected for a given length of time again, and accordingly, the face icon corresponding to the face features for search thereof has also already been disposed above the icon layout image 42. Upon obtaining such a negative result in step SP37, the central processing unit 20 proceeds to step SP40.

In step SP40, the central processing unit 20 determines whether or not the face icons already disposed above the icon layout image 42 displayed along with the shooting status presenting image 40 are rearranged.

Upon obtaining a positive result in step SP40, this means that the alignment sequence of the face icon corresponding to the face features for search consecutively detected for a given length of time has already moved down from the top according to additional placement of another face icon above the icon layout image 42.

In other words, this positive result represents that even though the user has viewed a face consecutively reflected in the shooting status presenting image 40 to conceive of search of a photo image, the face icon indicating the face thereof has not been displayed by moving down of the alignment sequence, and accordingly, the user has not been able to specify this face icon. Accordingly, upon obtaining such a positive result in step SP40, the central processing unit 20 proceeds to the next step SP41.

Subsequently, in step SP41, the central processing unit 20 changes the alignment sequence of the face icons above the icon layout image 42 so as to dispose the face icon corresponding to the face features for search consecutively detected for a given length of time at the top again, and returns to step SP31.

Incidentally, upon obtaining a negative result in step SP40, this means that after the face icon corresponding to the face features for search consecutively detected for a given length of time has been disposed at the top above the icon layout image 42 again, another face icon has not additionally been disposed. Accordingly, upon obtaining such a negative result in step SP40, the central processing unit 20 returns to step SP31 without changing the alignment sequence of the face icons.

Also, upon obtaining a negative result in the above step SP35, this means that the face of a person has temporarily and photographically been taken, and accordingly, the features of the face thereof has not consecutively been detected for a given length of time. Accordingly, upon obtaining such a negative result in step SP35, the central processing unit 20 returns to step SP31.

Further, upon obtaining a negative result in the above step SP36, this means that the features consecutively detected for a given length of time are the face features of a person who has not photographically been taken at the digital still camera 1 yet, and are not available for search of a photo image. Upon obtaining such a negative result in step SP36, the central processing unit 20 returns to step SP31.

In this way, during the shooting mode the central processing unit 20 repeatedly executes the processing in steps SP31 through SP41, and according to the shooting situation of a person, sets the face features of this person to the face features for search, and also displays a face icon indicating the face thereof. Also, at the time of end of the shooting mode, the central processing unit 20 also ends the processing in steps SP31 through SP41.

1-8. Image Search Processing Procedures

Next, description will be made regarding image search processing procedures RT3 that the central processing unit 20 executes in accordance with the image search program in the shooting mode with reference to FIGS. 27 through 34.

After proceeding to the shooting mode in a state in which the search key presenting processing function has been set so as to be realized, the central processing unit 20 starts the image search processing procedures RT3 illustrated in FIGS. 27 through 34 in accordance with the image search program stored beforehand in the ROM 21.

Upon starting the image search processing procedures RT3, in step SP51 the central processing unit 20 determines whether or not the user has specified a camera position icon above the icon layout image 41(61) displayed along with the shooting status presenting image 40 for search of a photo image by a tapping operation.

Upon obtaining a negative result in step SP51, this means that the user is in the middle of confirming the shooting state of a subject using the shooting status presenting image 40 for photo shooting, or is in the middle of selecting a search key to be specified for search of a photo image, or the like. Upon obtaining such a negative result in step SP51, the central processing unit 20 proceeds to step SP52.

In step SP52, the central processing unit 20 determines whether or not the user has specified a face icon above the icon layout image 41 displayed along with the shooting status presenting image 40 for search of a photo image by a tapping operation.

Upon obtaining a negative result in step SP52, this means that the user is in the middle of confirming the shooting state of a subject using the shooting status presenting image 40 for photo shooting, or is in the middle of selecting a search key to be specified for search of a photo image, or the like. Upon obtaining such a negative result in step SP52, the central processing unit 20 proceeds to step SP53.

In step SP53, the central processing unit 20 determines whether or not the user has specified a face icon above the icon layout image 41 displayed along with the shooting status presenting image 40 by a sliding operation for search of a photo image.

Upon obtaining a negative result in step SP53, this means that the user is in the middle of confirming the shooting state of a subject using the shooting status presenting image 40 for photo shooting, or is in the middle of selecting a search key to be specified for search of a photo image, or the like. Upon obtaining such a negative result in step SP53, the central processing unit 20 proceeds to step SP54.

In step SP54, the central processing unit 20 determines whether or not the user has specified a face within the shooting status presenting image 40 (i.e., search utilization face reflected in the shooting status presenting image 40) by a sliding operation for search of a photo image.

Upon obtaining a negative result in step SP54, this means that the user is in the middle of confirming the shooting state of a subject using the shooting status presenting image 40 for photo shooting, or is in the middle of selecting a search key to be specified for search of a photo image, or the like. Upon obtaining such a negative result in step SP54, the central processing unit 20 proceeds to step SP55.

In step SP55, the central processing unit 20 determines whether to end the shooting mode. Upon obtaining a negative result in step SP55, this means that anything such as power off, switching to the reproducing mode, or the like, has not been requested. Upon obtaining such a negative result in step SP55, the central processing unit 20 returns to step SP51.

In this way, subsequently the central processing unit 20 repeatedly executes, until a positive result is obtained in one of steps SP51 through SP55, the processing in steps SP51 through SP55 in a cyclic manner.

Thus, the central processing unit 20 awaits that the user has specified a camera position icon or face icon above the icon layout image 41(61) for search of a photo image, and a face within the shooting status presenting image 40 (search utilization face).

Incidentally, upon obtaining a positive result in step SP51, this means that the user has requested search of a photo image using the camera position, and as a result thereof, a camera position icon above the icon layout image 41(61) has been specified by a tapping operation. Upon obtain such a positive result in step SP51, the central processing unit 20 proceeds to the next step SP56.

In step SP56, the central processing unit 20 searches a shot position within the search area with the camera position indicated by the camera position icon as the center out of the shot positions registered in the database DB for search, and proceeds to the next step SP57.

In step SP57, the central processing unit 20 classifies, based on the event identification information registered in the database DB for search in a manner correlated with the searched shot position, this searched shot position by the event where photo shooting was performed, and proceeds to the next step SP58.

In step SP58, the central processing unit 20 generates, based on the searched shot position, and the classification by the event of this shot position, a map image for search that is an area map image where the event and the event position icon indicating the event position are disposed, and proceeds to the next step SP59. In step SP59, the central processing unit 20 displays the map image 65 for search on the liquid crystal panel 7B instead of the shooting status presenting image 40, and proceeds to the next step SP60.

In step SP60, the central processing unit 20 determines whether or not the user has specified the event position icon within the map image 65 for search by a tapping operation. Upon obtaining a negative result in this step SP60, this means that the user is in the middle of selecting an event position icon to narrow down photo images to be searched. Upon obtaining such a negative result in step SP60, the central processing unit 20 proceeds to step SP61.

In step SP61, the central processing unit 20 determines whether to return the display of the map image 65 for search as to the liquid crystal 7B to the display of the shooting status presenting image 40 and the icon presenting image 42(62).

Upon obtaining a negative result in this step SP61, this means that the user is still in the middle of selecting an event position icon to narrow down photo images to be searched. Upon obtaining such a negative result in step SP61, the central processing unit 20 returns to step SP60.

In this way, subsequently the central processing unit 20 repeatedly executes the processing in steps SP60 and SP61 until a positive result is obtained in one of steps SP60 and SP61. Thus, the central processing unit 20 awaits that the user has specified a desired event position icon for search of a photo image.

Incidentally, upon obtaining a positive result in step SP60, this means that the user has selected an event position icon for narrowing down photo images to be searched. Upon obtaining such a positive result in step SP60, the central processing unit 20 proceeds to the next step SP62.

In step SP62, the central processing unit 20 searches a photo image based on the event position icon specified by the user as file identification information out of the file identification information registered in the database DB for search, and proceeds to the next step SP63.

In step SP63, the central processing unit 20 reads out, based on the file identification information of the searched photo image, the thumbnail of the searched photo image from the recording device 33. Subsequently, the central processing unit 20 uses the thumbnail thereof to generate an event search photo image 70, and proceeds to the next step SP64. In step SP64, the central processing unit 20 displays the event search photo image 70 on the liquid crystal panel 7B instead of the map image 65 for search, and proceeds to the next step SP65.

In step SP65, the central processing unit 20 determines whether or not the user has specified any thumbnail within the event search photo image 70 by a tapping operation. Upon obtaining a negative result in step SP65, this means that the user is in the middle of selecting a photo image to be displayed on the liquid crystal panel 7B using a thumbnail. Upon obtaining such a negative result in step SP65, the central processing unit 20 proceeds to step SP66.

In step SP66, the central processing unit 20 determines whether to return the display of the event search photo image 70 as to the liquid crystal panel 7B to the display of the map image 65 for search. A negative result in this step SP66 means that the user is in the middle of selecting a photo image to be displayed on the liquid crystal panel 7B. Upon obtaining such a negative result in step SP66, the central processing unit 20 returns to step SP65.

In this way, subsequently the central processing unit 20 repeatedly executes, until a positive result is obtained in one of steps SP65 and SP66, the processing in steps SP65 and SP66 thereof. Thus, the central processing unit 20 awaits that the user has selected a photo image to be displayed on the liquid crystal panel 7B.

Incidentally, upon obtaining a positive result in step SP65, this means that the user has selected a photo image to be displayed on the liquid crystal panel 7B. Upon obtaining such a positive result in step SP65, the central processing unit 20 proceeds to the next step SP67.

In step SP67, the central processing unit 20 reads out the image file of the photo image selected by the user from the recording device 33. Also, based on the image file thereof, the central processing unit 20 displays the photo image selected by the user on the liquid crystal panel 7B instead of the event search photo image 70, and proceeds to the next step SP68.

In step SP68, the central processing unit 20 awaits that the user has instructed to return the photo image displayed on the liquid crystal panel 7B to the display of the event search photo image 70. Subsequently, in the event that the user has instructed to return the display of the liquid crystal panel 7B from the photo image to the event search photo image 70, the central processing unit 20 returns to step SP64.

Thus, upon a photo image to be displayed being selected as a thumbnail above the event search photo image 70, the central processing unit 20 displays the selected photo image to allow the user to view this.

Incidentally, upon obtaining a positive result in step SP66, this means that the user has finished viewing of the photo image narrowed down by the event and detected, and has instructed to display the map image 65 for search on the liquid crystal panel 7B again. Upon obtaining such a positive result in step SP66, the central processing unit 20 returns to step SP59.

Thus, the central processing unit 20 allows the user to select an event position icon for narrowing down photo images to be searched above the map image 65 for search again. Accordingly, the central processing unit 20 allows the user to search and view a different photo image while switching the event as appropriate.

Also, upon obtaining a positive result in step SP61, this means that the user has instructed to display the shooting status presenting image 40 and the icon presenting image 42(62) on the liquid crystal panel 7B again for search of a photo image by another search key, or photo shooting. Upon obtaining such a positive result in step SP61, the central processing unit 20 returns to step SP51.

Incidentally, upon obtaining a positive result in step SP52, this means that the user has requested search of a photo image using the face of a person, and as a result thereof, has specified a face icon above the icon layout image 41 by a tapping operation. Upon obtaining such a positive result in step SP52, the central processing unit 20 proceeds to the next step SP69.

In step SP69, the central processing unit 20 searches a photo image out of the file identification information registered in the database DB for search as file identification information based on the file icon specified by the user.

That is to say, the central processing unit 20 searches a photo image in which the face of the person specified by the user is reflected, as file identification information, and proceeds to the next step SP70.

In step SP70, the central processing unit 20 reads out the thumbnail of the searched photo image from the recording device 33 based on the file identification information of the searched photo image. Subsequently, the central processing unit 20 uses the thumbnail thereof to generate a face search photo image 75, and proceeds to the next step SP71.

Subsequently, in step SP71 the central processing unit 20 displays the face search photo image 75 on the liquid crystal panel 7B in stead of the shooting status presenting image 40 and the icon presenting image 42, and proceeds to the next step SP72.

In step SP72, the central processing unit 20 determines whether or not the user has specified any thumbnail within the face search photo image 75 by a tapping operation. Upon obtaining a negative result in step SP72, this means that the user is in the middle of selecting a photo image to be displayed on the liquid crystal panel 7B using a thumbnail. Upon obtaining such a negative result in step SP72, the central processing unit 20 proceeds to step SP73.

In step SP73, the central processing unit 20 determines whether to return the display of the face search photo image 75 as to the liquid crystal panel 7B to the display of the shooting status presenting image 40 and the icon presenting image 42.

Upon obtaining a negative result in step SP73, this means that the user is in the middle of selecting a photo image to be displayed on the liquid crystal panel 7B. Upon obtaining such a negative result in step SP73, the central processing unit 20 returns to step SP72.

In this way, subsequently the central processing unit 20 repeatedly executes the processing in steps SP72 and SP73 until a positive result is obtained in one of steps SP72 and SP73. Thus, the central processing unit 20 awaits that the user has selected a photo image to be displayed on the liquid crystal panel 7B.

Incidentally, upon obtaining a positive result in step SP72, this means that the user has selected a photo image to be displayed on the liquid crystal panel 7B. Upon obtaining such a positive result in step SP72, the central processing unit 20 proceeds to the next step SP74.

In step SP74, the central processing unit 20 reads out the image file of the photo image selected by the user from the recording device 33. Also, the central processing unit 20 displays the photo image selected by the user on the liquid crystal panel 7B in stead of the face search photo image 75 based on the image file thereof, and proceeds to the next step SP75.

In step SP75, the central processing unit 20 awaits that the user has instructed to return the photo image displayed on the liquid crystal panel 7B to the display of the face search photo image 75. Subsequently, in the event that the user has instructed to return the photo image displayed on the liquid crystal panel 7B to the display of the face search photo image 75, the central processing unit 20 returns to step SP71.

In this way, upon a photo image to be displayed being selected as a thumbnail above the face search photo image 75, the central processing unit 20 displays the selected photo image to allow the user to view this.

Incidentally, upon obtaining a positive result in step SP73, this means that the user has finished viewing of the photo image searched by the face of a person, and has instructed to display the shooting status presenting image 40 and the icon presenting image 42 on the liquid crystal panel 7B again. Upon obtaining such a positive result in step SP73, the central processing unit 20 returns to step SP51.

Incidentally, upon obtaining a positive result in step SP53, this means that the user has requested search of a photo image employing a person having intimacy with an arbitrarily selected reference person, and has specified a face icon above the icon layout image 41 by a sliding operation.

In other words, such a positive result represents that the user has requested, based on a reference person specified as a face icon above the icon layout image 41, search of a photo image in which a person having intimacy with this reference person is reflected. Upon obtaining such a positive result in step SP53, the central processing unit 20 proceeds to the next step SP76.

In step SP76, the central processing unit 20 uses the database DB for search to determine whether or not there is a person having intimacy with the reference person specified as a face icon by the user of the persons photographically taken at the digital still camera 1.

Upon obtaining a negative result in step SP76, this means that a person having intimacy with the reference person specified by the user has not photographically been taken at the digital camera 1 yet. Upon obtaining such a negative result in step SP76, the central processing unit 20 returns to step SP51.

On the other hand, upon obtaining a positive result in step SP76, this means that a person having intimacy with the reference person specified by the user has photographically been taken by the digital camera 1. Upon obtaining such a positive result in step SP76, the central processing unit 20 proceeds to step SP77.

In step SP77, the central processing unit 20 reads out, based on intimacy correlated information registered in a manner correlated with the personal identification information of a reference person, the face icon of a person having intimacy relationship with this reference person from the database DB for search, and proceeds to the next step SP78.

In step SP78, the central processing unit 20 uses the database DB for search to detect a shot position where a reference person, and a person having intimacy with this reference person have photographically been taken together, and proceeds to the next step SP79.

In step SP79, the central processing unit 20 generates, based on a partial map image including the detected shot position, a shot position icon indicating this shot position, and proceeds to the next step SP80.

In step SP80, the central processing unit 20 uses the face icon and the shot position icon to generate a person presenting image 80, and proceeds to the next step SP81. Subsequently, in step SP81, the central processing unit 20 displays the person presenting image 80 in a manner overlaid above the shooting status presenting image 40 displayed on the liquid crystal panel 7B, and proceeds to the next step SP82.

In step SP82, the central processing unit 20 determines whether or not the user has specified a face icon within the person presenting image 80 by a sliding operation. Upon obtaining a negative result in step SP82, this means that the user is in the middle of selecting a person or shot position to be used for search of a photo image. Upon obtaining such a negative result in step SP82, the central processing unit 20 proceeds to step SP83.

In step SP83, the central processing unit 20 determines whether or not the user has specified a face icon within the person presenting image 80 by a tapping operation. Upon obtaining a negative result in step SP83, this also represents that the user is in the middle of selecting a person or shot position to be used for search of a photo image. Upon obtaining such a negative result in step SP83, the central processing unit 20 proceeds to step SP84.

In step SP84, the central processing unit 20 determines whether or not the user has specified a shot position icon within the person presenting image 80 by a tapping operation. Upon obtaining a negative result in this step SP84, this also represents that the user is in the middle of selecting a person or shot position to be used for search of a photo image. Upon obtaining such a negative result in step SP84, the central processing unit 20 proceeds to step SP85.

In step SP85, the central processing unit 20 determines whether to return the display of the shooting status presenting image 40 and the person presenting image 80 as to the liquid crystal panel 7B to display of the shooting status presenting image 40 and the icon presenting image 42.

Upon obtaining a negative result in step SP85, this also represents that the user is in the middle of selecting a person or shot position to be used for search of a photo image. Upon obtaining such a negative result in step SP85, the central processing unit 20 proceeds to step SP82.

In this way, subsequently the central processing unit 20 repeatedly executes, until a positive result is obtained in one of steps SP82 through SP85, the processing in steps SP82 through SP85. Thus, the central processing unit 20 awaits that the user has specified a face icon or shot position icon within the person presenting image 80.

Incidentally, upon obtaining a positive result in step SP82, this means that the user has specified the face icon of a person other than a reference person within the person presenting image 80 by a sliding operation to increase the number of persons available for search of a photo image.

In other words, such a positive result represents that the user has requested, based on a specified person newly specified as a face icon above the icon layout image 41, search of a photo image in which a new person having intimacy with this specified person is reflected. Upon obtaining such a positive result in step SP82, the central processing unit 20 proceeds to the next step SP86.

In step SP86, the central processing unit 20 uses the database DB for search to determine whether or not there is a person having intimacy with the specified person specified as a face icon by the user of the persons photographically taken at the digital still camera 1.

Upon obtaining a negative result in step SP86, this means that a person having intimacy with the specified person specified by the user has not photographically been taken at the digital camera 1 yet. Upon obtaining such a negative result in step SP86, the central processing unit 20 returns to step SP82.

On the other hand, upon obtaining a positive result in step SP86, this means that a person having intimacy with the specified person specified by the user has photographically been taken by the digital camera 1. Upon obtaining such a positive result in step SP86, the central processing unit 20 proceeds to step SP87.

In step SP87, the central processing unit 20 reads out the face icon of a new person having intimacy relationship with the specified person from the database DB for search based on the intimacy correlated information registered in a manner correlated with the personal identification information of the specified person, and proceeds to the next step SP88.

In step SP88, the central processing unit 20 uses the database DB for search to detect a shot position where the specified person, and a person having intimacy with the specified person thereof have photographically been taken together, and proceeds to the next step SP89.

In step SP89, the central processing unit 20 generates, based on a partial map image including the detected shot position, a shot position icon indicating this shot position, and proceeds to the next step SP90.

In step SP90, the central processing unit 20 uses the newly obtained face icon and shot position icon to update the person presenting image 80, and proceeds to the next step SP91. Subsequently, in step SP91, the central processing unit 20 displays the person presenting image 90 after updating in a manner overlaid above the shooting status presenting image 40 displayed on the liquid crystal panel 7B instead of the person presenting image 80 before updating, and proceeds to the next step SP92.

In step SP92, the central processing unit 20 determines whether or not the user has specified a face icon within the person presenting image 90 by a tapping operation. Upon obtaining a negative result in step SP92, this means that the user is in the middle of selecting a person or shot position to be used for search of a photo image. Upon obtaining such a negative result in step SP92, the central processing unit 20 proceeds to step SP93.

In step SP93, the central processing unit 20 determines whether or not the user has specified a shot position icon within the person presenting image 90 by a tapping operation. Upon obtaining a negative result in step SP93, this also represents that the user is in the middle of selecting a person or shot position to be used for search of a photo image. Upon obtaining such a negative result in step SP93, the central processing unit 20 proceeds to step SP94.

In step SP94, the central processing unit 20 determines whether to return the display of the shooting status presenting image 40 and the person presenting image 90 as to the liquid crystal panel 7B to the display of the shooting status presenting image 40 and the icon presenting image 42.

Upon obtaining a negative result in step SP94, this also represents that the user is in the middle of selecting a person or shot position to be used for search of a photo image. Upon obtaining such a negative result in step SP94, the central processing unit 20 proceeds to step SP92.

In this way, subsequently the central processing unit 20 repeatedly executes, until a positive result is obtained in one of steps SP92 and SP94, the processing in steps SP92 and SP94 thereof. Thus, the central processing unit 20 awaits that the user has specified a face icon or shot position icon within the person presenting image 90.

Incidentally, upon obtaining a positive result in step SP92, this means that the user has requested search of a photo image using the face of a person, and as a result thereof, has specified a face icon within the person presenting image 90 by a tapping operation. Upon obtaining such a positive result in step SP92, the central processing unit 20 proceeds to the next step SP95.

In step SP95, the central processing unit 20 searches a photo image out of the file identification information registered in the database DB for search as file identification information based on the face icon specified by the user.

That is to say, the central processing unit 20 searches a photo image in which the person of the face indicated by the face icon specified by the user is reflected, as file identification information, and proceeds to the next step SP96.

In step SP96, the central processing unit 20 reads out, based on the file identification information of the searched photo image, the thumbnail of the searched photo image thereof from the recording device 33. Subsequently, the central processing unit 20 uses the thumbnail thereof to generate the same face search photo image as described above, and proceeds to the next step SP97.

Subsequently, in step SP97, the central processing unit 20 displays a face search photo image on the liquid crystal panel 7B instead of the shooting status presenting image 40 and the person presenting image 90, and proceeds to the next step SP98.

In step SP98, the central processing unit 20 determines whether or not the user has specified any thumbnail within the face search photo image by a tapping operation. Upon obtaining a negative result in step SP98, this means that the user is in the middle of selecting a photo image to be displayed on the liquid crystal panel 7B using a thumbnail. Upon obtaining such a negative result in step SP98, the central processing unit 20 proceeds to step SP99.

In step SP99, the central processing unit 20 determines whether to return the display of the face search photo image as to the liquid crystal panel 7B to the display of the shooting status presenting image 40 and the person presenting image 90.

Upon obtaining a negative result in step SP99, this means that the user is in the middle of selecting a photo image to be displayed on the liquid crystal panel 7B. Upon obtaining such a negative result in step SP99, the central processing unit 20 returns to step SP98.

In this way, subsequently the central processing unit 20 repeatedly executes, until a positive result is obtained in one of steps SP98 and SP99, the processing in steps SP98 and SP99 thereof. Thus, the central processing unit 20 awaits that the user has selected a photo image to be displayed on the liquid crystal panel 7B.

Incidentally, upon obtaining a positive result in step SP98, this means that the user has selected a photo image to be displayed on the liquid crystal panel 7B. Upon obtaining such a positive result in step SP98, the central processing unit 20 proceeds to the next step SP100.

In step SP100, the central processing unit 20 reads out the image file of the photo image selected by the user from the recording device 33. Also, the central processing unit 20 displays, based on the image file thereof, the photo image selected by the user on the liquid crystal panel 7B in stead of the face search photo image, and proceeds to the next step SP101.

In step SP101, the central processing unit 20 awaits that the user has instructed to return the photo image displayed on the liquid crystal panel 7B to the display of the face search photo image. Subsequently, in the event that the user has instructed to return the display of the liquid crystal panel 7B to the face search photo image from the photo image, the central processing unit 20 returns to step SP97.

In this way, upon a photo image to be displayed being selected as a thumbnail above the face search photo image, the central processing unit 20 displays the selected photo image on the liquid crystal panel 7B so as to be viewed by the user.

Incidentally, upon obtaining a positive result in step SP99, this means that the user has finished viewing of the photo image searched by the face of one person arbitrarily selected, and has instructed to display the shooting status presenting image 40 and the person presenting image 90 on the liquid crystal panel 7B again. Upon obtaining such a positive result in step SP99, the central processing unit 20 returns to step SP91.

Incidentally, upon obtaining a positive result in step SP93, this means that the user has requested search of a photo image using a shot position, and as a result thereof, has specified a shot position icon within the person presenting image 90 by a tapping operation. Upon obtaining such a positive result in step SP93, the central processing unit 20 proceeds to the next step SP102.

In step SP102, the central processing unit 20 searches another shot position within the search area with the shot position indicated by the shot position icon as the center out of the shot positions registered in the database DB for search, and proceeds to the next step SP103.

In step SP103, the central processing unit 20 classifies, based on the event identification information registered in the database DB for search in a manner correlated with the searched shot position thereof, this searched shot position by the event where photo shooting was performed, and proceeds to the next step SP104.

In step SP104, the central processing unit 20 generates, based on the searched shot position, and the classification by the event of this shot position, a map image for search that is an area map image where the event and the event position icon indicating the event position are disposed.

Subsequently, the central processing unit 20 proceeds to the next step SP105, thereby displaying a map image for search on the liquid crystal panel 7B instead of the person presenting image 90 in this step SP105, and proceeds to the next step SP106.

In step SP106, the central processing unit 20 determines whether or not the user has specified an event position icon within the map image for search by a tapping operation. Upon obtaining a negative result in this step SP106, this means that the user is in the middle of selecting an event position icon to narrow down photo images to be searched. Upon obtaining such a negative result in step SP106, the central processing unit 20 proceeds to step SP107.

In step SP107, the central processing unit 20 determines whether to return the display of the map image for search as to the liquid crystal 7B to the display of the shooting status presenting image 40 and the person presenting image 90.

Upon obtaining a negative result in this step SP107, this means that the user is still in the middle of selecting an event position icon to narrow down photo images to be searched. Upon obtaining such a negative result in step SP107, the central processing unit 20 returns to step SP106.

In this way, subsequently the central processing unit 20 repeatedly executes the processing in steps SP106 and SP107 until a positive result is obtained in one of steps SP106 and SP107. Thus, the central processing unit 20 awaits that the user has specified a desired event position icon for search of a photo image.

Incidentally, upon obtaining a positive result in step SP106, this means that the user has selected an event position icon for narrowing down photo images to be searched. Upon obtaining such a positive result in step SP106, the central processing unit 20 proceeds to the next step SP108.

In step SP108, the central processing unit 20 searches a photo image based on the event position icon specified by the user as file identification information out of the file identification information registered in the database DB for search, and proceeds to the next step SP109.

In step SP109, the central processing unit 20 reads out, based on the file identification information of the searched photo image, the thumbnail of the searched photo image from the recording device 33. Subsequently, the central processing unit 20 uses the thumbnail thereof to generate an event search photo image, and proceeds to the next step SP110. In step SP110, the central processing unit 20 displays the event search photo image on the liquid crystal panel 7B instead of the map image for search, and proceeds to the next step SP111.

In step SP111, the central processing unit 20 determines whether or not the user has specified any thumbnail within the event search photo image by a tapping operation. Upon obtaining a negative result in step SP111, this means that the user is in the middle of selecting a photo image to be displayed on the liquid crystal panel 7B using a thumbnail. Upon obtaining such a negative result in step SP111, the central processing unit 20 proceeds to step SP112.

In step SP112, the central processing unit 20 determines whether to return the display of the event search photo image as to the liquid crystal panel 7B to the display of the map image for search. Upon obtaining a negative result in this step SP112, this means that the user is in the middle of selecting a photo image to be displayed on the liquid crystal panel 7B. Upon obtaining such a negative result in step SP112, the central processing unit 20 returns to step SP111.

In this way, subsequently the central processing unit 20 repeatedly executes, until a positive result is obtained in one of steps SP111 and SP112, the processing in steps SP111 and SP112 thereof. Thus, the central processing unit 20 awaits that the user has selected a photo image to be displayed on the liquid crystal panel 7B.

Incidentally, upon obtaining a positive result in step SP111, this means that the user has selected a photo image to be displayed on the liquid crystal panel 7B. Upon obtaining such a positive result in step SP111, the central processing unit 20 proceeds to the next step SP113.

In step SP113, the central processing unit 20 reads out the image file of the photo image selected by the user from the recording device 33. Also, based on the image file thereof, the central processing unit 20 displays the photo image selected by the user on the liquid crystal panel 7B instead of the event search photo image, and proceeds to the next step SP114.

In step SP114, the central processing unit 20 awaits that the user has instructed to return the photo image displayed on the liquid crystal panel 7B to the display of the event search photo image. Subsequently, in the event that the user has instructed to return the display of the liquid crystal panel 7B from the photo image to the event search photo image, the central processing unit 20 returns to step SP110.

Thus, upon a photo image to be displayed being selected as a thumbnail above the event search photo image, the central processing unit 20 displays the selected photo image thereof on the liquid crystal panel 7B so as to be viewed by the user.

Incidentally, upon obtaining a positive result in step SP112, this means that the user has finished viewing of the photo image narrowed down by the event and detected, and has instructed to display the map image for search on the liquid crystal panel 7B again. Upon obtaining such a positive result in step SP112, the central processing unit 20 returns to step SP105.

Thus, the central processing unit 20 allows the user to select an event position icon for narrowing down photo images to be searched above the map image for search again. Accordingly, the central processing unit 20 allows the user to search and view a different photo image while switching the event as appropriate.

Also, upon obtaining a positive result in step SP107, this means that the user has instructed to return the display of the map image for search to the display of the person presenting image 90 to search a photo image of a person having intimacy with a reference person or specified person or at another shot position. Upon obtaining such a positive result in step SP107, the central processing unit 20 returns to step SP91.

Incidentally, upon obtaining a positive result in step SP83, this means that the user has requested search of a photo image using the face of a person, and as a result thereof, has specified a face icon within the person presenting image 80 by a tapping operation. Upon obtaining such a positive result in step SP83, the central processing unit 20 proceeds to the next step SP95.

Also, upon obtaining a positive result in step SP84, this means that the user has requested search of a photo image using a shot position, and as a result thereof, has specified a shot position icon within the person presenting image 80 by a tapping operation. Upon obtaining such a positive result in step SP84, the central processing unit 20 proceeds to step SP102.

That is to say, in the event of searching a photo image using one of the person presenting image 80 before updating and the person presenting image 80 after updating, the central processing unit 20 substantially executes the same processing. However, in the event of using the person presenting image 90 before updating to advance processing for searching a photo image, and returning the display from a state in which the face search photo image or map image for search is displayed to the display of the person presenting image, the central processing unit 20 returns to step SP81.

Incidentally, upon obtaining a positive result in step SP54, this means that the user has requested search of a photo image employing a person having intimacy with a person arbitrarily selected, and as a result thereof, has specified a face (search utilization face) within the shooting status presenting image 40 by a sliding operation.

In other words, such a positive result represents that, based on the person specified as a face reflected in the shooting status presenting image 40, the user has requested search of a photo image in which a person having intimacy with the person thereof is reflected. Upon obtaining such a positive result in step SP54, the central processing unit 20 proceeds to the next step SP115.

In step SP115, the central processing unit 20 uses the database DB for search to determine whether or not, of persons photographically taken by the digital still camera 1, there is a person having intimacy with the person specified as a face within the shooting status presenting image 40 by the user.

Upon obtaining a negative result in step SP115, this means that a person having intimacy with the person specified by the user has not photographically been taken by the digital camera 1 yet. Upon obtaining such a negative result in step SP115, the central processing unit 20 returns to step SP51.

On the other hand, upon obtaining a positive result in step SP115, this means that a person having intimacy with the person specified by the user has already photographically been taken by the digital camera 1. Upon obtaining such a positive result in step SP115, the central processing unit 20 proceeds to step SP77.

Also, upon obtaining a positive result in the above step SP55, this means that the user has requested power off or switching to the reproducing mode or the like to end the shooting mode. Upon obtaining such a positive result in step SP55, the central processing unit 20 proceeds to step SP116 to end the image search processing procedures RT3.

1-9. Operation and Advantages of Embodiment

With the above configuration, at the time of the shooting mode, the central processing unit 20 of the digital still camera 1 consecutively takes images of a subject to generate a shooting status presenting image 40, and displays this on the liquid crystal panel 7B. Also, the central processing unit 20 of the digital still camera 1 displays a search key for photo image search on the liquid crystal panel 7B along with the shooting status presenting image 40 according to a shooting situation such as what kind of subject is being consecutively taken.

In this state, in the event that the user has specified the search key displayed on the liquid crystal panel 7B along with the shooting status presenting image 40, the central processing unit 20 of the digital still camera 1 searches a photo image based on this specified search key. Subsequently, the central processing unit 20 of the digital still camera 1 displays the search results of a photo image on the liquid crystal panel 7B instead of the shooting status presenting image 40.

That is to say, the digital still camera 1 automatically presents a search key according to a shooting situation at the time of the shooting mode, and in the event of the user having specified this search key, searches a photo image according to this.

Accordingly, at the time of the shooting mode, even in the event of search of a photo image having been requested with a subject or shot place as a trigger, the digital still camera 1 allows the user to perform search of a photo image without having the user perform complicated operations such as a mode switching operation or a metadata selection operation for each category.

According to the above configuration, when in the shooting mode, the digital still camera 1 displays a search key for photo image search on the liquid crystal panel 7B along with the shooting status presenting image 40 according to the shooting situation of a subject while consecutively and photographically taking images of a subject to generate a shooting status presenting image 40, and displaying this on the liquid crystal panel 7B. Thus, even though search of a photo image has been requested with a subject or shot place as a trigger at the time of the shooting mode, the digital still camera 1 allows the user to specify a search key for search of a photo image without having the user perform complicated operations. Accordingly, even though search of a photo image has been requested at the time of the shooting mode, the digital still camera 1 can readily handle this search request.

Actually, in the event of consecutively taking images of a person serving as a subject, the digital still camera 1 detects the face of this person from the shooting status presenting image 40, and presents a face icon indicting the face thereof, or the face itself reflected in the shooting status presenting image 40, as a search key.

Accordingly, even though the user has viewed a person to be photographically taken, and has requested search of a photo image, the digital still camera 1 can search a photo image in which this person to be photographically taken is reflected by allowing the use to specify a face icon, or a face reflected in the shooting status presenting image 40, serving the search key thereof.

Also, with the digital still camera 1, a tapping operation, and a sliding operation different from the tapping operation are prepared as a method for specifying a face icon, or a face reflected in the shooting status presenting image 40. In the event that the user has specified a face icon by a tapping operation, the digital still camera 1 searches only a photo image in which a person having the face indicated by the face icon thereof is reflected.

Also, in the event that the user has specified a face icon, or a face reflected in the shooting status presenting image 40 by a sliding operation, the digital still camera 1 searches a photo image in which a person having intimacy with a person to be photographically taken is reflected.

Accordingly, regardless of a photo image in which a person to be photographically taken is reflected, even through, with a person to be photographically taken as a trigger, a person having intimacy with that person has been reminded, the digital still camera 1 can readily handle this, and can also allow the user to search a photo image in which this intimate person is reflected.

Further, the digital still camera 1 detects the current camera position to determine a shot place as the shooting situation of a subject, and presents a camera position icon indicating the camera position thereof as a search key.

Accordingly, even through search of a photo image has been requested with a shot place as a trigger, the digital still camera 1 allows the user to specify a camera position icon as a search key, whereby photo images taken and accumulate around the current camera position can be searched.

Further, the digital still camera 1 can thus handle a photo image search request with a shot place as a trigger, and accordingly can readily search not only a photo image in which a person is reflected as a subject, but also a photo image in which scenery, a building, an animal, or the like other than persons is reflected.

Moreover, the digital still camera 1 is configured so as to execute search of a photo image at the time of the shooting mode for photographically taking an image of a subject. Accordingly, even in the event that a subject has photographically been taken, and a request has been made so as to immediately view a photo image obtained by the photo shooting thereof, the digital still camera 1 can search the photo image thereof to allow the user to view this without having the user perform a mode switching operation.

2. Modifications 2-1. Modification 1

Note that, with the above embodiment, a case has been described wherein a camera position icon is updated as appropriate at the time of the shooting mode. However, the present embodiment is not restricted to this, and an arrangement may be made wherein in the same way as with face icons, each time a camera position icon is generated, the generated camera position icon is additionally displayed above the icon layout image.

Thus, with the present invention, in the case that photo shooting is performed while sequentially changing the shot place, even though after change of the shot place search of a photo image is requested based on the shot place before change, the photo image can be searched by allowing the user to specify the camera position icon corresponding to the shot place before change.

Also, with the present invention, with regard to face icons, in addition to sequentially adding a face icon according to detection of the face of a person photographically taken, an arrangement may be made wherein the upper limit of addition is set, even after obtaining a face icon, the face icon is added/updated so as not to exceed this upper limit.

2-2. Modification 2

Also, with the above embodiment, a case has been described wherein a face icon is registered in the database DB for search along with registered face information. However, the present invention is not restricted to this, an arrangement may be made wherein no face icon is registered in the database DB for search, and each time the features of a detected face are set to face features for search, a face icon indicating the face thereof is generated.

2-3. Modification 3

Further, with the above embodiment, a case has been described wherein whether to present a search key at the time of the shooting mode, the type of a search key to be presented are selectively set. However, the present invention is not restricted to this, and an arrangement may be made wherein a switch is provided whereby whether to present a search key, or the type of a search key to be presented can be selected at an arbitrary timing.

Thus, with the present invention, at the time of the shooting mode, according to the shooting situation of a subject, whether to present a search key, or the type of a search key to be presented can be selectively switched on the spot, and accordingly, ease of use can be improved.

2-4. Modification 4

Further, with the above embodiment, a case has been described wherein the shooting lens 3 is provided to the entire surface 2A of the casing 2 of the digital still camera 1. However, the present invention is not restricted to this, and a shooting lens may also be provided to the rear surface 2B of the casing 2 of the digital still camera 1. Thus, with the present invention, for example, the user himself/herself can specify a search key to perform search of a photo image while consecutively and photographically taking him/her alone or along with others.

2-5. Modification 5

Further, with the above embodiment, a case has been described wherein photo images recorded in the recording device 33 provided to the digital still camera 1 are searched. However, the present invention is not restricted to this, and a communication function capable of communication with a server over a network may be provided to the digital still camera 1.

Subsequently, with the present invention, though a database for search is built in the recording device 33 of the digital still camera 1, photo images registered in the database for search thereof may be held in the server over the network. Thus, with the present invention, the user can search a desired photo image out of many more photo images.

Also, with the present invention, a camera position icon, a shot position icon, and map image data to be used for generation of a map image for search may be obtained from the server over the network at the time of generation thereof.

2-6. Modification 6

Further, with the above embodiment, a case has been described wherein a face (search utilization face) reflected in the shooting status presenting image 40 is employed as a search key for searching an intimate person.

However, the present invention is not restricted to this, a face (search utilization face) reflected in the shooting status presenting image 40 may be employed as a search key for searching a photo image alone in which the person of the face thereof is reflected.

Also, with the present invention, a face (search utilization face) reflected in the shooting status presenting image 40 may be employed as either a search key for searching a photo image alone in which the person of the face thereof is reflected or a search key for searching an intimate person by changing a specifying method.

Subsequently, with the present invention, no face icon may be displayed (i.e., not employed for search of a photo image) by a face (search utilization face) reflected in the shooting status presenting image 40 being available as two types of search key. Thus, with the present invention, the visibility of the shooting status presenting image 40 can be prevented from deteriorating due to the display of a face icon.

Also, with the present invention, an arrangement may be made wherein a face icon is available as two types of search key, and a face (search utilization face) reflected in the shooting status presenting image 40 is not employed as a search key (i.e., not set as a search key).

Further, with the present invention, one of a face icon and a face (search utilization face) reflected in the shooting status presenting image 40 is employed as a search key for searching only a photo image in which the person having the face thereof is reflected.

Also, with the present invention, the other of a face icon and a face (search utilization face) reflected in the shooting status presenting image 40 is employed as a search key for searching a photo image in which a person having intimacy with the person having the face thereof is reflected.

In this way, with the present invention, a face icon and a face (search utilization face) reflected in the shooting status presenting image 40 may be employed as a search key having a different function. Thus, with the present invention, a face icon and a face (search utilization face) reflected in the shooting status presenting image 40 can be specified in the same way, for example, by a tapping operation, and operations can be simplified for the worth of narrowing down the specifying method to one type.

2-7. Modification 7

Further, with the above embodiment, a case has been described wherein at the time of the shooting mode a shooting status presenting image 40 is generated by a subject being consecutively and photographically taken, and is displayed on the liquid crystal panel 7B.

However, the present invention is not restricted to this, and an arrangement may be made wherein at the time of the shooting mode, a search key icon alone is usually displayed on the liquid crystal panel 7B, and according to a half-pressing operation or full-pressing operation of the shutter button 9, the shooting status presenting image 40 is displayed on the liquid crystal panel 7B instead of a search key only during the half-pressing operation or full-pressing operation.

In the case of such a configuration, with the present invention, at the time of the shooting mode, many more search key icons can usually be displayed on the liquid crystal panel 7B, and also for the worth of no shooting status presenting image 40 being displayed, the visibility of the search key icons can be improved.

2-8. Modification 8

Further, with the above embodiment, a case has been described wherein in the event that a face icon or a face (search utilization face) reflected in the shooting status presenting image 40 has been specified by a sliding operation, a face icon for searching an intimate person is additionally displayed.

However, the present invention is not restricted to this, and an arrangement may be made wherein in the event that a face (search utilization face) reflected in the shooting status presenting image 40 has been detected, along with the face icon indicating the face thereof, a face icon indicating the face of an intimate person is obtained, and these are displayed on the liquid crystal panel 7B on a routine basis.

2-9. Modification 9

Further, with the above embodiment, a case has been described wherein the image search device according to the present invention has been applied to the digital still camera 1 described above regarding FIGS. 1 through 34. However, the present invention is not restricted to this, and may be applied to information processing devices such as computers, cellular phones, PDAs (Personal Digital Assistants), portable game machines, and so forth, having at least one shooting function of photo shooting and moving image shooting.

Also, the present invention may be applied to image search devices having various types of configuration other than the above configuration, such as digital still cameras, digital video cameras, and so forth having at least one shooting function of photo shooting and moving image shooting.

2-10. Modification 10

Further, with the above embodiment, the image search program according to the present invention has been applied to the image search program stored beforehand in the ROM 21 described above regarding FIGS. 1 through 34. Subsequently, a case has been described wherein the central processing unit 20 executes the search key presenting processing procedures RT2 described above regarding FIGS. 25 and 26, and executes the image search processing procedures RT3 described above regarding FIGS. 27 through 34, in accordance with the image search program thereof.

However, the present invention is not restricted to this, and the digital still camera 1 may install the image search program through a computer-readable recording medium in which the image search program is recorded. Subsequently, the central processing unit 20 may execute the search key presenting processing procedures RT2 and the image search processing procedures RT3 in accordance with the installed image search program thereof.

Also, the digital still camera 1 may externally install the image search program by taking advantage of a cable or wireless communication medium such as a local area network, the Internet, a digital satellite broadcast, or the like.

The computer-readable recording medium for enabling the image search program to be installed in the digital still camera 1 and to be executable may be realized by a packaged medium, for example, such as a flexible disk.

Also, the computer-readable recording medium for enabling the image search program to be installed in the digital still camera 1 and to be executable may be realized by a packaged medium such as CD-ROM (Compact Disc-Read Only Memory).

Further, the computer-readable recording medium for enabling the image search program to be installed in the digital still camera 1 and to be executable may be realized by a packaged medium such as DVD (Digital Versatile Disc) or the like.

Further, such a computer-readable recording medium may be realized by not only a packaged medium but also semiconductor memory or magnetic disk or the like in which each type of program is temporarily or eternally recorded.

Also, cable and wireless communication media such as a local area network, the Internet, a digital satellite broadcast, and so forth may be employed as a unit for recording the image search program in these computer-readable recording media. Further, with a unit for recording the image search program in a computer-readable recording medium, the image search program may be recorded via various types of communication interface such as a router or modem or the like.

2-11. Modification 11

Further, with the above embodiment, a case has been described wherein the lens unit 26 and imaging device 27 described above regarding FIGS. 1 through 34 are employed as a shooting unit for shooting a subject.

However, the present invention is not restricted to this, and such as an imaging unit including a lens unit and an imaging device made up of a CMOS (Complementary Metal Oxide Semiconductor) image sensor, in addition to this, an imaging unit having various types of configurations may be broadly applied.

2-12. Modification 12

Further, with the above embodiment, a case has been described wherein the liquid crystal panel 7B making up the touch screen 7 described above regarding FIGS. 1 through 34 is employed as the display unit. However, the present invention is not restricted to this, and such as an organic EL (Electro Luminescence) display, in addition to this, various types of display unit may be broadly applied.

2-13. Modification 13

Further, with the above embodiment, a case has been described wherein, at the time of the shooting mode whereby a subject can photographically be taken by the shooting unit, according to a shooting situation, the central processing unit 20 described above regarding FIGS. 1 through 34 is employed as a control unit for displaying a search key for image search on the display unit. However, the present invention is not restricted to this, and such as a microprocessor, a DSP (Digital Signal Processor), and so forth, in addition to these, a control unit having various types of configurations may be broadly applied.

2-14. Modification 14

Further, with the above embodiment, a case has been described wherein, at the time of the shooting mode, as a shooting situation for displaying a search key for image search on the display unit, the shot places described above regarding FIGS. 1 through 34, and a subject being consecutively and photographically taken are employed.

However, the present invention is not restricted to this, and such as shot time (season, year-end and new-year, summer vacation, winter vacation, etc.), shot time zones, weather, and so forth, in addition to these, various types of shot situation may be employed.

With the present invention, thus, in the event of displaying a search key for image search according to various types of shooting situation, in addition to face icons and a camera position icon, an icon indicating shot time, shot time zones, weather, or the like may be displayed as the search key thereof.

2-15. Modification 15

Further, with the above embodiment, a case has been described wherein the photo images described above regarding FIGS. 1 through 34 are employed as an image to be searched by a search key. However, the present invention is not restricted to this, and such a moving image obtained by consecutively and photographically shooting a subject by a digital video camera for arbitrary time specified by the user, a movie, a music clip, and so forth, in addition to these, various types of image may be broadly applied.

2-16. Modification 16

Further, with the above embodiment, a case has been described wherein, in the event that a search key has been specified via the specifying unit, the central processing unit 20 described above regarding FIGS. 1 through 34 is employed as the search unit for searching an image based on this specified search key. However, the present invention is not restricted to this, and such as a microprocessor, a DSP (Digital Signal Processor), and so forth, in addition to these, a search unit having various types of configurations may be broadly applied.

2-17. Modification 17

Further, with the above embodiment, a case has been described wherein the touch panel 7A adhered to the liquid crystal panel 7B described above regarding FIGS. 1 through 34 is employed as the specifying unit to be used for specifying a search key displayed on the display unit. However, the present invention is not restricted to this, and such as a touch sensor formed integrally within a liquid crystal panel, a cross key for moving a cursor above the liquid crystal panel 7B, and so forth, in addition to these, a specification unit having various types of configurations may be broadly applied.

2-18. Modification 18

Further, with the above embodiment, a case has been described wherein the digital processing unit 31 described above regarding FIGS. 1 through 34 is employed as a face detecting unit for detecting, from a shooting status presenting image obtained by consecutively and photographically shooting a subject by the shooting unit, the face of a person reflected in this shooting status presenting image. However, the present invention is not restricted to this, and such as a microprocessor, a DSP, and so forth, in addition to these, a face detecting unit having various configurations may be broadly applied.

2-19. Modification 19

Further, with the above embodiment, a case has been described wherein the central processing unit 20 described above regarding FIGS. 1 through 34 is employed as the person detecting unit for detecting another person having a high intimacy degree with the person having the face detected by the face detecting unit. However, the present invention is not restricted to this, and in addition to these, a person detecting unit having various types of configurations such as a microprocessor, a DSP, and so forth, may be broadly applied.

2-20. Modification 20

Further, with the above embodiment, a case has been described wherein the central processing unit 20 and GPS receiver 32 described above regarding FIGS. 1 through 34 are employed as the device position detecting unit for detecting the device position of the present device at the time of the shooting mode. However, the present invention is not restricted to this, and such as a microprocessor, a DSP, the GPS receiver 32, and so forth, in addition to these, a device position detecting unit having various types of configurations may be broadly applied.

The present application contains subject matter related to that disclosed in Japanese Priority Patent Application JP 2009-176700 filed in the Japan Patent Office on Jul. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
   at least one processor; and
   at least one storage having encoded thereon executable instructions that, when executed by the at least one processor, cause the at least one processor to carry out steps of:
   operating an image capture device to continuously capture a sequence of images over a period of time;
   during the period of time, identifying one or more search keys based at least in part on one or more images of the sequence of images;
   receiving a notification that a user has requested a search based on at least a first search key of the one or more search keys;
   initiating the search based at least in part on the search key;
   receiving, as a result of the search, information regarding at least one image; and
   outputting at least one of the at least one image for display to the user.

2. The apparatus of claim 1, further comprising:
   a user interface to provide output to the user and receive input from the user,
   wherein the steps further comprise outputting the one or more search keys to the user via the user interface, and
   wherein receiving the notification comprises receiving a notification that the user has input, via the user interface, a request to perform the search.

3. The apparatus of claim 2, wherein:
   the user interface comprises a touch screen;
   outputting the one or more search keys to the user comprises displaying the one or more search keys on the touch screen; and
   receiving the notification that the user has input the request via the user interface comprises receiving a notification that the user has selected the first search key on the touch screen.

4. The apparatus of claim 1, wherein:
   initiating the search comprises initiating a search of a first set of images based at least in part on the search key; and
   the at least one image, received as the result of the search, is at least a subset of the first set of images.

5. The apparatus of claim 4, wherein:
   the first set of images is a set of images captured by the image capture device; and
   initiating the search of the first set of images comprises initiating a search of the set of images captured by the image capture device.

6. The apparatus of claim 1, wherein:
   initiating the search comprises communicating a request to at least one server to perform the search; and
   receiving the information regarding the at least one image as the result of the search comprises receiving the information from the at least one server.

7. The apparatus of claim 1, wherein receiving the information regarding the at least one image comprises receiving the at least one image.

8. The apparatus of claim 1, further comprising:
   at least one nonvolatile storage,
   wherein the steps further comprise:
   in response to capturing each first image of the sequence of images during the operating, outputting the first image for display to a user and refraining from storing the first image in the at least one nonvolatile storage; and
   in response to receiving a notification that the user has requested image capture, operating the image capture device to capture a second image and storing the second image in the at least one nonvolatile storage.

9. The apparatus of claim 1, further comprising:
   a display,
   wherein outputting the at least one of the at least one image for display to the user comprises displaying the at least one image on the display.

10. The apparatus of claim 1, wherein identifying the one or more search keys based at least in part on one or more images of the sequence of images comprises identifying the one or more search keys based at least in part on content of the one or more images.

11. The apparatus of claim 10, wherein identifying the one or more search keys based at least in part on content of the one or more images comprises:
  detecting, in the one or more images, a human face; and
  identifying the human face as a search key of the one or more search keys.

12. The apparatus of claim 1, wherein identifying the one or more search keys based at least in part on one or more images of the sequence of images further comprises identifying the one or more search keys based at least in part on a configuration of the apparatus during the period of time.

13. The apparatus of claim 12, wherein identifying the one or more search keys based at least in part on the configuration of the apparatus during the period of time comprises identifying the one or more search keys based at least in part on one or more of a geographic location of the apparatus during the period of time, a current date and/or time indicated by the apparatus during the period of time, a time zone with which the apparatus is configured during the period of time, or weather data stored by the apparatus during the period of time.

14. An image search method for searching one or more images comprising:
  continuously capturing a sequence of images over a period of time by an image capture device;
  identifying one or more search keys based at least in part on at least one image of the sequence of images captured during the period of time;
  receiving a notification that a user has specified a search based on at least a first search key of the one or more search keys; and
  outputting for display to the user at least one of a set of images received as a result of the search.

15. At least one non-transitory storage having encoded thereon executable instructions that, when executed by at least one processor, cause the at least one processor to carry out a method, the method comprising:
  operating an image capture device to continuously capture a sequence of images over a period of time;
  during the period of time, identifying one or more search keys based at least in part on one or more images of the sequence of images;
  receiving a notification that a user has requested a search based on at least a first search key of the one or more search keys;
  outputting at least one image, received as a result of the search based on at least the first search key, for display to the user.

16. The at least one non-transitory storage of claim 15, wherein the method further comprises:
  during the period of time, periodically outputting for display in a user interface a most-recently-captured image of the sequence of images captured during the period of time; and
  outputting the one or more search keys for display to the user in the user interface,
  wherein receiving the notification comprises receiving a notification that the user has input, via the user interface, a request to perform the search.

17. The at least one non-transitory storage of claim 16, wherein:
  periodically outputting a most-recently-captured image of the sequence of images comprise, in response to capturing each first image of the sequence of images during the operating, outputting the first image for display to a user and refraining from storing the first image in at least one nonvolatile storage; and
  the method further comprises, in response to receiving a notification that the user has requested image capture, operating the image capture device to capture a second image and storing the second image in the at least one nonvolatile storage.

18. The at least one non-transitory storage of claim 15, wherein the method further comprises:
  communicating a request to at least one server to perform the search; and
  receiving, from the at least one server, information regarding the at least one image as the result of the search.

19. The at least one non-transitory storage of claim 15, wherein identifying the one or more search keys based at least in part on one or more images of the sequence of images comprises identifying the one or more search keys based at least in part on content of the one or more images.

20. The at least one non-transitory storage of claim 19, wherein identifying the one or more search keys based at least in part on content of the one or more images comprises:
  detecting, in the one or more images, a human face; and
  identifying the human face as a search key of the one or more search keys.

* * * * *